United States Patent
Kramer et al.

(10) Patent No.: US 11,277,551 B2
(45) Date of Patent: Mar. 15, 2022

(54) MULTIPLE OPTICAL PATH IMAGING TECHNIQUES AND SHARED EMITTER FOR ACTIVE DEPTH SENSING TECHNIQUES

(71) Applicant: QUALCOMM Incorporated, San Diego, CA (US)

(72) Inventors: Michael Kramer, San Diego, CA (US); Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/891,146

(22) Filed: Jun. 3, 2020

(65) Prior Publication Data

US 2021/0314467 A1    Oct. 7, 2021

Related U.S. Application Data

(60) Provisional application No. 63/010,447, filed on Apr. 15, 2020, provisional application No. 63/004,970, filed on Apr. 3, 2020.

(51) Int. Cl.
*H04N 5/225* (2006.01)
*G02B 7/00* (2021.01)

(52) U.S. Cl.
CPC ......... *H04N 5/2254* (2013.01); *H04N 5/2257* (2013.01); *H04N 5/2259* (2013.01); *G02B 7/006* (2013.01)

(58) Field of Classification Search
CPC .................................................. H04N 5/2259
See application file for complete search history.

(56) References Cited

U.S. PATENT DOCUMENTS

| 7,667,897 | B2 | 2/2010 | Seo |
| 8,820,644 | B2 | 9/2014 | Ferren et al. |
| 9,154,679 | B2* | 10/2015 | Huang ................. H04N 5/2254 |
| 9,335,452 | B2* | 5/2016 | Chan .................... H04N 5/238 |
| 10,120,159 | B2 | 11/2018 | Laroia |
| 10,205,862 | B2 | 2/2019 | Laroia |

(Continued)

FOREIGN PATENT DOCUMENTS

| CN | 208569285 U | 3/2019 |
| CN | 110475053 A | 11/2019 |

(Continued)

OTHER PUBLICATIONS

International Search Report and Written Opinion—PCT/US2021/019728—ISA/EPO—dated Jun. 7, 2021.

*Primary Examiner* — Gary C Vieaux
(74) *Attorney, Agent, or Firm* — QUALCOMM Incorporated

(57) ABSTRACT

Aspects of the disclosure relate to an emitter for active depth sensing shared by multiple apertures. An example method for active depth sensing by a device including a first aperture, a second aperture, a first emitter, and an optical element includes identifying whether the optical element is to be in a first optical element (OE) mode or a second OE mode, and controlling the optical element based on the identified OE mode. The optical element directs light from the first emitter towards the first aperture in the first OE mode. Light is directed from the first emitter towards the second aperture in the second OE mode.

29 Claims, 39 Drawing Sheets

(56) References Cited

U.S. PATENT DOCUMENTS

| | | |
|---|---|---|
| 10,353,195 B2 | 7/2019 | Singh et al. |
| 2009/0122179 A1 | 5/2009 | Nomura et al. |
| 2014/0071329 A1 | 3/2014 | Richardson |
| 2014/0104490 A1 | 4/2014 | Hsieh et al. |
| 2014/0218587 A1 | 8/2014 | Shah |
| 2015/0350569 A1 | 12/2015 | Espersen et al. |
| 2016/0241764 A1 | 8/2016 | Luo et al. |
| 2017/0272650 A1 | 9/2017 | Lee et al. |
| 2017/0285307 A1* | 10/2017 | Kamm .................. G03B 17/17 |
| 2017/0366750 A1 | 12/2017 | Evans, V et al. |
| 2021/0314466 A1 | 10/2021 | Kramer et al. |

FOREIGN PATENT DOCUMENTS

| | | |
|---|---|---|
| CN | 110505380 A | 11/2019 |
| EP | 3144727 A1 | 3/2017 |
| EP | 3351964 A1 | 7/2018 |

\* cited by examiner

900 

```
┌─────────────────────────────────────────────────────────────────────┐
│   Identify whether a device is to be in a first device mode or a second device mode. │
│                                  902                                │
│  ┌───────────────────────────────────────────────────────────────┐  │
│  │         Identify the device mode based on a user input.  904  │  │
│  └───────────────────────────────────────────────────────────────┘  │
│  ┌───────────────────────────────────────────────────────────────┐  │
│  │          Identify the device mode based on a FOV.  906        │  │
│  └───────────────────────────────────────────────────────────────┘  │
│  ┌───────────────────────────────────────────────────────────────┐  │
│  │      Identify the device mode based on a zoom factor.  908    │  │
│  └───────────────────────────────────────────────────────────────┘  │
│  ┌───────────────────────────────────────────────────────────────┐  │
│  │      Identify the device mode based on a depth of field.  910 │  │
│  └───────────────────────────────────────────────────────────────┘  │
│  ┌───────────────────────────────────────────────────────────────┐  │
│  │       Identify the device mode based on a device state.  911  │  │
│  └───────────────────────────────────────────────────────────────┘  │
└─────────────────────────────────────────────────────────────────────┘
                                     │
                                     ▼
┌─────────────────────────────────────────────────────────────────────┐
│    Control an optical element of the device based on the identified device mode. │
│                                  912                                │
│  ┌───────────────────────────────────────────────────────────────┐  │
│  │ Direct, by the optical element, light from a first aperture to a first image sensor in a │  │
│  │                        first OE mode.                         │  │
│  │                              914                              │  │
│  └───────────────────────────────────────────────────────────────┘  │
│  ┌───────────────────────────────────────────────────────────────┐  │
│  │ Direct light from the first aperture to a second image sensor in a second OE mode. │  │
│  │                              916                              │  │
│  └───────────────────────────────────────────────────────────────┘  │
└─────────────────────────────────────────────────────────────────────┘
```

```
┌─────────────────────────────────────────────────────────────────────┐
│  Identify whether the optical element is to be in the first OE mode │
│          or the second OE mode based on the identified device mode. │
│                                  922                                │
│  ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│   Identify the OE mode based on which aperture is to be used for    │
│                         image capture.  924                         │
│  ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│        Identify the OE mode based on an imaging application.  926   │
└─────────────────────────────────────────────────────────────────────┘
                                    │
                                    ▼
┌─────────────────────────────────────────────────────────────────────┐
│         Adjust the optical element based on the identified OE mode. │
│                                  928                                │
│  ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│                    Rotate the optical element.  930                 │
│  ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│             Translationally move the optical element.  932         │
│  ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│             Apply a stimulus to the optical element.  934           │
│    ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│       Apply an electrical current to the optical element.  936      │
└─────────────────────────────────────────────────────────────────────┘
```

```
┌─────────────────────────────────────────────────────────────────┐
│ Identify whether an optical element is to be in a first OE mode or a second OE mode. │
│                              1802                               │
│ ┌─────────────────────────────────────────────────────────────┐ │
│ │        Identify the OE mode based on a device mode.  1804   │ │
│ └─────────────────────────────────────────────────────────────┘ │
│ ┌─────────────────────────────────────────────────────────────┐ │
│ │ Identify the OE mode based on an active depth sensing or imaging application. │ │
│ │                              1806                           │ │
│ └─────────────────────────────────────────────────────────────┘ │
│ ┌─────────────────────────────────────────────────────────────┐ │
│ │        Identify the OE mode based on a user input.  1808    │ │
│ └─────────────────────────────────────────────────────────────┘ │
│ ┌─────────────────────────────────────────────────────────────┐ │
│ │      Identify the OE mode based on a device orientation.  1809 │ │
│ └─────────────────────────────────────────────────────────────┘ │
└─────────────────────────────────────────────────────────────────┘
                                  │
                                  ▼
┌─────────────────────────────────────────────────────────────────┐
│   Control an optical element of the device based on the identified OE mode. │
│                              1810                               │
│ ┌─────────────────────────────────────────────────────────────┐ │
│ │      Adjust the optical element based on the identified OE mode. │ │
│ │                              1812                           │ │
│ └─────────────────────────────────────────────────────────────┘ │
└─────────────────────────────────────────────────────────────────┘
```

FIG. 18

MULTIPLE OPTICAL PATH IMAGING TECHNIQUES AND SHARED EMITTER FOR ACTIVE DEPTH SENSING TECHNIQUES

RELATED APPLICATIONS

This patent application claims priority to U.S. provisional patent application No. 63/004,970 entitled "MULTIPLE OPTICAL PATH IMAGING TECHNIQUES AND SHARED EMITTER FOR ACTIVE DEPTH SENSING TECHNIQUES" and filed on Apr. 3, 2020, which is assigned to the assignee hereof. This Patent Application also claims priority to U.S. provisional patent application No. 63/010,447 entitled "MULTIPLE OPTICAL PATH IMAGING TECHNIQUES AND SHARED EMITTER FOR ACTIVE DEPTH SENSING TECHNIQUES" and filed on Apr. 15, 2020, which is assigned to the assignee hereof. The disclosures of the prior applications are considered part of and are incorporated by reference in this Patent Application.

This Patent Application is related to co-pending United States utility patent application entitled "MULTIPLE OPTICAL PATH IMAGING TECHNIQUES AND SHARED EMITTER FOR ACTIVE DEPTH SENSING TECHNIQUES" and filed on the same day as this patent application. The co-pending United States utility patent application is assigned to the assignee hereof.

TECHNICAL FIELD

This disclosure relates generally to image capture systems and devices, such as an apparatus including multiple image sensors sharing optical paths for imaging. This disclosure also relates generally to active depth sensing systems and devices, such as an apparatus including an emitter for active depth sensing shared by multiple apertures.

BACKGROUND

Many devices may include multiple cameras. For example, a smartphone may include one or more rear facing cameras and one or more front facing cameras. Each camera includes an image sensor and associated components for capturing an image. For example, if a device includes two or more cameras, the device includes two or more image sensors, and each image sensor is associated with its own dedicated optical path for imaging.

Many devices may also include multiple active depth sensing systems. For example, a smartphone may include a front facing active depth sensing transmitter (such as for face unlock or other applications using depth information) and a rear facing active depth sensing transmitter (such as for generating a depth map, to assist with autofocus for one or more rear facing cameras, and so on). Each active depth sensing transmitter is associated with its own dedicated optical path for emitting light for active depth sensing.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Some aspects of the present disclosure relate to a shared optical path between image sensors. An example device for digital imaging includes a first aperture, a first image sensor, a second image sensor, and an optical element. A first optical path is formed between the second image sensor and the first aperture. The optical element is configured to direct light from the first optical path towards the first image sensor in a first optical element (OE) mode. The second image sensor receives light from the first optical path in a second OE mode.

In some implementations, the device also includes a second aperture. A second optical path is formed between the first image sensor and the second aperture. The optical element is further configured to direct light from the second optical path towards the second image sensor in the first OE mode. The first image sensor receives light from the second optical path in the second OE mode. The optical element may be configured to direct the light from the first optical path towards the first image sensor in the first OE mode, and allow the light from the first optical path to pass through the optical element in the second OE mode. The optical element may be further configured to direct the light from the second optical path towards the second image sensor in the first OE mode and allow the light from the second optical path to pass through the optical element in the second OE mode.

The device may include an actuator configured to move the optical element between a first position associated with the first OE mode and a second position associated with the second OE mode. In some implementations, the actuator is configured to rotate the optical element between a first orientation and a second orientation with reference to a direction of the light from the first optical path, and a transparency and a reflectiveness of the optical element may be based on an orientation of the optical element with reference to the first optical path. The device may include an electrical current source configured to apply an electrical current to the optical element, and a transparency and a reflectiveness of the optical element may be based on an amount of electrical current applied to the optical element. In some implementations, the first image sensor includes a color image sensor and the second image sensor includes one of a monochrome image sensor, an infrared image sensor, or an image sensor with a different resolution than the first image sensor. In some implementations, the first image sensor includes a lower power image sensor, and the second image sensor includes a higher power image sensor. The lower power image sensor consumes less power than the higher power image sensor over a same amount of time.

The first aperture and the second aperture may be positioned on a first side of the device. Alternatively, the first aperture may be positioned on a first side of the device, and the second aperture may be positioned on a second side of the device. In some implementations, the first aperture is positioned on a first side including a display, and the second aperture is positioned on a second side of the device different than the first side. Whether the optical element is in the first OE mode or the second OE mode may be based on an orientation of the device. The device may include a lens configured to focus light toward the first image sensor or the second image sensor and an actuator configured to adjust a position of the lens with reference to a position of the first image sensor or a position of the second image sensor. The device may also include an image signal processor configured to process images received from the first image sensor and the second image sensor, an application processor configured to provide instructions to the image signal processor, and a memory configured to store the processed images.

In another example, a method for digital imaging by a device including a first aperture, a first image sensor, a second image sensor, and an optical element is disclosed. The example method includes identifying whether the device is to be in a first device mode or a second device mode and controlling the optical element based on the identified device mode. The optical element directs light from the first aperture to the first image sensor in a first OE mode. Light from the first aperture is directed to the second image sensor when the optical element is in the second OE mode. Controlling the optical element may include identifying whether the optical element is to be in the first OE mode or the second OE mode based on the identified device mode and adjusting the optical element based on the identified OE mode. Identifying whether the optical element is to be in the first OE mode or the second OE mode may be further based on an orientation of the device. Adjusting the optical element may include one or more of rotating the optical element, translationally moving the optical element, or applying an electrical current to the optical element. In some implementations, identifying whether the device is to be in the first device mode or the second device mode is based on a user input indicating a device mode. In some other implementations, identifying whether the device is to be in the first device mode or the second device mode is based on one or more of: a field of view for image capture; a zoom factor for image capture; a depth of field for image capture; or a device orientation (such as a landscape or portrait orientation). The first image sensor may be associated with a first field of view, and the second image sensor may be associated with a second field of view. The first image sensor may be associated with a first zoom factor, and the second image sensor may be associated with a second zoom factor. The first image sensor may be associated with a first depth of field, and the second image sensor may be associated with a second depth of field. In some implementations, the device is in a first device mode based on the device having a first orientation. The device may be in a second device mode based on the device having a second orientation different than the first orientation.

Identifying whether the device is to be in the first device mode or the second device mode may include comparing one or more of: the field of view for image capture to a threshold field of view between the first field of view and the second field of view; the zoom factor for image capture to a threshold zoom factor between the first zoom factor and the second zoom factor; or the depth of field for image capture to a threshold depth of field between the first depth of field and the second depth of field. Identifying whether the device is to be in the first device mode or the second device mode may include detecting the orientation of the device. Identifying whether the device is to be in the first device mode or the second device mode may also include selecting the first device mode or the second device mode based on the comparison or the detection.

The method may further include directing, by the optical element, one or more of: light from the first aperture to the first image sensor in the first OE mode; or light from the first aperture to the second image sensor in the second OE mode. The method may also include capturing one or more of: a first image from the light directed to the first image sensor during the first device mode; or a second image from the light directed to the second image sensor during the second device mode. The method may also include capturing a second image from the light directed to the second image sensor during the second device mode. The method may further include directing, by the optical element, one or more of: light from a second aperture of the device to the second image sensor in the first OE mode; or light from the second aperture to the first image sensor in the second OE mode.

In a further example, a computer-readable medium is disclosed. The computer-readable medium may store instructions that, when executed by one or more processors of a device comprising a first aperture, a first image sensor, a second image sensor, and an optical element, cause the device to identify whether the device is to be in a first device mode or a second device mode and control the optical element based on the identified device mode. The optical element directs light from the first aperture to the first image sensor in a first OE mode. Light from the first aperture is directed to the second image sensor when the optical element is in the second OE mode. In some implementations, execution of the instructions to control the optical element causes the device to identify whether the optical element is to be in the first OE mode or the second OE mode based on the identified device mode and adjust the optical element based on the identified OE mode. Identifying whether the optical element is to be in the first OE mode or the second OE mode may be further based on an orientation of the device. Adjusting the optical element may include one or more of rotating the optical element, translationally moving the optical element, or applying an electrical current to the optical element.

In some implementations, identifying whether the device is to be in the first device mode or the second device mode is based on a user input indicating a device mode. In some other implementations, identifying whether the device is to be in the first device mode or the second device mode is based on one or more of: a field of view for image capture; a zoom factor for image capture; a depth of field for image capture; or a device orientation such as landscape or portrait. The first image sensor may be associated with a first field of view, and the second image sensor may be associated with a second field of view. The first image sensor may be associated with a first zoom factor, and the second image sensor may be associated with a second zoom factor. The first image sensor may be associated with a first depth of field, and the second image sensor may be associated with a second depth of field. In some implementations, the device is in a first device mode based on the device having a first orientation. The device may be in a second device mode based on the device having a second orientation different than the first orientation. Execution of instructions to identify whether the device is to be in the first device mode or the second device mode may cause the device to compare one or more of: the field of view for image capture to a threshold field of view between the first field of view and the second field of view; the zoom factor for image capture to a threshold zoom factor between the first zoom factor and the second zoom factor; or the depth of field for image capture to a threshold depth of field between the first depth of field and the second depth of field. Execution of instructions to identify whether the device is to be in the first device mode or the second device mode may cause the device to alternatively detect the orientation in which it is positioned. Execution of the instructions to identify whether the device is to be in the first device mode or the second device mode may also cause the device to select the first device mode or the second device mode based on the comparison or the detection.

Execution of the instructions may further cause the device to direct, by the optical element, one or more of: light from the first aperture to the first image sensor in the first OE mode; or light from the first aperture to the second image sensor in the second OE mode. Execution of the instructions may also cause the device to capture one or more of: a first image from the light directed to the first image sensor during the first device mode; or a second image from the light directed to the second image sensor during the second device mode. Execution of the instructions may further cause the device to direct, by the optical element, one or more of: light from a second aperture of the device to the second image sensor in the first OE mode; or light from the second aperture to the first image sensor in the second OE mode.

In another example, a device for digital imaging is disclosed. The device includes means for identifying whether the device is to be in a first device mode or a second device mode and means for controlling the optical element based on the identified device mode. The optical element directs light from the first aperture to the first image sensor in a first OE mode. Light from the first aperture is directed to the second image sensor when the optical element is in the second OE mode. Controlling the optical element may include identifying whether the optical element is to be in the first OE mode or the second OE mode based on the identified device mode and adjusting the optical element based on the identified OE mode. Adjusting the optical element may include one or more of rotating the optical element, translationally moving the optical element, or applying an electrical current to the optical element. In some implementations, identifying whether the device is to be in the first device mode or the second device mode is based on a user input indicating a device mode. In some other implementations, identifying whether the device is to be in the first device mode or the second device mode is based on one or more of: a field of view for image capture; a zoom factor for image capture; a depth of field for image capture; or a device orientation such as landscape or portrait. The first image sensor may be associated with a first field of view, and the second image sensor may be associated with a second field of view. The first image sensor may be associated with a first zoom factor, and the second image sensor may be associated with a second zoom factor. The first image sensor may be associated with a first depth of field, and the second image sensor may be associated with a second depth of field. The first image sensor may be associated with a first orientation of the device, and the second image sensor may be associated with a second orientation of the device different than the first orientation.

Some aspects of the present disclosure relate to a shared emitter between apertures. An example device for active depth sensing includes a first aperture configured to receive light propagated along a first optical path, a second aperture configured to receive light propagated along a second optical path, a first emitter configured to emit a first light, and an optical element configured to direct the first light from the first emitter towards the first optical path in a first optical element (OE) mode. The first light from the first emitter is directed towards the second optical path in a second OE mode.

The device may include an actuator configured to move the optical element between a first position associated with the first OE mode and a second position associated with the second OE mode. The device may include an actuator configured to rotate the optical element between a first orientation associated with the first OE mode and a second orientation associated with the second OE mode. In some implementations, a transparency and a reflectiveness of the optical element are based on an orientation of the optical element with reference to the first optical path. The device may include an electrical current source configured to apply an electrical current to the optical element. A transparency and a reflectiveness of the optical element may be based on an amount of electrical current applied to the optical element.

In some implementations, the device includes a second emitter configured to emit a second light. The optical element may direct the second light from the second emitter towards the second optical path in the first OE mode. The second light may be directed from the second emitter towards the first optical path in the second OE mode. The first emitter may be configured to emit a first distribution of light for structured light depth sensing, and the second emitter may be configured to emit one of: a periodic pulsed light for time-of-flight depth sensing; a second distribution of light for structured light depth sensing; or a diffuse light for flood illumination. The device may include one or more receivers configured to receive a reflection of the first light for active depth sensing.

In some implementations, the device includes an image sensor configured to capture one or more images. The image sensor may be a lower power image sensor. A lower power image sensor consumes less power than other image sensors over a same amount of time. In some implementations, the first emitter is configured to emit light for active depth sensing, and the image sensor includes a lower power image sensor configured to capture one or more images for object detection. The optical element may direct light from the second aperture towards the image sensor in the first OE mode. Light from the first aperture may be directed towards the image sensor in the second OE mode. In some implementations, the device includes a signal processor configured to process the one or more images, an application processor configured to provide instructions to the signal processor, and a memory configured to store the processed images.

The device may also include a controller to control the optical element. The controller may control the optical element based on an orientation of the device.

In another example, a method for active depth sensing by a device including a first aperture, a second aperture, a first emitter, and an optical element is disclosed. The example method includes identifying whether the optical element is to be in a first OE mode or a second OE mode, and controlling the optical element based on the identified OE mode. The optical element directs light from the first emitter towards the first aperture in the first OE mode. Light from the first emitter is directed towards the second aperture in the second OE mode.

Controlling the optical element may include adjusting the optical element. Adjusting the optical element may include one or more of rotating the optical element, translationally moving the optical element, or applying an electrical current to the optical element.

Identifying whether the optical element is to be in the first OE mode or the second OE mode may be based on a device mode of the device, and the device may include a second emitter or an image sensor. A first device mode is associated with the first emitter, and a second device mode is associated with the second emitter or the image sensor. Identifying whether the optical element is to be in the first OE mode or the second OE mode may be based on a user input In some implementations, the method includes emitting light by the first emitter, directing, by the optical element, the light from the first emitter towards the first aperture in the first OE mode, and directing the light from the first emitter towards the second aperture in the second OE mode. The method may also include emitting light by a second emitter when the device is in a second device mode, directing, by the optical element, the light from the second emitter towards the second aperture in the first OE mode, and directing the light from the second emitter towards the first aperture in the second OE mode. The first emitter emits light when the device is in a first device mode. The method may further include receiving, by one or more receivers, a reflection of the light from the first emitter when the device is in the first device mode, and receiving, by the one or more receivers, a reflection of the light from the second emitter when the device is in the second device mode.

In some implementations the method includes capturing images by an image sensor when the device is in a second device mode, directing, by the optical element, light from the second aperture towards the image sensor in the first OE mode, and directing light from the first aperture towards the image sensor in the second OE mode. The first emitter emits light when the device is in a first device mode. Identifying whether the optical element is to be in the first OE mode or the second OE mode may be based on an orientation of the device. In some implementations, the image sensor is a lower power image sensor, and the images captured by the image sensor in the second device mode are for object detection. The lower power image sensor consumes less power than other image sensors over a same amount of time.

In a further example, a computer-readable medium is disclosed. The computer-readable medium may store instructions that, when executed by one or more processors of a device for active depth sensing including a first aperture, a second aperture, a first emitter, and an optical element, cause the device to identify whether the optical element is to be in a first OE mode or a second OE mode, and control the optical element based on the identified OE mode. The optical element directs light from the first emitter towards the first aperture in the first OE mode. Light from the first emitter is directed towards the second aperture in the second OE mode.

Execution of the instructions to control the optical element may cause the device to adjust the optical element. Adjusting the optical element may include one or more of rotating the optical element, translationally moving the optical element, or applying an electrical current to the optical element.

Identifying whether the optical element is to be in the first OE mode or the second OE mode may be based on a device mode of the device. The device may include a second emitter or an image sensor. A first device mode may be associated with the first emitter, and a second device mode may be associated with the second emitter or the image sensor. Identifying whether the optical element is to be in the first OE mode or the second OE mode may be based on a user input.

Execution of the instructions may further cause the device to emit light by the first emitter, direct, by the optical element, the light from the first emitter towards the first aperture in the first OE mode, and direct the light from the first emitter towards the second aperture in the second OE mode. In some implementations, execution of the instructions causes the device to emit light by a second emitter when the device is in a second device mode, direct, by the optical element, the light from the second emitter towards the second aperture in the first OE mode, and direct the light from the second emitter towards the first aperture in the second OE mode. The first emitter emits light when the device is in a first device mode. Execution of the instructions may also cause the device to receive, by one or more receivers, a reflection of the light from the first emitter when the device is in the first device mode, and receive, by the one or more receivers, a reflection of the light from the second emitter when the device is in the second device mode.

In some implementations, execution of the instructions causes the device to capture images by an image sensor when the device is in a second device mode, direct, by the optical element, light from the second aperture towards the image sensor in the first OE mode, and direct light from the first aperture towards the image sensor in the second OE mode. The first emitter emits light when the device is in a first device mode. Identifying whether the optical element is to be in the first OE mode or the second OE mode may be based on an orientation of the device. In some implementations, the image sensor is a lower power image sensor, and the images captured by the image sensor in the second device mode are for object detection. The lower power image sensor consumes less power than other image sensors over a same amount of time.

In another example, a device for active depth sensing including a first aperture, a second aperture, a first emitter, and an optical element is disclosed. The device includes means for identifying whether the optical element is to be in a first OE mode or a second OE mode, and means for controlling the optical element based on the identified OE mode. The optical element directs light from the first emitter towards the first aperture in the first OE mode. Light is directed from the first emitter towards the second aperture in the second OE mode. The device may include means for adjusting the optical element.

In another example, another device for active depth sensing is disclosed. The device includes means for emitting a first light, means for directing the first light towards a first optical path in a first OE mode, and means for directing the first light propagated along the first optical path to outside of the device in the first OE mode. The device also includes means for directing the first light towards a second optical path in a second OE mode, and means for directing the first light propagated along the second optical path to outside of the device in the second OE mode.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 9A shows an illustrative flow chart depicting an example operation for image capture.

FIG. 9B shows an illustrative flow chart depicting an example operation for controlling an optical element.

FIG. 18 shows an illustrative flow chart depicting an example operation of controlling an optical element for active depth sensing.

DETAILED DESCRIPTION

Aspects of the present disclosure may be used for image capture systems and devices or active depth sensing systems and devices. Some aspects may include a device having a shared optical path between multiple image sensors. Some other aspects may include a device having an emitter for active depth sensing shared between multiple optical paths.

Referring to aspects including a device having a shared optical path between multiple image sensors, many devices have multiple cameras. For a device having multiple cameras, each camera includes an image sensor, a lens, and other camera components (such as a shutter, imaging front end, color filter, and so on). For example, a smartphone may have a plurality of rear facing cameras (opposite a side including the display), and each rear facing camera includes dedicated camera components. Each rear facing camera may be configured to capture a different field of view (FOV) of a scene based on the image sensor and one or more lenses directing light to the image sensor. When an image is to be captured, the associated camera is used to capture the image while the other cameras are generally unused. In another example, one rear facing camera may be a primary camera for color imaging, and another rear facing camera may be an auxiliary camera for black and white imaging. If a black and white image is to be captured, the auxiliary camera may be used while the primary camera is unused.

The smartphone may also have one or more front facing cameras (such as located at a punch hole in the display, a notch on a side of the display, or under a display), and each front facing camera may be associated with a different FOV. For example, if a smartphone includes one front facing camera, the front facing camera may be configured to capture images with a FOV for portrait images. If the smartphone includes a second front facing camera, the second front facing camera may be configured to capture images with a FOV for landscape images or group selfie images. Based on the FOV to be used for capturing a front facing image (such as a selfie image), the associated front facing camera is used while the other front facing camera is unused.

Figure 1:
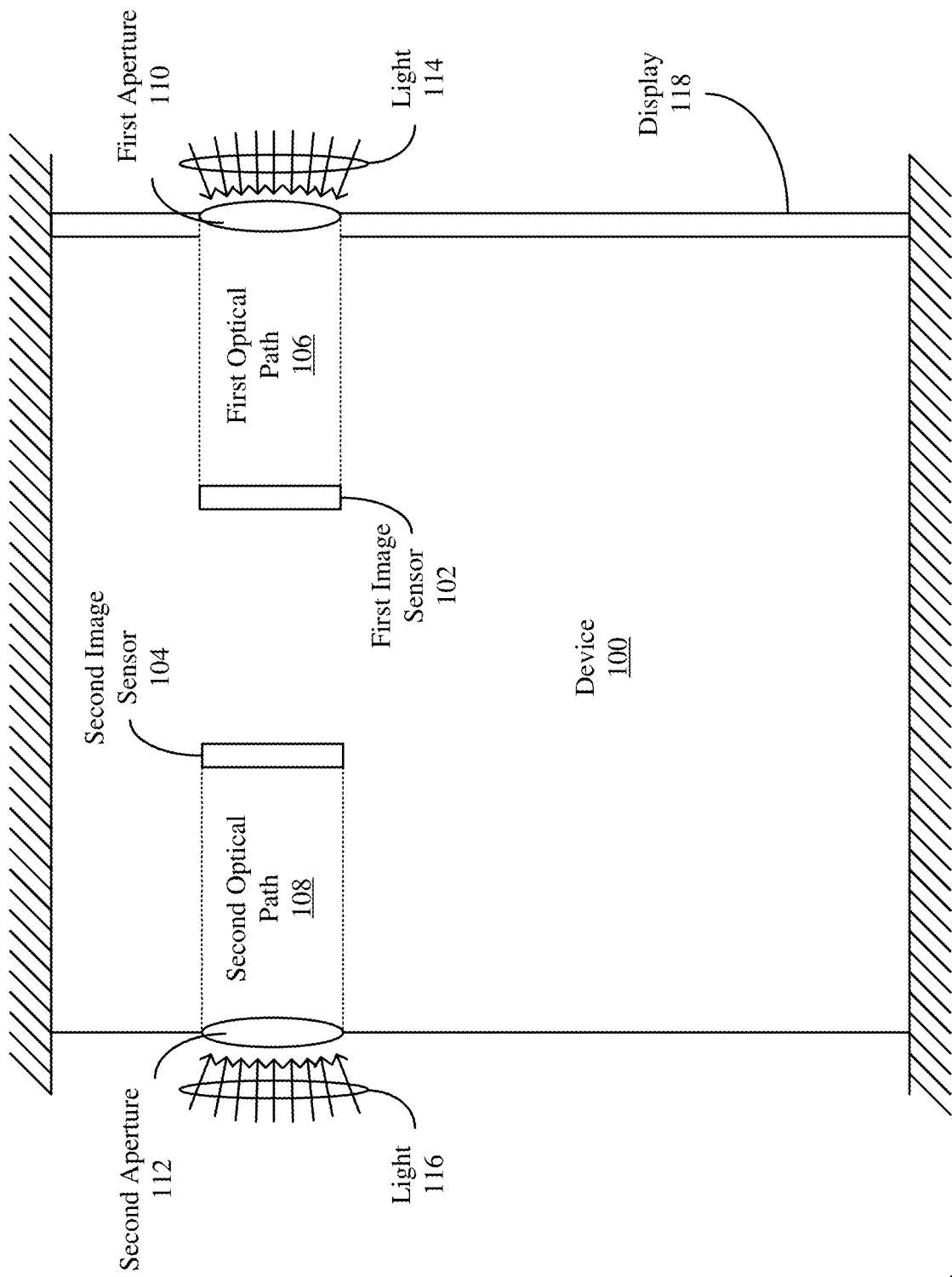
FIG. 1 shows a cross-section of a device portion illustrating a first image sensor associated with a first optical path and a second image sensor associated with a second optical path.

FIG. 1 shows a cross-section of a device 100 portion illustrating a first image sensor 102 associated with a first optical path 106 and a second image sensor 104 associated with a second optical path 108. The first image sensor 102 is associated with a front facing camera configured to receive light 114 via a first aperture 110 through a display 118 of the device 100 (such as via a notch, punch hole, and so on). The second image sensor 104 is associated with a rear facing camera configured to receive light 116 via a second aperture 112 through a rear panel of the device 100. The first image sensor 102 is associated with dedicated imaging components for capturing images by the front facing camera, and the second image sensor 104 is associated with dedicated imaging components for capturing images by the rear facing camera. When a front facing image is to be captured, the rear facing camera is unused. When a rear facing image is to be captured, the rear facing camera is unused.

Each image sensor being coupled to a dedicated optical path requires space and additional camera components within the device. As the number of image sensors increases, the space required increases and the number of camera components increases. Additionally, since each image sensor is associated with an aperture to allow light into the device, the number of apertures visible on an exterior of a device increases as the number of image sensors increases. For example, as the number of front facing cameras increases in a smartphone, a notch size, a punch hole size, or number of punch holes through the smartphone display increases to accommodate the additional apertures, effecting design and manufacturing complexity and/or design aesthetic. Furthermore, while one image sensor may not be used when another image sensor is used for imaging, the unused image sensor and camera components may be enabled and consuming power. As the number of image sensors (and their dedicated camera components) increase, the amount of power consumed increases.

The device may include fewer image sensors (and dedicated camera components) to reduce the space required, number of components required, number of apertures required, and power consumption for the device. However, reducing the number of image sensors may reduce the capabilities of the device. For example, if a smartphone includes only one front facing camera configured with a portrait FOV, the smartphone is not capable of capturing landscape or group FOV selfie images (even if the smartphone includes a landscape FOV configured rear facing camera).

In some implementations, a device may include a first image sensor and a second image sensor that are configured to share at least one optical path (and associated aperture). For example, a first image sensor may be configured to capture images with a first FOV, and a second image sensor may be configured to capture images with a second FOV. The device includes an optical element configured to switch between directing light from the shared optical path to the first image sensor and directing light from the shared optical path to the second image sensor. In this manner, the device may require a reduced space and number of camera components for the multiple image sensors. Additionally, an image sensor may be used for front facing imaging and rear facing imaging such that multiple dedicated image sensors for a specific FOV are not required for multiple sides of the device. For example, one image sensor with a first FOV may be used for front facing images and rear facing images from a smartphone or other device. Other benefits of implementations are described herein with reference to the figures and examples.

Referring to aspects including a device having an active depth sensing emitter shared by multiple optical paths in the device (and their associated apertures on the device), a device may be configured for active depth sensing to assist with various operations of the device. For example, a smartphone may include a rear facing active depth sensing system for auto focus of one or more rear facing cameras, for depth mapping, for range finding, or for other suitable operations. In another example, a smartphone may include a front facing active depth sensing system for facial recognition, for depth mapping, or for other suitable operations. Each active depth sensing system includes a dedicated emitter and components for active depth sensing. Each active depth sensing system also includes one or more dedicated apertures.

Figure 2:
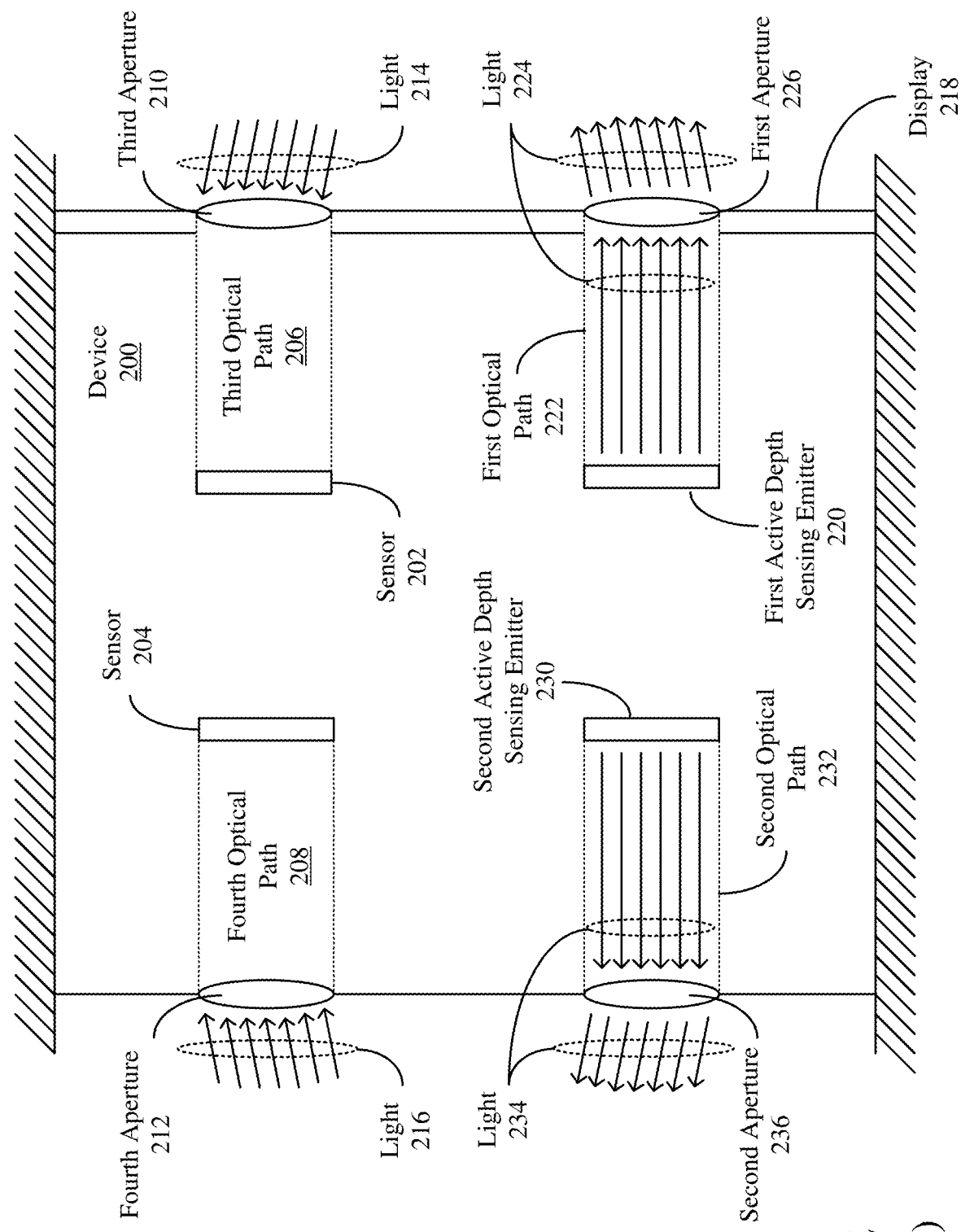
FIG. 2 shows a cross-section of a device portion illustrating a first emitter for active depth sensing associated with a first optical path and a second emitter for active depth sensing associated with a second optical path.

FIG. 2 shows a cross-section of a device 200 portion illustrating a first emitter 220 for active depth sensing associated with a first optical path 222 and a second emitter 230 for active depth sensing associated with a second optical path 232. The first emitter 220 is configured to emit light 224 through the first optical path 222 and out a front of the device 200 via a first aperture 226 through a device display 218. The second emitter 230 is configured to emit light 234 through the second optical path 232 and out a rear of the device 200 via a second aperture 236 through a rear side of the device 200. The device 200 also includes a sensor 202 configured to receive light 214 via a third aperture 210 through the display 218 and via the third optical path 206. The light 214 includes reflections of the light 224 for active depth sensing. The device 200 also includes a sensor 204 configured to receive light 216 via a fourth aperture 212 through a rear side of the device 200 and via the fourth optical path 208. The light 216 includes reflections of the light 234 for active depth sensing.

As shown, a front facing active depth sensing system (including the emitter 220) is associated with dedicated components for active depth sensing, and a rear facing active depth sensing system (including the emitter 230) is associated with different dedicated components for active depth sensing. When only one of the active depth sensing systems is in use, the components of the other active depth sensing system may be unused. For example, when the first emitter 220 is in use, the second emitter 230 may not be in use. Additionally, a number of similar components are required when the device includes multiple active depth sensing systems (such as multiple emitters and components for driving and controlling the emitters). As the number of active depth sensing systems increases in a device, the number of emitters, components, and space required in the device increases.

A device may include fewer active depth sensing systems (and dedicated emitters) to reduce the space required, number of components required, and number of apertures required in the device. However, reducing the number of active depth sensing systems may reduce the capabilities of the device. For example, if a smartphone includes only a front facing active depth sensing system (and no rear facing active depth sensing system), the smartphone may be capable of performing facial recognition for screen unlock, but the smartphone is not capable of performing laser autofocus for the rear facing cameras.

In some implementations, a device may include a first aperture and optical path and a second aperture and optical path that are configured to share an emitter for active depth sensing. For example, the first aperture (coupled to a first optical path in the device) may be a front facing aperture, and the second aperture (coupled to a second optical path in the device) may be a rear facing aperture. The device includes an optical element configured to switch between coupling the emitter to the first optical path and coupling the emitter to the second optical path. In this manner, the emitter may be configured to emit light out of the device via the first aperture or via the second aperture (such as a front facing aperture for front facing active depth sensing or a rear facing aperture for rear facing active depth sensing). The device may require a reduced space and number of components for the shared emitter for active depth sensing. Other benefits of implementations are described herein with reference to the figures and examples.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device including an image sensor configured to capture images or video or an emitter configured for active depth sensing (such as security systems, smartphones, tablets, laptop computers, digital video and/or still cameras, web cameras, and so on). While many examples described herein depict a device including two image sensors sharing one or two optical paths, aspects of the present disclosure are applicable to devices having any number of optical paths and any number of shared image sensors. Although the image sensors are also depicted as being oriented for different sides of a device, each image sensor may be oriented in any suitable manner (such as for a same side of a device). Additionally, while many examples described herein depict a device including one emitter sharing two optical paths and apertures for active depth sensing, aspects of the present disclosure are applicable to devices having any number of emitters and any number of shared optical paths. Therefore, the present disclosure is not limited to devices having a specific number of image sensors, active depth sensing emitters, components, orientation of components, apertures, optical paths, and so on.

The term "device" is not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects.

Figure 3A:
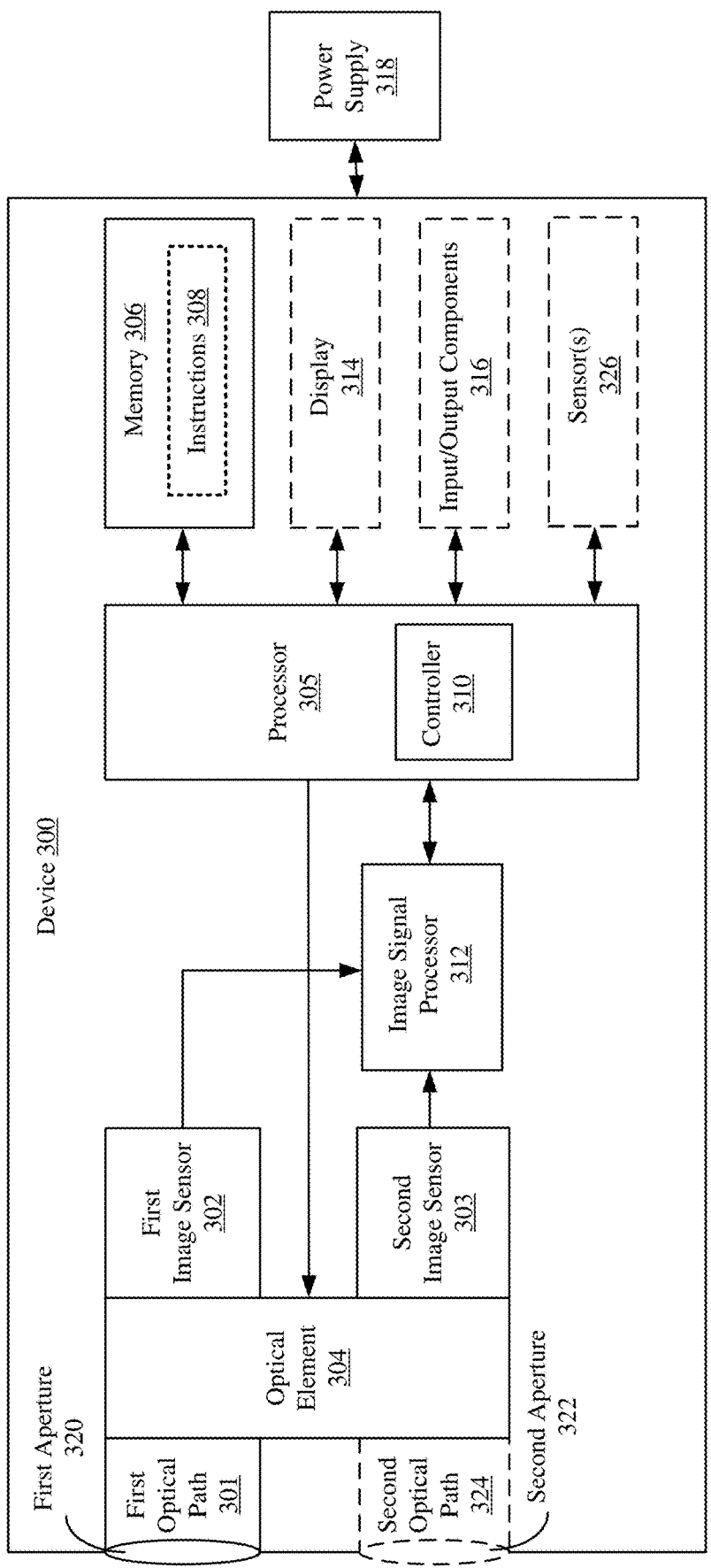
FIG. 3A shows a block diagram of an example device including a first image sensor and a second image sensor sharing a first optical path.

FIG. 3A shows a block diagram of an example device 300. The example device 300 may include a first aperture 320 to direct light to a first optical path 301, a first image sensor 302, a second image sensor 303, and an optical element 304. The example device 300 also includes a processor 305, a memory 306 storing instructions 308, and an image signal processor 312. The device 300 optionally may include (or be coupled to) a display 314, a number of input/output (I/O) components 316, and a number of sensors 326. The device 300 may include additional features or components not shown. In one example, a wireless interface, which may include a number of transceivers and a baseband processor, may be included for a wireless communication device. The device 300 also may include a power supply 318, which may be coupled to or integrated into the device 300.

The device 300 is configured to use the first image sensor 302 for capturing images when the device is in a first device mode (or first mode). The device 300 is also configured to use the second image sensor 303 for capturing images when the device is in a second device mode (or second mode). When the device 300 is in the first mode, the first image sensor 302 may be configured to receive light propagating along the first optical path 301 based on the optical element 304. The optical element 304 is configured to direct light propagating along the first optical path to the first image sensor 302 when in a first optical element (OE) mode. When the device 300 is in the second mode, the second image sensor 303 may be configured to receive light propagating along the first optical path 301 based on the optical element 304. For example, the optical element 304 is configured to allow the second image sensor 303 to receive light propagating along the first optical path 301 when the optical element 304 is in a second OE mode.

In some implementations, the device 300 includes a second aperture 322 to direct light along a second optical path 324. The first image sensor 302 and the second image sensor 303 may also share the second optical path 324. The optical element 304 may be configured to direct light along the second optical path 324 to the second image sensor 303 when the optical element 304 is in the first OE mode, and the device 300 may be configured to direct light along the second optical path 324 to the first image sensor 302 when the optical element 304 is in the second OE mode. As noted above, switching between a first device mode and a second device mode may refer to switching between image sensors for capturing images. In some implementations, the first image sensor 302 receives light propagated along the first optical path 301 during a first portion of the first device mode, and the first image sensor 302 receives light propagated along the second optical path 324 during a second portion of the first device mode. Similarly, the second image sensor 303 may receive light propagated along the first optical path 301 during a first portion of the second device mode, and the second image sensor 303 receives light propagated along the second optical path 324 during a second portion of the second device mode. The first portion and the second portion may be based on whether the optical element 304 is in a first OE mode or a second OE mode, and the device 300 is configured to switch the optical element 304 between OE modes. In some implementations, the first portion of the first device mode is the same as the first portion of the second device mode, and the second portion of the first device mode is the same as the second portion of the second device mode. For example, when the optical element 304 is configured to direct light propagating along the first optical path 301 to the first image sensor 302, the optical element 304 allows light propagating along the second optical path 324 to reach the second image sensor 303.

The device modes may be based on one or more image capture characteristics. For example, a first mode may be for capturing images having a first FOV and a second mode may be for capturing images having a second FOV. In one example, a first FOV may be a telephoto FOV, and a second FOV may be a wide FOV. A telephoto FOV may refer to a FOV associated with a telephoto lens or a suitable FOV for capturing telephoto FOV images. A wide FOV may refer to a wide FOV, an ultra-wide FOV, or any other FOV greater than the telephoto FOV. In another example, a first mode may be for capturing color images, and a second mode may be for capturing black and white images. In a further example, a first mode may be associated with a first zoom factor, and a second mode may be associated with a second zoom factor (such as based on an optical zoom caused by lenses directing light to the associated image sensor).

In some other implementations, switching between a first device mode and a second device mode may refer to switching between an image sensor for image capture and an image sensor for active depth sensing. A first image sensor may be used for visual photography (such as capturing selfies, capturing portrait images, capturing group images, and so on). A second image sensor may be used for active depth sensing (such as capturing reflections of light for time of flight depth sensing or structured light depth sensing). For example, the first mode is for capturing images using a first image sensor 302, and the second mode is for capturing light reflections from an emitter using a second image sensor 303 for active depth sensing.

In some implementations, switching between a first device mode and a second device mode may be based on information captured by an image sensor during one device mode to cause the device 300 to switch to the other device mode. For example, a device 300 may include a lower power image sensor and a higher power image sensor. As used herein, a lower power image sensor refers to an image sensor that consumes less power than one or more other image sensors (such as conventional image sensors used in devices). A higher power image sensor may refer to an image sensor that consumes more power over a same amount of time than the lower power image sensor. In this manner, a lower power image sensor may refer to an image sensor that consumes less power over a same amount of time than the higher power image sensor. In some implementations, differing power consumptions may be based on a difference in resolution. For example, a lower power image sensor may be a lower resolution image sensor and a higher power image sensor may be a higher resolution image sensor with reference to each other. Since less sensor pixels are readout for a frame for the lower resolution image sensor, the lower resolution image sensor may consume less power during a common period of time of operation than the higher resolution image sensor. Different power consumption rates may alternatively or additionally be based on different frame rates (a lower power image sensor may have a lower frame rate), different sampling frequencies (a lower power image sensor may have a lower sampling frequency), different exposure window sizes per frame (a lower power image sensor may have a smaller exposure window size), or different pixel sizes (a lower power image sensor may have larger pixels).

In some implementations, the lower power image sensor may include an always on (AO) image sensor. As used herein, an AO image sensor refers to an image sensor that may continuously operate for different operating states and device power states of a device. For example, an AO image sensor may be active while a device is in a low power state (such as a sleep state), an active state (such as when the device is in use by a user), or another suitable state while the device is powered on. A lower power image sensor that is an AO image sensor may differ from another image sensor in that the other image sensor may be active or operate only during select times of device operation. For example, when the device is in a low power state (such as in an inactive state or sleep state), the AO image sensor may continue to capture images while the other image sensor may be inactive. For example, a higher power image sensor may be inactive when the device is in an inactive state or sleep state. The higher power image sensor may include an image sensor with better signal to noise ratio for output, better pixel density, more dynamic range of light frequency response, or another quantifiable measure that is better than the lower power image sensor.

In some implementations, the lower power image sensor may include a lower frame rate or lower sampling frequency than other image sensors (such as a higher power image sensor). Since the lower power image sensor is readout less times than another image sensor over a same amount time (with each readout requiring a defined amount of power consumption), the lower power image sensor may consume less power over the same amount of time than another image sensor.

In some implementations, the lower power image sensor may include larger pixels than the higher power image sensor. As used herein, a size of a pixel refers to the photosensitive area for receiving photons to be measured by a photodetector of the pixel. Increasing the pixel size means increasing the photosensitive area. In this manner, a larger size pixel receives more photons than a smaller size pixel from a same ambient lighting during a same size exposure window. In some implementations, an exposure window size for a larger pixel may be decreased to conserve power. When the exposure window size decreases, the image sensor may consume less power per frame. If the frame rate is the same between the lower power image sensor with larger pixels and another image sensor, the lower power image sensor may consume less power over a same amount of time than the other image sensor. In some implementations, a frame rate of the pixel may be increased when the exposure window size is decreased. With a faster frame rate, a device may more quickly detect changes in light intensity.

In some implementations, the lower power image sensor may include a lower resolution than another image sensor. Since less pixels are readout per frame for the lower power image sensor than for the other image sensor, the lower power image sensor may consume less power over a frame than the other image sensor. If the frame rate is the same for the lower power image sensor (with a lower resolution) and the other image sensor with a higher resolution, the lower power image sensor may consume less power over a same amount of time than the other image sensor. While the lower power image sensor may have a lower resolution, the resolution may be suitable for measuring changes in light intensity for different regions in a scene. If the light intensities change across the entire (or a large portion of the) lower power image sensor for a frame, the device may determine that the change is a result of a global motion (moving the camera) instead of local motion (an object entering the scene). If changes in light intensities is only in a portion of the field of view of the lower power image sensor, the device may determine that the change is a result of local motion (an object moving in the scene). For example, outer pixels of the lower power image sensor (such as edge pixels) may first measure a different light intensity for an object entering the lower power image sensor's field of view. Neighboring pixels may then measure a different light intensity as the object approaches the middle of the lower power image sensor's field of view. Additional pixels may measure a different light intensity until the object moves to the center of the lower power image sensor's field of view. At such point, the center pixels of the lower power image sensor may measure a different light intensity. In another example, neighboring pixels may measure different light intensities across frames as an object moves across the scene during the frames. For example, a user moving his hand across the field of view causes a sequence of pixels from one side to the other in the lower power image sensor to measure different light intensities across frames. In this manner, a device may track an object moving in the scene. Measuring a different light intensity refers to measuring a light intensity in a subsequent frame that is different than the light intensity in a previous frame. In some implementations, a different light intensity may refer to the difference in light intensities measured by a pixel (or region of pixels) being greater than a threshold between frames (to filter variations in light intensity attributed to noise).

While the lower power image sensor may have sufficient resolution to detect objects entering a scene, the lower power image sensor may not have sufficient resolution for an operation to be performed by the device. For example, a lower power image sensor may have sufficient resolution to be used for object detection to determine if a possible face moves towards the center of the image sensor's field of view, but the lower power image sensor's resolution may not be sufficient for facial recognition. In one example, the lower power image sensor may be used to detect if a face is present in the scene (such as based on changes in light intensities), but the lower power image sensor may not include a sufficient resolution to be used for identifying the face in the scene (such as identifying the eyes, nose, or mouth, the space between the eyes, nose, or mouth, or whether the eyes are open). The higher power image sensor may be used for facial recognition in identifying the face. In another example, the lower power image sensor may be used to identify a user gesture (such as waving an arm left, right, up, or down) for gesture commands to the device. The device may perform an operation associated with the gesture (such as powering a flash for a flashlight operation, adjust a volume, adjust a display brightness, and so on). If the device operation to be performed is a camera operation, the higher power image sensor may be used for imaging based on the user gesture. If the device operation is active depth sensing, the higher power image sensor may be an image sensor configured for receiving reflections of light for active depth sensing.

In a further example other than object detection, the lower power image sensor may capture light information used for image analysis or video content analysis to determine temporal or spatial events in a scene. For example, the lower power image sensor's measurements may be used to determine an amount of global motion or local motion in the scene, an overall light intensity in the scene, a change in overall light intensity over time, a range of light intensities across different portions of the scene, and so on. The information may then be used to configure the higher power image sensor for capturing one or more image frames (such as for still images or for video). For example, the information may be used to set an initial exposure setting or otherwise be used in configuring the higher power image sensor for image capture.

For a lower power image sensor (such as an AO image sensor), a first device mode may be a low power mode (for which the lower power image sensor is used), and a second device mode may be an active mode (for which the higher power image sensor is used). In one example, the low power mode may include using an AO image sensor to capture light information from a front side of a smartphone (the side including the display) to detect when a face may be in front of the display. If the smartphone detects a face in the low power mode, the smartphone may switch to the active mode. The active mode may include using the higher power image sensor for facial recognition. Switching device modes may include switching OE modes so that both image sensors use the same aperture from the front of the smartphone. In this manner, the device may perform face unlock or other facial recognition operations without prompt (such as not requiring a user to swipe on a touch-sensitive device display, power on the device display, or otherwise indicate to the device to perform facial unlock). A lower power image sensor (such as an AO image sensor) may also be used by the device to determine when to wake up or otherwise remove itself from a lower power mode (such as based on a user gesture or a user face in the scene).

Referring back to FIG. 3A, the first aperture 320 may be configured to receive light incident to any side of the device 300. For example, if the device 300 is a smartphone, the first aperture 320 may be positioned on any side of the smartphone. If the device 300 includes a second aperture 322, the second aperture 322 may also be configured to receive light incident to any side of the device 300. For example, the second aperture 322 may be positioned on any side of the smartphone. In some implementations, the apertures 320 and 322 are positioned on different sides (such as one rear facing (on a side opposite a side including the display 314) and one forward facing (on the side including the display 314)). In some other implementations, the apertures 320 and 322 may be positioned on the same side (such as both being rear facing or both being front facing).

The first image sensor 302 and the second image sensor 303 may be any suitable image sensor and may be configured in any suitable manner. As noted above, the first image sensor 302 may be a lower power image sensor, and the second image sensor 303 may be a higher power image sensor. The first image sensor 302 may active during a first device mode (such as a lower power mode) while the second image sensor 303 may be active during a second device mode (such as an active mode). In some other implementations, the first image sensor 302 is configured to capture images with a first FOV (such as a telephoto FOV), and the second image sensor 303 is configured to capture images with a second FOV (such as a wide FOV or an ultra-wide FOV). The FOV may be based on one or more lenses configured to direct light toward the image sensor for image capture or may be based on the size of the image sensor.

In some other implementations, the first image sensor 302 is associated with a first zoom factor, and the second image sensor 303 is associated with a second zoom factor. For example, one or more lenses may be configured to magnify a scene for a first image sensor 302, and the scene may not be magnified for the second image sensor 303. In this manner, the first image sensor 302 is associated with a greater zoom factor than a zoom factor associated with the second image sensor 303.

In some other implementations, the first image sensor 302 is associated with a first depth of field, and the second image sensor 303 is associated with a second zoom factor. For example, one or more lenses may be configured to place a portion of a scene at a first range of depths in focus for images captured by the first image sensor 302. A different portion of the scene at a second range of depth may be in focus for images captured by the second image sensor 303. In this manner, the first image sensor 302 may be used to capture images of objects in a first depth of field, and the second image sensor 303 may be used to capture images of objects in a second depth of field.

In some further implementations, the first image sensor 302 may be coupled to a color filter array (such as an RGB color filter array (CFA)), and the second image sensor 303 may be coupled to a different type of filter or may not be coupled to a filter. Example filters include a bandpass filter for a specific wavelength range of light (such as for a specific color, for infrared light, and so on). As used herein, an image sensor may refer to the image sensor itself or the image sensor and one or more components coupled to the image sensor. For example, a color image sensor may refer to an image sensor and an associated color CFA. In another example, an infrared (IR) image sensor may refer to an image sensor not associated with a CFA or an image sensor and an associated bandpass filter for filtering at least a portion of light outside of IR light. In a further example, a monochrome image sensor may refer to an image sensor not associated with a CFA.

An IR image sensor is configured to receive IR light. In some implementations, the IR image sensor is configured to receive light in a range of frequencies greater than IR. For example, an image sensor not coupled to a color filter array may be capable of measuring light intensities for light from a large range of frequencies (such as both color frequencies and IR frequencies). In some other implementations, the IR image sensor is configured to receive light specific to IR light frequencies. For example, the IR image sensor may include or be coupled to a bandpass filter to filter light outside of a range of frequencies not associated with IR light. As used herein, IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission for active depth sensing. In the following description, other suitable wavelengths of light may be captured by an image sensor or used for active depth sensing, and an IR image sensor or active depth sensing is not limited to IR light or a specific frequency of IR light.

The memory 306 may be a non-transient or non-transitory computer readable medium storing computer-executable instructions 308 to perform all or a portion of one or more operations described in this disclosure (such as for adjusting a position of an optical element). The processor 305 may be one or more suitable processors (such as general purpose processors) capable of executing scripts or instructions of one or more software programs (such as instructions 308) stored within the memory 306. For example, the processor 305 may be an applications processor and execute an imaging application. In additional or alternative aspects, the processor 305 may include integrated circuits or other hardware to perform functions or operations described in this disclosure without the use of software for processor 305.

The processor 305 includes a controller 310 for selecting the image sensor to be used (such as selecting a first device mode or a second device mode) and for controlling the optical element 304 (such as switching between a first OE mode and a second OE mode). In some implementations, the controller 310 may be configured to adjust the position of the optical element 304 (such as by rotating or translationally moving the optical element 304). For example, the controller 310 may instruct an actuator to translationally move the optical element 304 when switching between OE modes. In another example, the controller 310 may instruct an actuator to rotate the optical element 304 when switching between OE modes.

In some other implementations, the controller 310 may be configured to adjust a state of the optical element 304 (such as by applying an electrical current or other stimulus). The optical element's state may include a reflectiveness or transparency (or refractive index) of the optical element 304 based on the stimulus. For example, the controller 310 may cause electrical current to not be applied to the optical element 304 for a first OE mode and cause electrical current to be applied to the optical element 304 for a second OE mode.

In some implementations, the controller 310 also determines or otherwise controls which image sensor is to be used for image capture. For example, the controller 310 selects whether the stream of images captured by the first image sensor or the stream of images captured by the second image sensor are processed by the image signal processor 312 for generating an image or video. In another example, the image signal processor 312 processes both streams of images, and the controller 310 selects one of the processed streams for generating an image of video. In a further example, the controller 310 uses the first image sensor (as a lower power image sensor) to capture images during a first mode, and the controller 310 initializes the second image sensor (as a higher power image sensor) to capture images during a second mode. For example, during a low power mode, a smartphone is inactive (such as with the display off). The smartphone may be in a lower power mode for which the controller 310 receives images from the lower power image sensor. The controller 310 (or the image signal processor 312) may determine a difference in light intensity for one or more pixels across the received image frames. The controller 310 may determine changes in light intensity associated with a user gesture to wake up the smartphone or with a face being positioned in front of the display of the smartphone. The controller 310 may then wake up the display. If facial recognition is to be performed (such as by detecting a face approaching a center of the field of view of the lower power image sensor), the controller 310 may switch device modes to an active mode. In some implementations, the controller 310 switches OE modes so that the higher power image sensor may be used for facial recognition using the same device aperture. In this manner, switching between device modes may also include adjusting the state of the optical element 304. While some example uses of lower power image sensors (such as AO image sensors) are described, any suitable use may be implemented, and the present disclosure is not limited to the provided examples.

Referring back to FIG. 3A, while shown to be coupled to each other via the processor 305 in the example device 300, the processor 305, the memory 306, the image signal processor 312, the optional display 314, and the optional I/O components 316 may be coupled to one another in various arrangements. For example, the processor 305, the memory 306, the image signal processor 312, the optional display 314, and the optional I/O components 316 may be coupled to each other via one or more local buses (not shown for simplicity).

The display 314 may include any suitable display or screen allowing for user interaction and/or to present items (such as captured images, video, or preview images from the first image sensor 302 or the second image sensor 303). In some aspects, the display 314 may include a touch-sensitive display. The I/O components 316 may include any suitable mechanism, interface, or device to receive input (such as commands) from a user and to provide output to the user. For example, the I/O components 316 may include a graphical user interface, keyboard, mouse, microphone and speakers, and so on. The sensors 326 may include any suitable sensors, such as motion and orientation sensors, positioning sensors, temperature sensors, and so on. Motion and orientation sensors may include an accelerometer, a gyroscope, or a magnetometer. Positioning sensors may include a global positioning system (GPS) receiver.

In some implementations, the device mode or the OE mode may be based on an orientation or motion of the device 300. The device orientation or motion may be determined based on one or more measurements from the number of sensors 326 (such as an orientation determined from measurements from a magnetometer). In addition or to the alternative, an orientation or motion of the device may be determined from differences in light information captured by an image sensor across multiple image frames.

In an example use case, the device 300 may be a smartphone in a low power state, locked, or otherwise with a screen lock. The device 300 may include a first aperture 320 on a front side of the device 300 (collocated with the display 314), and the device 300 may include a second aperture 322 on a back side of the device 300 (on a side opposite the front side with the display 314). The device 300 may be configured to perform contactless screen unlock based on facial recognition of a user. The first image sensor 302 may be a lower power image sensor used to detect whether a face approaches a center of the field of view of the first image sensor 302. The second image sensor 303 may be a higher power image sensor used in performing facial recognition. In this manner, a first device mode may include an object detection mode based on images captured by the first image sensor 302, and a second device mode may include a facial recognition mode based on images captured by the second image sensor 303.

Which aperture is to be used for facial recognition (and thus the OE mode of the device 300) may be based on an orientation of the device 300. If the device 300 is placed front side up on a table, chair, or other surface, the second aperture 322 may be directed toward the surface. As a result, the first aperture 320 may be desired for contactless screen unlock based on facial recognition. The device 300 may receive periodic measurements from one or more sensors while the screen is locked. For example, the device 300 may receive periodic measurements from a magnetometer. The controller 310 may determine an orientation of the device 300 with reference to the azimuth based on the magnetometer measurements.

If the determined orientation of the device 300 is with a front side up and approximately horizontal to the azimuth, the controller 310 may determine that the first aperture 320 is to be used for the first device mode (object detection using the lower power image sensor) and for the second device mode (facial recognition using the higher power image sensor). In this manner, the controller 310 may set the device mode to the first device mode while waiting for a face to be in the field of view, and the controller 310 may control the optical element 304 so that light from the first aperture 320 is directed towards the first image sensor 302. When the controller 310 detects a face (or other object) in the scene towards the center of the field of view of the first image sensor 302, the controller 310 may switch device modes to begin using the second image sensor 303 for image capture. In switching device modes, the controller 310 may initialize the second image sensor 303 or remove the second image sensor 303 from an inactive state. The controller 310 may also switch the OE mode so that light from the first aperture 320 is directed towards the second image sensor 303. Facial recognition may then be performed using the images from the second image sensor 303.

If the device 300 is oriented front side down towards the surface, the first aperture 320 is directed towards the surface. The orientation may be determined from magnetometer measurements, light intensity information from the first image sensor 302 or the second image sensor 303, or measurements from other suitable orientation sensors. In this example, it may be desired to use the second aperture 322 for object detection during a first device mode and facial recognition during a second device mode. The controller 310 may control the optical element 304 to direct light from the second aperture 322 towards the first image sensor 302 during the first device mode and to direct light from the second aperture 322 towards the second image sensor 303 during the second device mode.

The image signal processor 312 may be configured to process captured images from the first image sensor 302 and the second image sensor 303. In some implementations, the image signal processor 312 includes one or more filters of an image processing pipeline, and the filters may be configured based on instructions from the processor 305. For example, an image signal processor 312 may include a noise reduction filter, edge enhancement filter, image stabilization filter, color correction filter, and other filters applied to an image or video during processing.

In some aspects, the image signal processor 312 may execute instructions from a memory (such as instructions 308 from the memory 306 or instructions stored in a separate memory coupled to or included in the image signal processor 312). In some other aspects, the image signal processor 312 may include specific hardware to perform one or more operations described in the present disclosure. In some further aspects, the image signal processor 312 may include a combination of specific hardware and the ability to execute software instructions.

The optical element 304 may be adjusted in some manner to switch between OE modes. For example, the optical element 304 may include a reflective surface (such as a mirror) or a refractive element (such as a pentaprism) to direct light from the first optical path 301 to a first image sensor 302 during a first OE mode. When switching to a second OE mode, the optical element 304 may be translationally moved, may be rotated, or otherwise may be adjusted to not cause the light from the first optical path 301 to be directed to the first image sensor 302. For example, the light from the first optical path 301 may be directed to the second image sensor 303 during a second OE mode.

If the device 300 includes a second aperture 322 and second optical path 324, the optical element 304 may be configured to direct light from the second optical path 324 to a second image sensor 303 during the first OE mode. For example, the optical element 304 may include a second reflective surface or a second refractive element to direct light from the second optical path 324 to a second image sensor 303 during the first OE mode. When switching to the second OE mode, the optical element 304 may be translationally moved, may be rotated, or otherwise may be adjusted to not cause the light from the second optical path 324 to be directed to the second image sensor 303. For example, the light from the second optical path 324 may be directed to the first image sensor 302 during a second mode of the device 300.

In this manner, a light along a first optical path 301 may be directed to a first image sensor 302 when in a first OE mode, and the light along the first optical path 301 may be directed to a second image sensor 303 when in a second OE mode. Example operations and configurations of an optical element is described in more detail with reference to FIGS. 4A-6H.

As noted herein, the one or more apertures 320 and 324 may be oriented in any suitable manner, and the image sensors 302 and 303 may be configured for any suitable purpose. A first aperture 320 may be on any side of the device 300. For example, the first aperture 320 may be collocated with a display on a smartphone (a front of the device), or the first aperture 320 may be located on a side of the smartphone opposite the display (a rear of the device). If the device 300 includes both apertures 320 and 324, the apertures may be on any suitable side and may be on the same side or on different sides depending on the operations to be performed using the image sensors 302 and 303. FIGS. 3B-3G illustrate some example configurations of apertures and some example operations and use cases for the multiple image sensors. While the example devices in FIGS. 3B-3G are illustrated as a smartphone, any suitable device or configuration of components may be used to perform aspects of the present disclosure. The example devices in the FIGS. are example implementations of the device 300 in FIG. 3A, but any suitable device or configuration may be used.

Figure 3B:
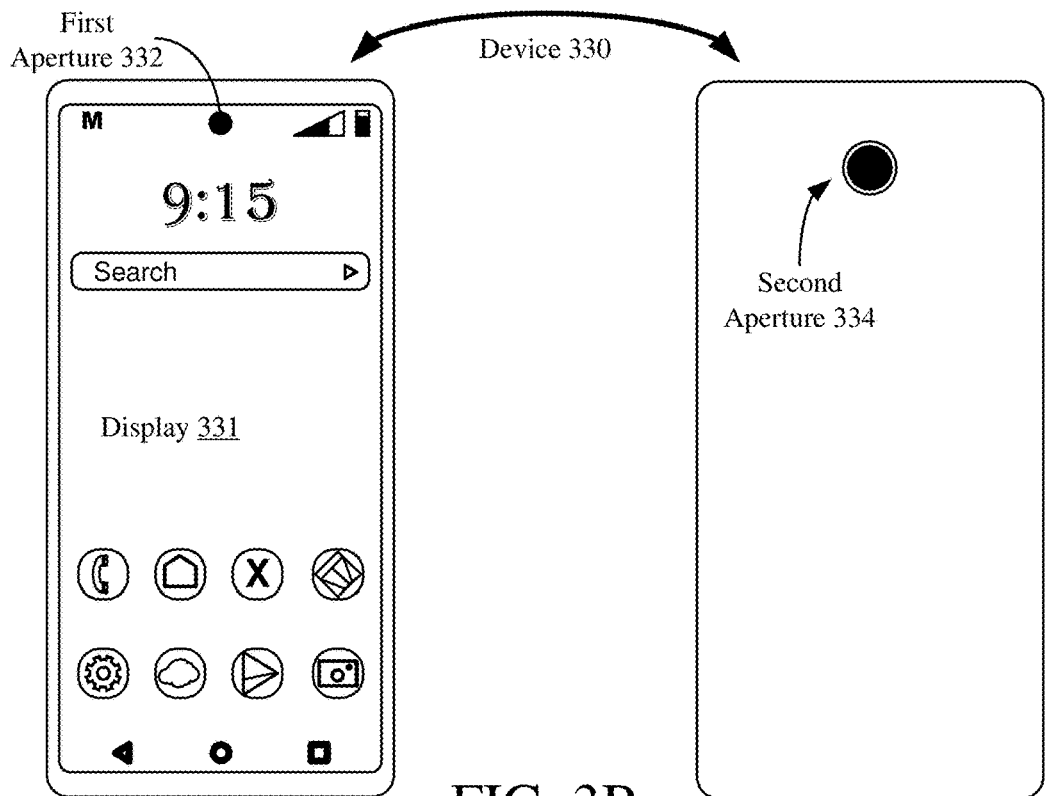
FIG. 3B shows a depiction of a device having a first aperture on a first side and a second aperture on a second side.

FIG. 3B shows a depiction of a device 330 having a first aperture 332 on a first side and a second aperture 334 on a second side. In the example, the first aperture 332 is on a side of the smartphone including the display 331. The second aperture 334 is on a side of the smartphone opposite the display 331. The first aperture 332 may be for front facing image capture (such as for capturing selfie images, capturing images for object detection and facial recognition, and so on), and the second aperture 334 may be for rear facing image capture (such as to capture group images, images of landscapes, and so on).

The device 330 is configured to switch between a first image sensor 302 and a second image sensor 303 to receive light from a first aperture 332. In one example, if the first image sensor 302 is a lower power image sensor and the second image sensor 303 is a higher power image sensor, the device mode may be based on whether the device 300 is in a low power mode. In another example, if the first image sensor 302 is configured for capturing images with a telephoto FOV (such as based on one or more lenses configured to direct light on to the first image sensor 302 or the size of the first image sensor 302) and the second image sensor 303 is configured for capturing images with a wide FOV (such as based on one or more lenses configured to direct light on to the second image sensor 303 or the size of the second image sensor 303), selecting a device mode may be based on a desired FOV for an image or video. As a result, the device 330 is configured to adjust a FOV for image capture (between telephoto FOV and wide FOV) based on which image sensor is selected. In one example, the FOV for selfie images to be captured (from the first aperture 332) may be adjusted based on switching between modes. In another example, if the first image sensor 302 is configured for capturing images with a first optical zoom or a first depth of field (such as based on one or more lenses coupled to the first image sensor 302) and the second image sensor 303 is configured for capturing images with a second optical zoom or a second depth of field (such as based on one or more lenses coupled to the second image sensor 303), the device 330 is configured to adjust an optical zoom or a depth of field for image capture based on the device mode. In this manner, the optical zoom or the depth of field for selfie images to be captured (from the first aperture 332) may be adjusted based on switching between device modes. When to switch between device modes may be based on a user input or the device 330 automatically determining when to switch (such as based on object tracking within different FOVs, changes to a zoom factor when performing a zoom function for image capture, and so on).

The second aperture 334 on the rear of the device 330 may be coupled to the second image sensor 303 when the first aperture 332 is coupled to the first image sensor 302 (such as during a first OE mode). Conversely, the second aperture 334 may be coupled to the first image sensor 302 when the first aperture 332 is coupled to the second image sensor 303 (such as during a second OE mode). In this manner, if the device 330 switches OE modes in adjusting a FOV, optical zoom, or depth of field, the device 330 may adjust the FOV, optical zoom, or depth of field for image capture from the rear of the device 330. For example, a depth of field for image capture using the second aperture 334 may be adjusted by switching OE modes based on a depth of a target object to be captured in the image. In another example, a FOV for image capture using the second aperture 334 may be adjusted by switching OE modes based on the type of images to be captured (such as a telephoto FOV for image capture of a person and a wide FOV for image capture of a landscape). When to switch between device modes or OE modes may be based on a user input or the device 330 automatically determining when to switch (such as based on automatically detecting an object or scene to be captured and its depth, size with reference to the FOV, and so on). In this manner, both forward facing images (captured using the first aperture 332) and rear facing images (captured using the second aperture 334) may have adjustable FOVs, optical zooms, depths of field, and so on based on the mode of the device 330.

Figures 3C, 3D:
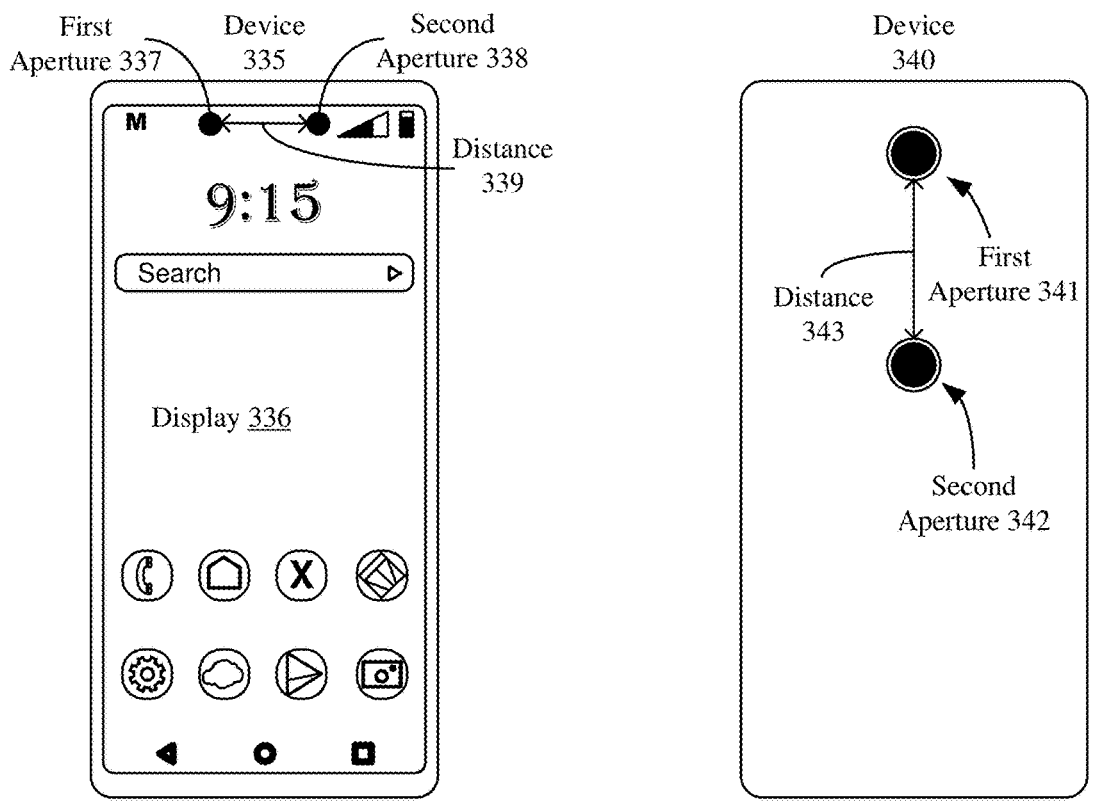
FIG. 3C shows a depiction of a device having a first aperture and a second aperture on a side including a display.
FIG. 3D shows a depiction of a device having a first aperture and a second aperture on a side opposite a display.

In some other implementations, the first aperture and the second aperture may be on the same side of the device. FIG. 3C shows a depiction of a device 335 having a first aperture 337 and a second aperture 338 on a side including a display 336. FIG. 3D shows a depiction of a device 340 having a first aperture 341 and a second aperture 342 on a side opposite a display. The first image sensor 302 may receive light from the first aperture 337 or 341 during a first OE mode, and the second image sensor 303 may receive light from the first aperture 337 or 341 during a second OE mode. Conversely, the first image sensor 302 may receive light from the second aperture 338 or 342 during the second OE mode, and the second image sensor 303 may receive light from the second aperture 338 or 342 during the first OE mode. In FIG. 3C, the first aperture 337 is separated from the second aperture 338 by a distance 339. In FIG. 3D, the first aperture 341 is separated from the second aperture 342 by a distance 343.

If the first aperture 337 or 341 and the second aperture 338 or 342 are configured to receive light from the same (or overlapping) portion of a scene, the first aperture 337 or 341 and the second aperture 338 or 342 may be used by an image sensor to capture images of the scene portion from different perspectives. For example, if the first aperture 337 is coupled to the first image sensor 302 during a first OE mode, and the second aperture 338 is coupled to the first image sensor 302 during a second OE mode, the perspective for image capture using the first image sensor 302 may be adjusted based on switching OE modes. Similarly, the perspective for image capture using the second image sensor 303 may be adjusted based on switching OE modes.

The OE mode may be switched during a device mode. In this manner, the device in a first device mode uses the first image sensor 302 to capture images or video, and the first image sensor 302 may capture images from different perspectives based on the OE mode during the first device mode.

The device may be configured to use the difference in perspectives for image capture by the first image sensor 302 and/or the second image sensor 303 for stereoscopic imaging or vision. For example, the device may alternate between a first OE mode and a second OE mode, and thus the first image sensor 302 alternates between capturing one or more images from a first perspective and one or more images from a second perspective. An image captured during the first OE mode may be paired with an image captured during the second OE mode, and a parallax between the images may be used to generate a three dimensional image. If the device alternates at a sufficient rate (such as 10 to 60 times per second), a stream of three dimensional images may be generated for three dimensional video.

In some implementations when the first image sensor 302 is a lower power image sensor and the second image sensor 303 is a higher power image sensor, the first image sensor 302 may be used for scene analysis during a first device mode, and the second image sensor 303 may be used for image capture after scene analysis during a second device mode. For example, the lower power image sensor's images may be used to determine an exposure setting or other suitable capture setting for the second image sensor 303. The device may switch to the second device mode with the second image sensor 303 configured using the determined capture settings. The apertures on the same side of the device may be associated with different perspectives, different FOVs, different depths of field, or other differing characteristics. In this manner, the controller 310 may determine the OE mode based on which perspective, FOV, depth of field, or other characteristic is desired for image capture. In the first device mode, light from the desired aperture is directed towards the first image sensor 302. In the second device mode, the controller 310 may switch the OE mode so that light from the desired aperture is directed towards the second image sensor 303.

When the first image sensor 302 is configured to receive light from the first aperture 337 or 341, the second image sensor 303 may be configured to receive light from the second aperture 338 or 342. In this manner, the first image sensor 302 and the second image sensor 303 concurrently capture images of overlapping portions (or the same portion) of the scene. In some implementations, a first image sensor 302 may be configured to capture images for three dimensional imaging, and a second image sensor 303 may be configured for assisting in one or more operations for configuring the first image sensor 302 and its image processing pipeline. For example, the device performs one or more of autofocus, autoexposure, or automatic white balance (AWB) operations (3A operations) to determine a focus setting, exposure setting, or AWB setting. Captures from the second image sensor 303 may be used to determine the autofocus, autoexposure, or AWB settings for the first image sensor 302 (and its associated image processing pipeline).

In some other implementations, the first image sensor 302 may be associated with three dimensional imaging having a first FOV, first optical zoom, or first depth of field, and the second image sensor 303 may be associated with three dimensional imaging having a second FOV, second optical zoom or second depth of field. The device 330 may concurrently generate three dimensional images having different FOVs, zoom factors, or depth of fields. In some implementations of generating a three dimensional video (including a succession of three dimensional images), the device may switch between device modes. In this manner, the device may switch between using three dimensional images generated from images from the first image sensor 302 and three dimensional images generated from images from the second image sensor 303 to generate the video. In this manner, the device may adjust the FOV, zoom, or depth of field for the scene in the video.

Alternative to the first aperture 337 or 341 being configured to receive light from the same portion of the scene as the second aperture 338 or 342, the first aperture 337 or 341 and the second aperture 338 or 342 may be configured to receive light from different portions of a scene. For example, a first aperture 341 may be configured to receive light from a top portion of a scene and the second aperture may be configured to receive light from a bottom portion of the scene when the device 340 is in a portrait orientation. The differing portions of the scenes in complementary images may be stitched together to generate a wider FOV image. For stitching purposes, the top portion and the bottom portion may have some overlap.

In a first OE mode, the first image sensor 302 is configured to capture one or more images of the top portion of the scene. In a second OE mode, the first image sensor 302 is configured to capture one or more images of the bottom portion of the scene. An image captured by the first image sensor 302 during the first OE mode may be paired with an image captured by the first image sensor 302 during the second OE mode, and the paired images may be combined (such as stitched together) to increase the FOV of an image generated using the first image sensor 302. In this manner, the device 340 may be configured to generate panorama images without requiring a user to move the device 340. In some implementations, captures from the second image sensor 303 may be used to determine the autofocus, autoexposure, or AWB settings for the first image sensor 302 (and its associated image processing pipeline). In some other implementations, the second image sensor 303 is configured to capture images with a different zoom factor or depth of field than the first image sensor 302. In this manner, the device 340 may be configured to generate panorama images with different zoom factors or depths of field. Adjusting the zoom factor or the depth of field may be based on the device 340 switching device modes (and thus which image sensor is to be used). Similar to the example of three dimensional video with adjustable zoom factors or depths of field, video with a larger FOV may include an adjustable zoom factor or depth of field based on switching between images generated using the first image sensor 302 and the second image sensor 303.

Referring back to FIG. 3B, if apertures 332 and 334 are on different sides of the device 330, the device 330 may be configured for concurrent image capture from the different device sides (such as selfie image capture using the first aperture 332 and image capture of landscapes using the second aperture 334). As such, a graphical user interface (GUI) on the display 331 may be configured for a user to indicate from which side image capture is desired and one or more characteristics of image capture, such as a FOV, zoom factor, or depth of field (which may affect which device mode is to be selected).

Figure 3E:
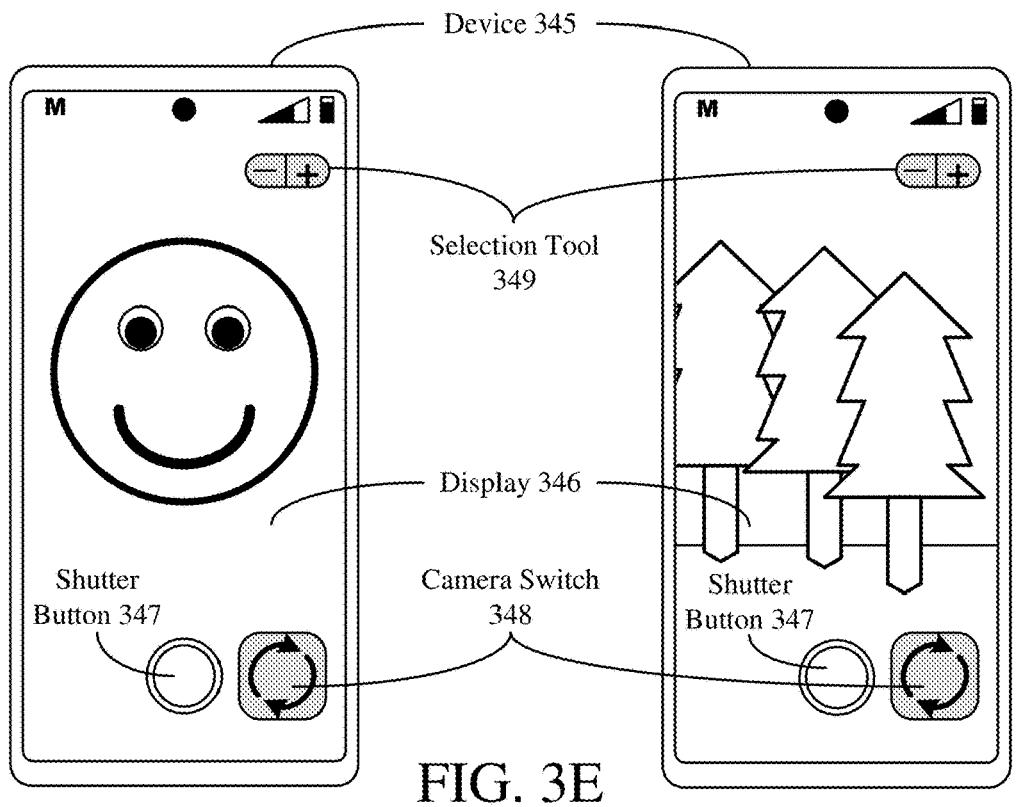
FIG. 3E shows a depiction of a device switching between image capture from a first side of a device and from a second side of the device.

FIG. 3E shows a depiction of a device 345 switching between image capture from a first side of the device 345 and from a second side of the device 345. The device 345 may be an example implementation of the device 330 in FIG. 3B. Based on the device 345 executing a camera application, the display 346 may display a GUI for the camera application. The GUI may include a shutter button 347 to be used by the user to indicate when the device 345 is to capture an image or a video (such as from the stream of image frames captured by the first image sensor 302 or from the stream of image frames captured by the second image sensor 303). In a first OE mode, the first image sensor 302 may capture images from a front of the device 345 (such as using the first aperture 332 in FIG. 3B), and the second image sensor 303 may capture images from a rear of the device 345 (such as using the second aperture 334 in FIG. 3B). In switching OE modes, the front image sensor 302 captures images from the rear of the device 345, and the second image sensor 303 captures images from the front of the device 345.

The first image sensor 302 and the second image sensor 303 may concurrently capture images from the front and rear of the device 345. With both image sensors 302 and 303 concurrently capturing a stream of image frames, the user may determine from which side to capture an image or video. For example, the display 346 may display a preview of the image frames from the first image sensor 302 or the second image sensor 303 based on the direction the user intends for the device 345 to generate an image. On the left side of FIG. 3E, the device 345 displays a preview of a selfie image that may be captured by the first image sensor 302. If the user intends for an image to be captured from the rear of the device 345, the user may select the camera switch 348. The camera switch 348 in the GUI may be a button (as illustrated), scroll wheel, slider, or other interactive object and may be configured to receive any suitable user input (such as a tap on the display 346, swipe on the display 346, shake of the device 345, audible commands, and so on). When the user presses the camera switch 348, the device 345 may display a preview from the stream of image captures from the second image sensor 303.

The first image sensor 302 may be associated with capturing images having a first FOV, a first zoom factor, or a first depth of field, and the image sensor 303 may be associated with capturing images having a second FOV, a second zoom factor, or a second depth of field. The user may indicate a preferred FOV, zoom factor, or depth of field. For example, the user may use the selection tool 349 to indicate a zoom factor for an image to be captured (such as pressing the − to zoom out and pressing the + to zoom in). The device mode may then be determined based on the zoom factor. For example, if the first image sensor 302 is associated with a 0x optical zoom (lenses do not magnify the scene for image capture by the image sensor 302) and the second image sensor 303 is associated with a 5× optical zoom (one or more lenses magnify the scene to appear five times larger in images captured by the image sensor 303), the first image sensor 302 may be used for image capture for a user selected zoom factor less than a threshold between 0× and 5×. If the device 345 is to capture a selfie image and the zoom factor is less than the threshold, the device 345 is in the first device mode for the selfie image capture. The second image sensor 303 may be used for image capture for a user selected zoom factor greater than the threshold. If the device 345 to capture a selfie image receives an indication of a zoom factor greater than the threshold, the device 345 is in the second device mode for the selfie image capture. In some other implementations, the user may explicitly indicate the mode (or the image sensor to be used) for image capture.

Figure 3F:
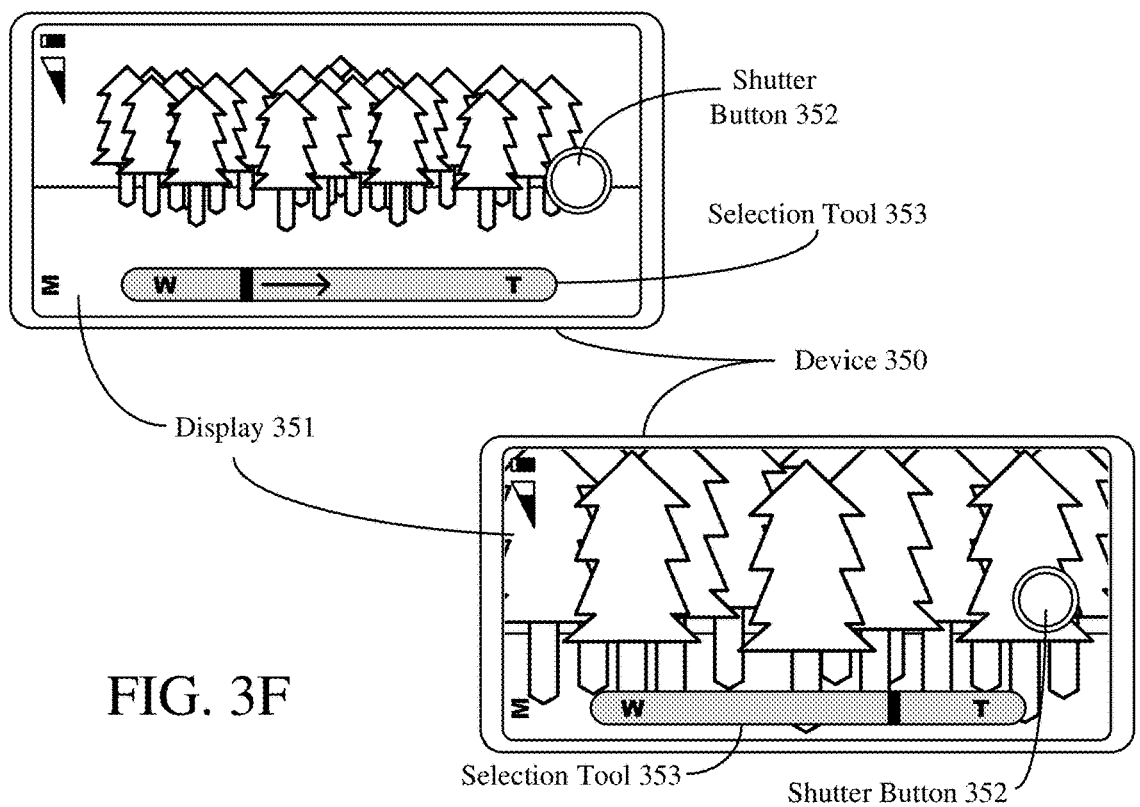
FIG. 3F shows a depiction of a device adjusting a FOV or zoom factor for images captured by the device.

Basing the device mode on the FOV, zoom factor, or depth of field may also apply to the device 335 in FIG. 3C or the device 340 in FIG. 3D with both apertures on the same side of the device. For example, a user may indicate a desired FOV, zoom factor, or depth of field, and the image sensor for image capture may be based on the user indication. FIG. 3F shows a depiction of a device 350 adjusting a FOV or zoom factor for images captured by the device 350. The device 350 may be an example implementation of the device 340 in FIG. 3D, thus including two apertures on a rear of the device 350. The display 351 displays a GUI for a camera application, and the GUI may include a shutter button 352 to indicate when the device 350 is to capture an image or video. The GUI may also include a selection tool 353 to indicate a FOV or zoom factor. For a zoom factor example, a first image sensor 302 may be associated with a 0× zoom factor, and a second image sensor 303 may be associated with a 5× zoom factor. The user may zoom in for an image to be captured by pressing the T on the selection tool 353, moving the slider in the middle of the selection tool 353 toward T, swiping right on the selection tool 353, providing a haptic or audible instruction, or other suitable input. For a FOV example, the first image sensor 302 may be associated with a larger FOV than the second image sensor 303. The user may increase the FOV for an image to be captured by pressing the W (such as for wide angle) on the selection tool 353, moving the slider in the middle of the selection tool 353 toward W, swiping left on the selection tool 353, providing a haptic or audible instruction, or other suitable input. The display 351 also displays a preview of an image to be captured based on the zoom factor or FOV indicated by the user.

Referring to the optical zoom example, whether the first image sensor 302 (associated with, e.g., a 0× optical zoom) or the second image sensor 303 (associated with, e.g., a 5× optical zoom) is to capture the image is based on the indicated zoom factor. For example, the first image sensor 302 may be used if the indicated zoom factor is less than a threshold, and the second image sensor 303 may be used if the indicated zoom factor is greater than the threshold. As noted herein, a first device mode refers to using the first image sensor 302 for image capture, and a second device mode refers to using the second image sensor 303 for image capture. In this manner, a first mode may refer to using the first image sensor 302 for three dimensional imaging, wider FOV imaging, and so on (with the device 350 switching between using the different apertures to capture associated image frames), and a second mode may refer to using the second image sensor 303 for three dimensional imaging, wider FOV imaging, and so on (with the device 350 switching between using the different apertures to capture associated image frames). Thus, a first image sensor 302 may be associated with a first aperture for a first portion of the first mode and may be associated with a second aperture for a second portion of the first mode for three dimensional imaging and wider FOV imaging. Conversely, a second image sensor 303 may be associated with the second aperture for a first portion of a second mode and may be associated with the second aperture for a second portion of the second mode for three dimensional imaging and wider FOV imaging.

As described for FIG. 3E and FIG. 3F, the device may adjust an FOV, zoom factor, depth of field, or another suitable characteristic based on a device mode. In some other implementations, the first image sensor and the second image sensor may be used for bokeh effects or other effects based on depth of field. For example, referring back to FIG. 3C, if the device 335 is configured for three dimensional imaging, the first image sensor 302 is associated with a first depth of field, and the second image sensor 303 is associated with a second depth of field, the device 335 may use the difference in depths of field to apply a bokeh effect (such as blurring or otherwise adjusting a background of a person) for a three dimensional or wider FOV selfie image.

The different image capture characteristics between device modes may be based on the difference between image sensors and components coupled to the image sensors. In this manner, characteristics other than FOV, zoom factor, and depth of field may be based on the device mode. For example, if a first image sensor 302 is coupled to a color CFA and a second image sensor 303 is not coupled to a filter, a first mode may be associated with color imaging (using the first image sensor 302) and a second mode may be associated with grayscale imaging (using the second image sensor 303).

While two image sensors sharing one or two apertures and optical paths are described above, a device may include any number of image sensors sharing any number of apertures and optical paths. For example, the device 300 may include a third optical path shared by the first image sensor 302 and the second image sensor 303. In another example, the device 300 may include a third image sensor to share the first optical path 301. In some further examples, multiple systems of two image sensors sharing an optical path may be included in a device. For example, the device 300 may include four image sensors. The first image sensor 302 and the second image sensor 303 share a first optical path 301. A third image sensor and a fourth image sensor may share a third optical path (similar to the first and second image sensors sharing an optical path). In this manner, the device 300 may have four apertures (including the first aperture 320 and the second aperture 322).

Figure 3G:
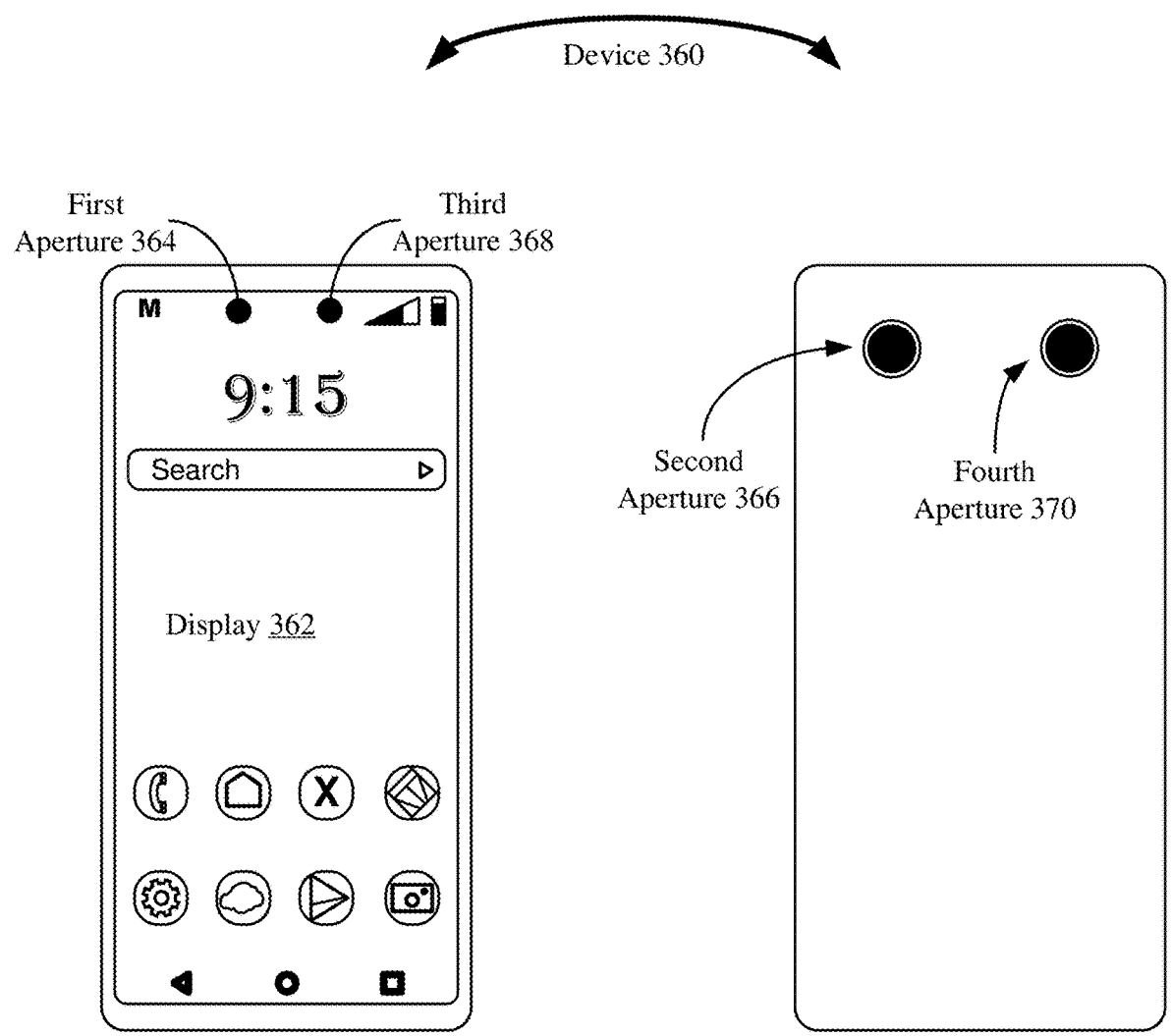
FIG. 3G shows a depiction of a device having a first aperture and a third aperture on a side including a display and a second aperture and a fourth aperture on a side opposite the display.

FIG. 3G shows a depiction of a device 360 having a first aperture 364 and a third aperture 368 on a side including a display 362 and a second aperture 366 and a fourth aperture 370 on a side opposite the display 362. The first aperture 364 and the second aperture 366 may be shared by a first image sensor and a second image sensor (similar to FIG. 3B). In addition, the third aperture 368 and the fourth aperture 370 may be shared by a third image sensor and a fourth image sensor. The first image sensor and the second image sensor may be associated with a first optical element, and the second third image sensor and the fourth image sensor may be associated with a second optical element. In some implementations, a first OE mode of the first optical element corresponds to a first OE mode of the second optical element. In this manner, the optical elements may switch OE modes at the same time.

In some implementations, the third image sensor may be complementary to the first image sensor (such as to assist in performing the 3A operations for the first image sensor), and the fourth image sensor may be complementary to the second image sensor. For example, the first image sensor and the third image sensor may be associated with the same FOV, zoom factor, or depth of field, and the second image sensor may be associated with a different FOV, zoom factor, or depth of field. The fourth image sensor may be associated with the same FOV, zoom factor or depth of field as the second image sensor. The third image sensor and the fourth image sensor may be configured to capture images from the same device side as the first image sensor and the second image sensor, respectively, based on switching OE modes of the optical elements at the same time. In this manner, the complementary image sensor may be used for one or more 3A operations for the first image sensor or the second image sensor.

In some further implementations, the first image sensor and the third image sensor's capture of images may be aligned, and the aligned images may be used for stereoscopic imaging. Similarly, the second image sensor and the fourth image sensor's capture of images may be aligned, and the aligned images may be used for stereoscopic imaging. In this manner, the device 360 may be configured to perform stereoscopic imaging from the front or the rear of the device 360.

In some other implementations, each image sensor may be used for image or video capture. For example, the device 360 may include four device modes. At least a subset of the first image sensor through the fourth image sensor may be associated with a different combination of FOV, zoom factor, depth of field, color image capture, grayscale image capture, or other image capture characteristics. In this manner, a device mode of the four device modes may refer to using one of the image sensors associated with the desired FOV, zoom factor, depth of field, or other capture characteristics.

In some other implementations, the first aperture 364 and the third aperture 368 may be shared by a first image sensor and a second image sensor (similar to FIG. 3C). In addition, the second aperture 366 and the fourth aperture 370 may be shared by a third image sensor and a fourth image sensor (similar to FIG. 3D). In this manner, the device 360 may be configured for three dimensional imaging or wider FOV imaging (as described with reference to FIG. 3D) from both sides of the device 360.

For any of the device configurations in FIG. 3B-FIG. 3G, a zoom factor or a depth of field may be adjustable for a specific image sensor. For example, a first image sensor may be coupled to one or more lenses, and the lens position may be adjusted to change the distance between the first image sensor and the one or more lenses. In another example, the first image sensor may be configured to move with reference to the one or more lenses to adjust the distance. In this manner, a focal length for the first image sensor may be adjustable to adjust the depth of field. Adjusting a lens position is described with reference to FIGS. 7B, 7C, 7E, and 7F below.

As noted herein, which aperture is associated with which image sensor at a specific point in time may be based on an OE mode of the optical element. Switching between OE modes may be based on adjusting the optical element (such as rotating the optical element between different orientations, moving the optical element between different positions, or applying an electrical current or other stimulus to the optical element).

When switching OE modes includes rotating the optical element, the optical element may have a first orientation with reference to light approaching the optical element from a first optical path during a first OE mode, and the optical element may have a second orientation with reference to the light from the first optical path during a second OE mode. A device controller (such as controller 310) is configured to cause the orientation of the optical element to be adjusted when switching between OE modes.

Figure 4A:
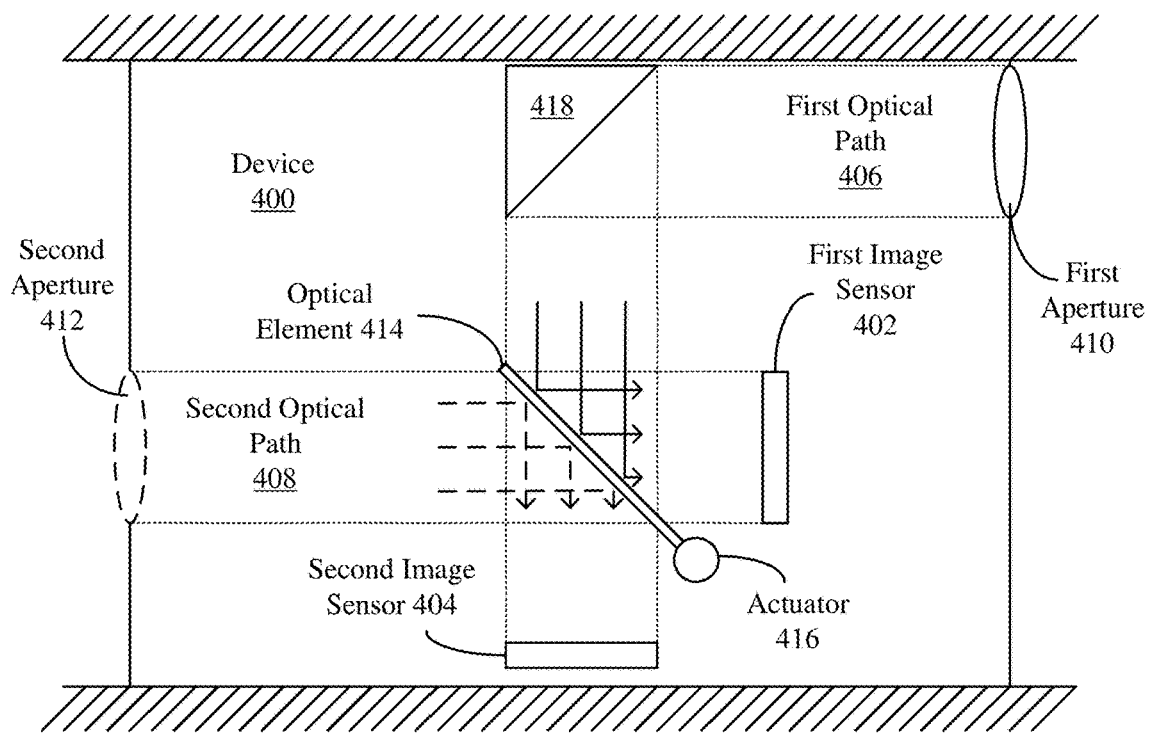
FIG. 4A shows a cross-section of an example device portion illustrating a first image sensor associated with a first optical path.
Figure 4B:
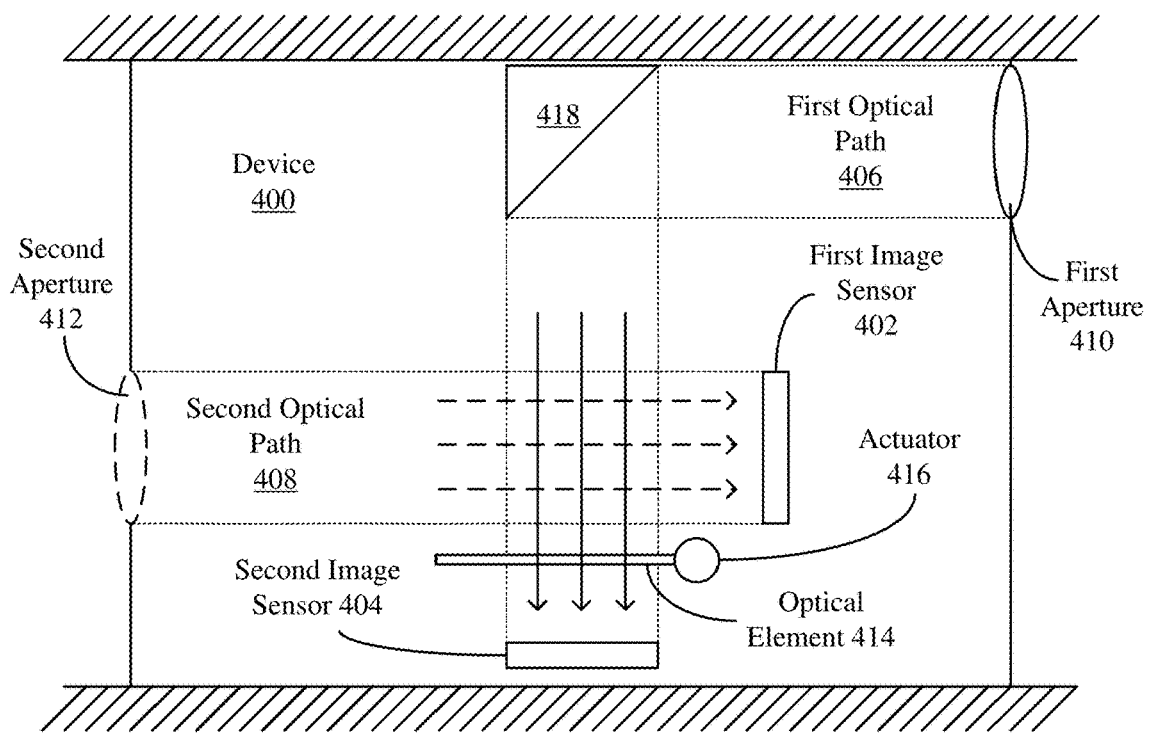
FIG. 4B shows the cross-section of the example device portion in FIG. 4A illustrating a second image sensor associated with the first optical path.

FIG. 4A shows a cross-section of an example device 400 portion illustrating a first image sensor 402 associated with a first optical path 406 during a first OE mode. The first image sensor 402 is associated with the first optical path 406 based on the optical element 414 having a first orientation. FIG. 4B shows the cross-section of the device 400 portion illustrating the second image sensor 404 associated with the first optical path 406 during a second OE mode. The second image sensor 404 is associated with the first optical path 406 based on the optical element 414 having a second orientation.

Referring to FIG. 4A, the optical element 414 is configured to direct light from the first optical path 406 (received via the first aperture 410) to the first image sensor 402. The optical element 414 may refract and/or reflect light in order to direct the light from the first optical path 406 to the first image sensor 402. For example, the optical element 414 may include a reflective surface to reflect light from the first optical path 406 to the first image sensor 402. In another example, the optical element 414 may include a prism of a suitable shape and refractive index to refract light from the first optical path 406 to the first image sensor 402. The first optical path may be coupled to one or more components 418 also configured to direct the light from the first optical path 406. For example, the component 418 may include a reflective surface to direct the light from the first optical path 406 to the optical element 414. The optical element 414 (and any components 418) may be in any suitable orientation and configuration to direct light from the first optical path 406 to the first image sensor 402 during a first OE mode. The device 400 also includes a second image sensor 404. When in a first OE mode, the second image sensor 404 does not receive light from the first optical path 406. In the illustrated example device 400, the optical element 414 blocks the light from the first optical path 406 from reaching the second image sensor 404 (with the light instead being directed to the first image sensor 402).

In some implementations, the device 400 further includes a second aperture 412 coupled to a second optical path 408. The second aperture 412 is illustrated as being on an opposite side of device 400 than the first aperture 410, but the second aperture 412 may be positioned on any suitable side of the device 400. While not shown, the second optical path 408 may be coupled to one or more components configured to direct light from the second optical path 408 to the optical element 414 (such as similar to component 418). The optical element 414 may be configured to refract and/or reflect light in order to direct the light from the second optical path 408 to the second image sensor 404. For example, the optical element 414 may include a second reflective surface to direct the light from the second optical path 408 to the second image sensor 404. In another example, a prism of the optical element 414 may be configured to direct light from the second optical path 408 to the second image sensor 404 based on a shape of the prism and the prism's refractive index.

The optical element 414 may include or be coupled to an actuator 416 to control rotation of the optical element 414. In some implementations, the actuator 416 includes or is coupled to a rotatory motor or other means to move the optical element 414, and the actuator 416 is controlled by a controller (such as controller 310 in FIG. 3A). For example, the controller 310 instructs the actuator 416 to rotate the optical element 414 from a first orientation (such as illustrated in FIG. 4A) to a second orientation when switching from a first OE mode to a second OE mode. The examples in FIGS. 4A and 4B (and later figures) may refer to the orientation of the optical element with reference to a first optical path. While the examples in FIGS. 4A and 4B (and later figures) may refer to the orientation of the optical element with reference to a first optical path, the orientation of the optical element may be with reference to any suitable device component or suitable reference within the device. For example, the orientation may be with reference to an orientation of an image sensor, with reference to an orientation of an emitter, with reference to a direction of light approaching the optical element from an optical path, and so on.

FIG. 4B shows the cross-section of the device 400 portion in FIG. 4A with the optical element 414 having an example second orientation for a second OE mode. During the second OE mode, the device 400 is configured to direct light from the first optical path 406 to the second image sensor 404. If the device 400 includes a second aperture 412 coupled to a second optical path 408, the device 400 is also configured to direct light from the second optical path 408 to the first image sensor 402.

In some implementations, the optical element 414 may be perpendicular with reference to light received from the first optical path 406 (within a tolerance) during the second OE mode. While FIG. 4B illustrates one example orientation of the optical element 414 for the second OE mode, any suitable orientation may be used. For example, in some other implementations, the second orientation causes the optical element 414 to be perpendicular to light from the second optical path 408. In some other implementations, the second orientation causes the optical element 414 to be oriented such that light from the first optical path 406 and light from the second optical path 408 are not directed to the optical element 414. For example, the second orientation may be on the opposite side of the actuator 416 with reference to the first orientation. In this manner, the actuator may rotate the optical element 414 180 degrees when switching between the first OE mode and the second OE mode.

In some implementations, the optical element 414 may include a refractive index, reflectiveness, or transparency that is based on the orientation of the optical element 414 with reference to light approaching the optical element 414 (such as from the first optical path 406). For example, the optical element 414 may be reflective for light that approaches the optical element 414 in the first orientation, and the optical element 414 may be transparent for light that approaches the optical element 414 in the second orientation. For example, the optical element 414 is transparent to light approaching the optical element 414 at a zero angle of incidence (as illustrated in FIG. 4B), and the optical element 414 is reflective to light approaching the optical element 414 at a non-zero angle of incidence (such as a 45 degree angle of incidence as illustrated in FIG. 4A).

In some implementations, the optical element 414 is a transparent material or substrate (such as glass, transparent plastic, and so on) coated on at least one side to create a reflective surface. The coating (also referred to as an optical coating) may include a film causing a different angle of refraction based on the angle of incidence of light approaching the film. For example, the film may be associated with a critical angle for refraction of light from the first optical path 406 when the optical element 414 is in a first orientation with reference to the first optical path 406, and the film may be associated with a zero angle of refraction for light from the first optical path 406 when the optical element 414 is in a second orientation with reference to the first optical path 406. The optical coatings may be any suitable material. In some implementations, the optical coatings may include a combination of thin layers of materials (such as oxides, metals, and so on). The performance of an optical coating (such as reflectiveness, transparency, critical angle, and so on) may be based on the number of layers, the thickness of each layer, and the refractive index difference between layers. For example, an optical coating may be created by depositing thin films of dielectric and metallic materials on a transparent substrate (such as glass) in an alternating manner. The materials may alternate between a higher refraction index and a lower refraction index. Example thin films may include magnesium fluoride ($MgF_2$), tantalum pentoxide ($Ta_2O_5$), and aluminum oxide ($Al_2O_3$).

Based on the variable refractive indexes of the coatings and based on an angle of incidence of incoming light, the optical element 414 may be configured to direct light from the first optical path 406 to the first image sensor 402 (as illustrated in FIG. 4A), and the optical element 414 may be configured to allow light from the first optical path 406 to pass through it to the second image sensor 404 (as illustrated in FIG. 4B). If the device 400 includes the second aperture 412 coupled to the second optical path 408, the optical element 414 may include a similar coating on a second side. In this manner, the optical element 414 may be configured to direct light from the second optical path 408 to the second image sensor 404 (as illustrated in FIG. 4A), and the optical element 414 may be configured to allow light from the first optical path 406 to pass through it to the second image sensor 404 (as illustrated in FIG. 4B).

Figure 4C:
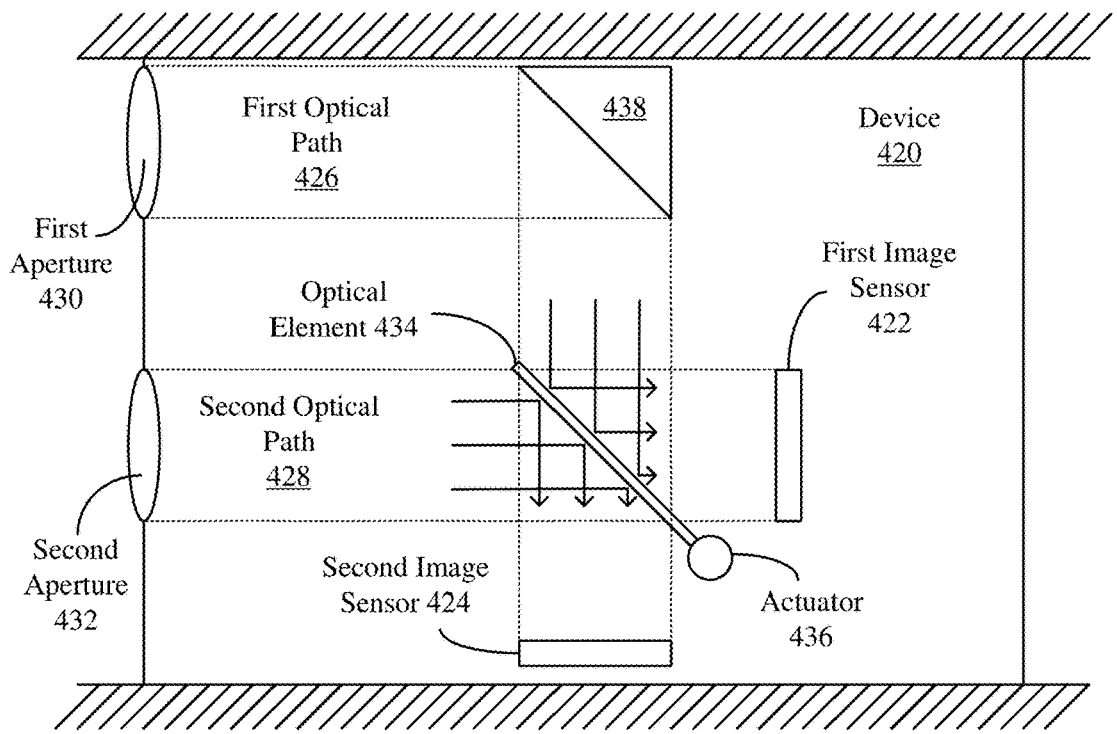
FIG. 4C shows a cross-section of an example device portion illustrating a first image sensor associated with a first optical path.
Figure 4D:
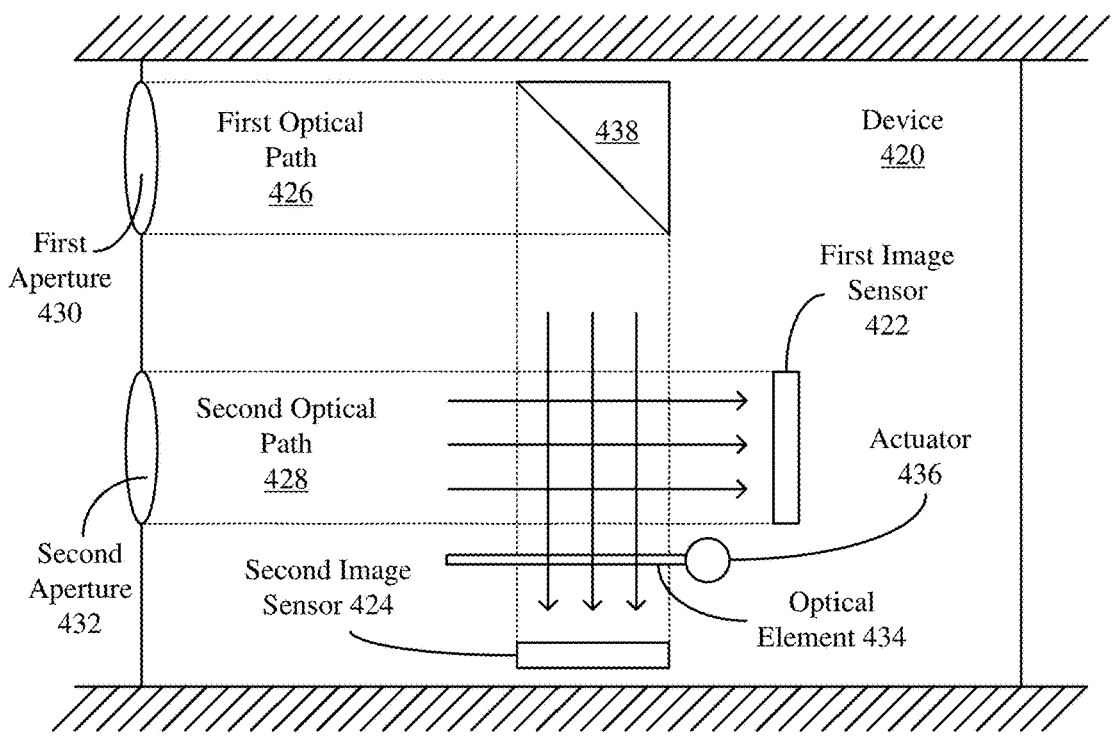
FIG. 4D shows the cross-section of the example device portion in FIG. 4C illustrating a second image sensor associated with the first optical path.

FIGS. 4A and 4B illustrate the first aperture 410 and the second aperture 412 being on different sides of the device 400. In some implementations, the apertures may be on the same side of the device, such as illustrated in FIG. 4C and FIG. 4D. FIG. 4C shows a cross-section of an example device portion illustrating a first image sensor 422 associated with a first optical path 426. FIG. 4D shows the cross-section of the example device portion illustrating a second image sensor 424 associated with the first optical path 426. The device 420 may be similar to the device 400 other than the first aperture 430 being on the same side of the device 420 as the second aperture 432. In this manner, the first image sensor 422 may be similar to the first image sensor 402, the second image sensor 424 may be similar to the second image sensor 404, the first optical path 426 may be similar to the first optical path 406, the second optical path 428 may be similar to the second optical path 408, the optical element 434 may be similar to the optical element 414, and the actuator 436 may be similar to the actuator 416. The device 420 may include one or more suitable components 438 for directing light in the device 420. FIGS. 4A and 4B may illustrate example component configurations for device 330 in FIG. 3B, and FIGS. 4C and 4D may illustrate example component configurations for device 335 in FIG. 3C or for device 340 in FIG. 3D.

Figure 4E:
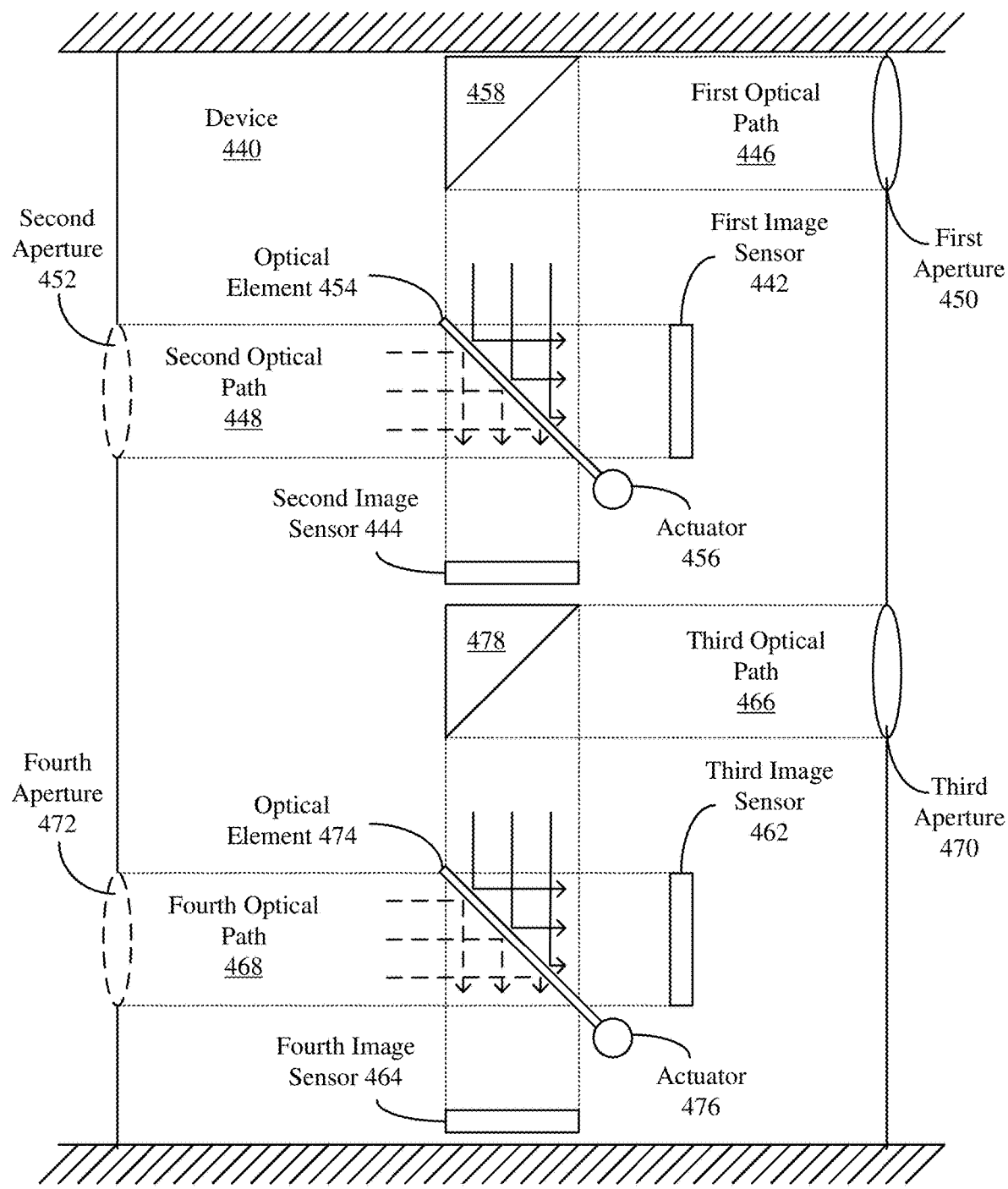
FIG. 4E shows a cross-section of an example device portion illustrating a first image sensor associated with a first optical path and a third image sensor associated with a third optical path.

As noted herein, a device may include multiple systems for image sensors to share an optical path. For example, a device may include multiple instances of the components in FIG. 4A (or multiple instances of the components in FIG. 4C). FIG. 4E shows a cross-section of an example device portion illustrating a first image sensor 442 associated with a first optical path 446 and a third image sensor 462 associated with a third optical path 466. The optical element 454 may direct light from the first optical path 446 to the first image sensor 442 based on the optical element 454 being in a first orientation with reference to the first optical path 446. The optical element 474 may direct light from the third optical path 466 to the third image sensor 462 based on the optical element 474 being in a first orientation with reference to the third optical path 466. In some implementations, the optical element 454 may also direct light from the second optical path 448 to the second image sensor 444 based on the optical element 454 being in the first orientation, and the optical element 474 may direct light from the third optical path 466 to the third image sensor 462 based on the optical element 474 being in the first orientation. Comparing FIG. 4E to FIG. 4A, the components 458 and 478 may be similar to component 418, the optical elements 454 and 474 may be similar to optical element 414, and the actuators 456 and 476 may be similar to actuator 416.

Figure 4F:
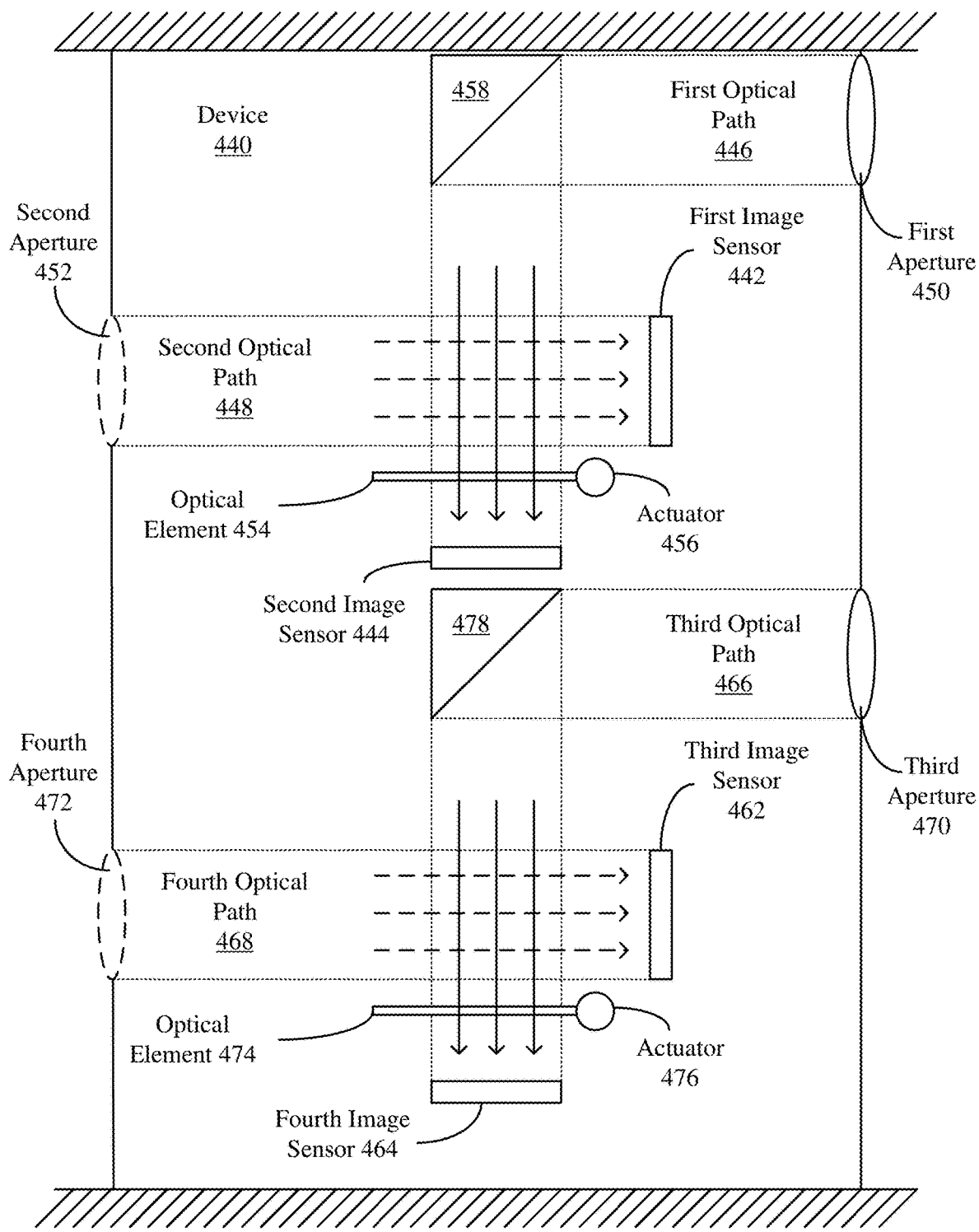
FIG. 4F shows the cross-section of the example device portion in FIG. 4E illustrating a second image sensor associated with the first optical path and a fourth image sensor associated with the third optical path.

FIG. 4F shows the cross-section of the example device portion illustrating the second image sensor 444 associated with the first optical path 446 and the third image sensor 462 associated with the third optical path 466. The optical element 454 (in a second orientation with reference to the first optical path 446) may allow light from the first optical path 446 to reach the second image sensor 444, and the optical element 474 (in a second orientation with reference to the third optical path 466) may allow light from the third optical path 466 to reach the fourth image sensor 464. In some implementations, the optical element 454 may also allow light from the second optical path 448 to reach the first image sensor 442, and the optical element 474 may allow light from the fourth optical path 468 to reach the third image sensor 462. Comparing FIG. 4F to FIG. 4B, the components 458 and 478 may be similar to component 418, the optical elements 454 and 474 may be similar to optical element 414, and the actuators 456 and 476 may be similar to actuator 416.

In some implementations, one optical element may be shared by the image sensors 442, 444, 462, and 464. For example, the image sensors may be positioned such that one larger optical element may be rotated to direct light as shown in FIG. 4E or FIG. 4F. In some other implementations, the first aperture 450 and the second aperture 452 may be on the same side of the device 440, and/or the third aperture 470 and the fourth aperture 472 may be on the same side of the device 440.

FIGS. 5A-7F depict a device including a second aperture and a second optical path. However, the depictions are for clarity in explaining aspects of the disclosure. As shown in FIGS. 3A-4B, a device is not required to include the second aperture and the second optical path. Additionally, while one instance of a shared optical path between image sensors is shown in FIGS. 5A-7F, any number of instance may be included in a device (such as illustrated in FIGS. 4E and 4F). For example, instead of rotating the multiple optical elements in FIG. 4E, the multiple optical elements may both be translationally moved, have an electrical current applied, or adjusted in another manner. How the different optical elements in the different instances change states may be different or the same (such as one being rotated and one being translationally moved). As such, the disclosure (including the examples depicted in FIGS. 5A-7B) is not limited to requiring a second aperture and second optical path or to only one instance of multiple image sensors sharing an optical path.

Figure 5A:
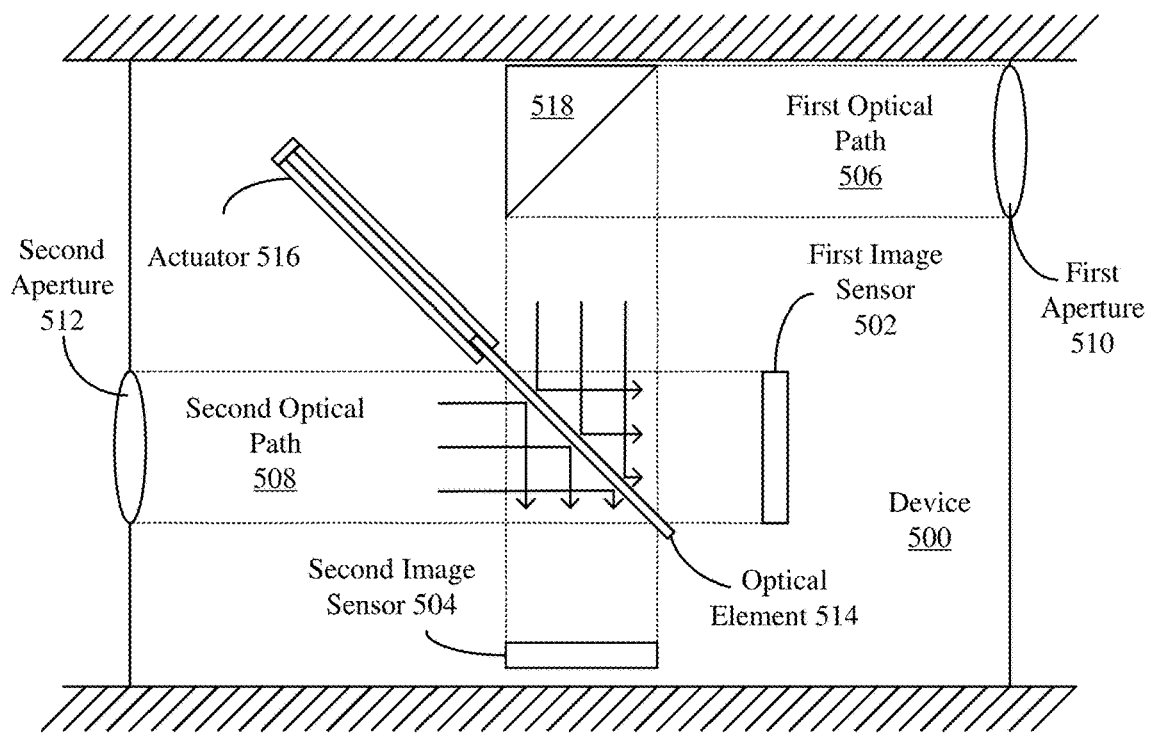
FIG. 5A shows a cross-section of an example device portion illustrating a first image sensor associated with a first optical path when the device is in a first OE mode.
Figure 5B:
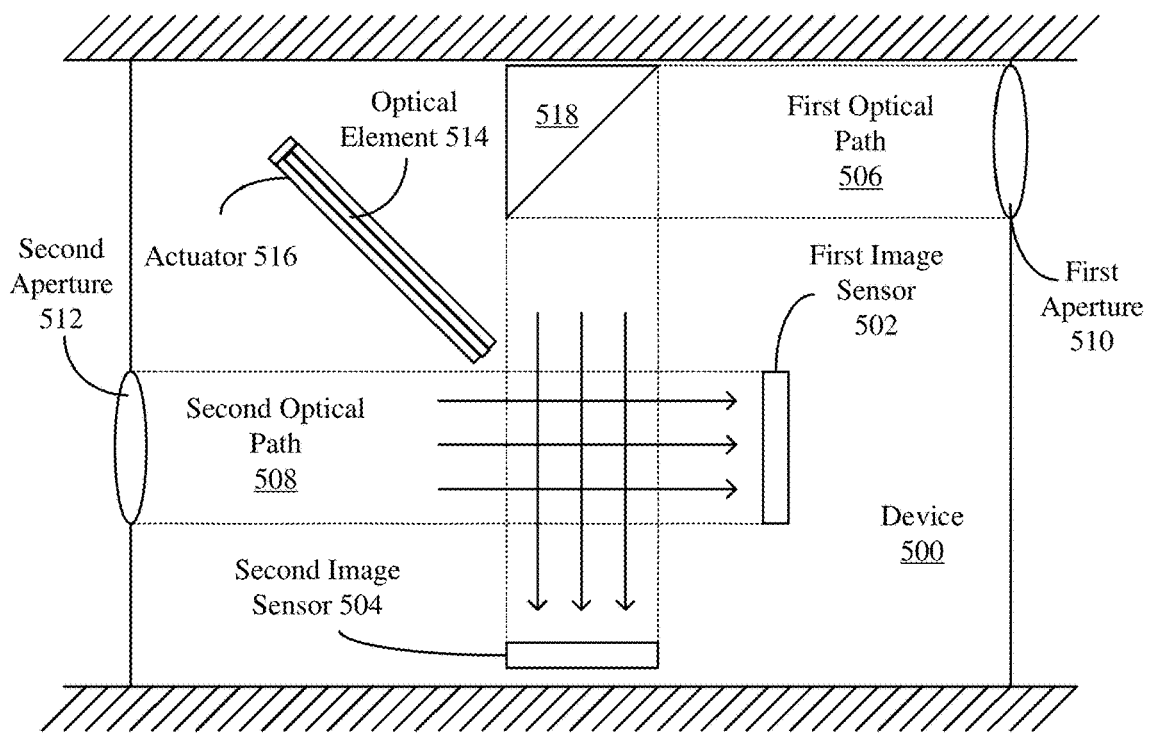
FIG. 5B shows the cross-section of the example device portion in FIG. 5A illustrating a second image sensor associated with the first optical path when the device is in a second OE mode.

In some implementations, the optical element may be at a first position in the device during a first OE mode, and the optical element may be at a second position in the device during a second OE mode. A device controller (such as controller 310 in FIG. 3A) is configured to cause the optical element to be translationally moved between the first position and the second position when switching between OE modes. FIG. 5A shows a cross-section of an example device 500 portion illustrating a first image sensor 502 associated with a first optical path 506 when the device is in a first mode. The first image sensor 502 is associated with the first optical path 506 based on the optical element 514 being at a first position in the device 500. FIG. 5B shows the cross-section of the example device 500 portion illustrating the second image sensor 504 associated with the first optical path 506 when the device 500 is in a second mode. The second image sensor 504 is associated with the first optical path 506 based on the optical element 514 being at a second position in the device 500.

Referring to FIG. 5A, the optical element 514 is configured to direct light from the first optical path 506 (received via the first aperture 510) to the first image sensor 502 during a first OE mode. If the device 500 includes a second aperture 512 configured to direct light along a second optical path 508, the optical element 514 may be configured to direct light from the second optical path 508 to the second image sensor 504 during the first OE mode. In some implementations, the optical element 514 may be constructed similar to the optical element 414 in FIGS. 4A and 4B. For example, the optical element 514 may include a transparent substrate coated on one or more sides with a film to direct light. In some other implementations, the optical element 514 may include a one sided mirror or a two sided mirror, a prism, or other suitable object for directing light. Similar to FIGS. 4A and 4B, the device 500 may include one or more components 518 configured to direct light from the first optical path 506 (or the second optical path 508) to the optical element 514.

The optical element 514 may include or be coupled to an actuator 516 to move the optical element 514 from the first position to a second position when switching device modes. In some implementations, the actuator 516 includes or is coupled to a motor (such as a magnetic motor or stepper motor) to move the optical element 514, and the actuator 516 is controlled by a controller (such as controller 310 in FIG.

3A). For example, the controller 310 controls the actuator 516 to cause the optical element 514 to be moved from a first position (such as illustrated in FIG. 5A) to a second position when switching from a first OE mode to a second OE mode. In some implementations, the optical element 514 may be magnetic, and the actuator 516 include or be coupled to one or more magnets for which a magnetic force is adjusted to attract or repel the optical element 514. In some other implementations, the actuator 516 may include or be coupled to a spring system, a pulley system, or other mechanical means to move the optical element 514 between positions in the device 500.

FIG. 5B shows the cross-section of the device 500 portion in FIG. 5A with the optical element 514 at an example second position in the device 500. During the second OE mode, the device 500 is configured to direct light from the first optical path 506 to the second image sensor 504. If the device 500 includes a second aperture 512 coupled to a second optical path 508, the device 500 is also configured to direct light from the second optical path 508 to the first image sensor 502. For example, the second position of the optical element 514 may be configured such that the optical element 514 is not in the path of light from the first aperture 510 and is not in the path of light received from the second aperture 512.

Figure 5C:
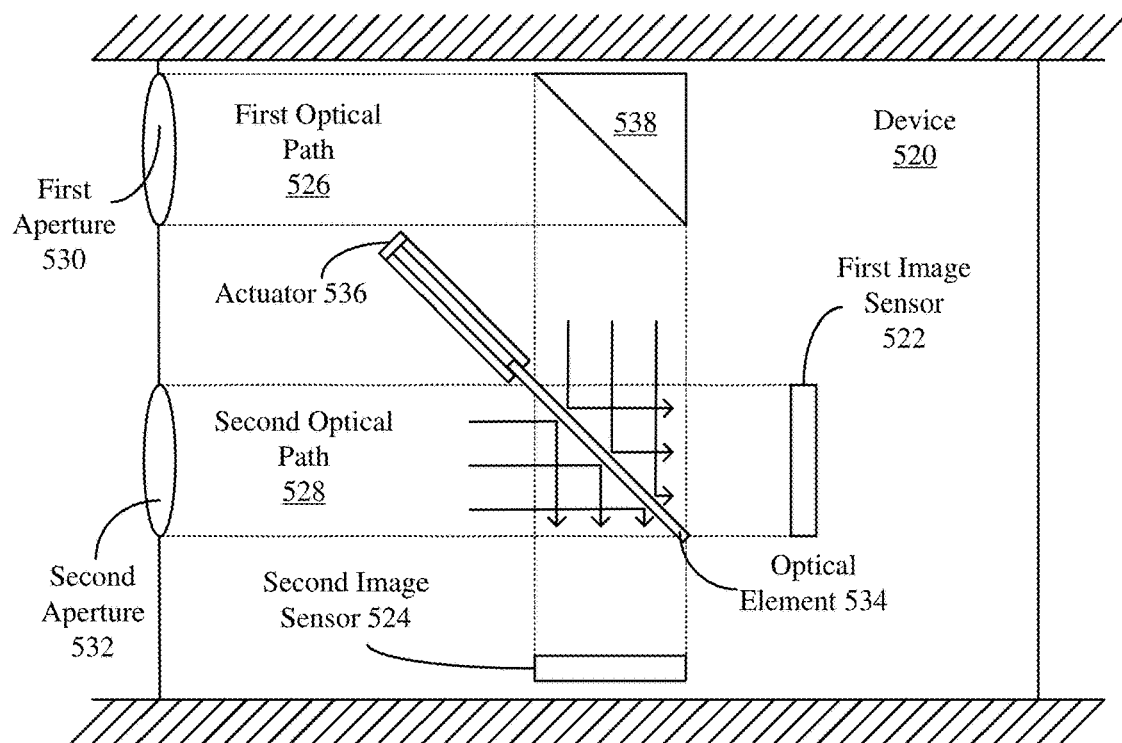
FIG. 5C shows a cross-section of an example device portion illustrating a first image sensor associated with a first optical path.
Figure 5D:
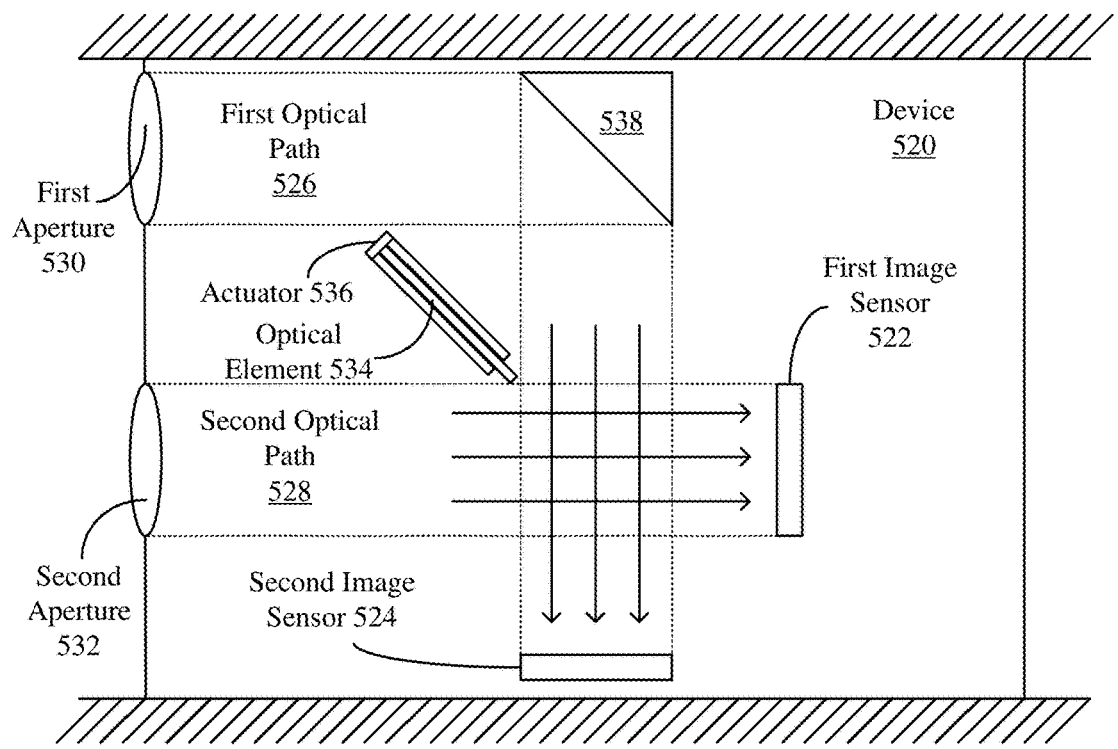
FIG. 5D shows the cross-section of the example device portion in FIG. 5C illustrating a second image sensor associated with the first optical path.

FIGS. 5A and 5B illustrate the first aperture 510 and the second aperture 512 being on different sides of the device 500. Similar to FIGS. 4C and 4D, the apertures may be on the same side of the device, such as illustrated in FIG. 5C and FIG. 5D. FIG. 5C shows a cross-section of an example device portion illustrating a first image sensor 522 associated with a first optical path 526. FIG. 5D shows the cross-section of the example device portion illustrating a second image sensor 524 associated with the first optical path 526. The device 520 may be similar to the device 500 other than the first aperture 530 being on the same side of the device 520 as the second aperture 532. In this manner, the first image sensor 522 may be similar to the first image sensor 502, the second image sensor 524 may be similar to the second image sensor 504, the first optical path 526 may be similar to the first optical path 506, the second optical path 528 may be similar to the second optical path 508, the optical element 534 may be similar to the optical element 514, and the actuator 536 may be similar to the actuator 516. The device 520 may include one or more suitable components 538 for directing light in the device 520. FIGS. 5A and 5B may illustrate example component configurations for device 330 in FIG. 3B, and FIGS. 5C and 5D may illustrate example component configurations for device 335 in FIG. 3C or for device 340 in FIG. 3D.

Figure 6A:
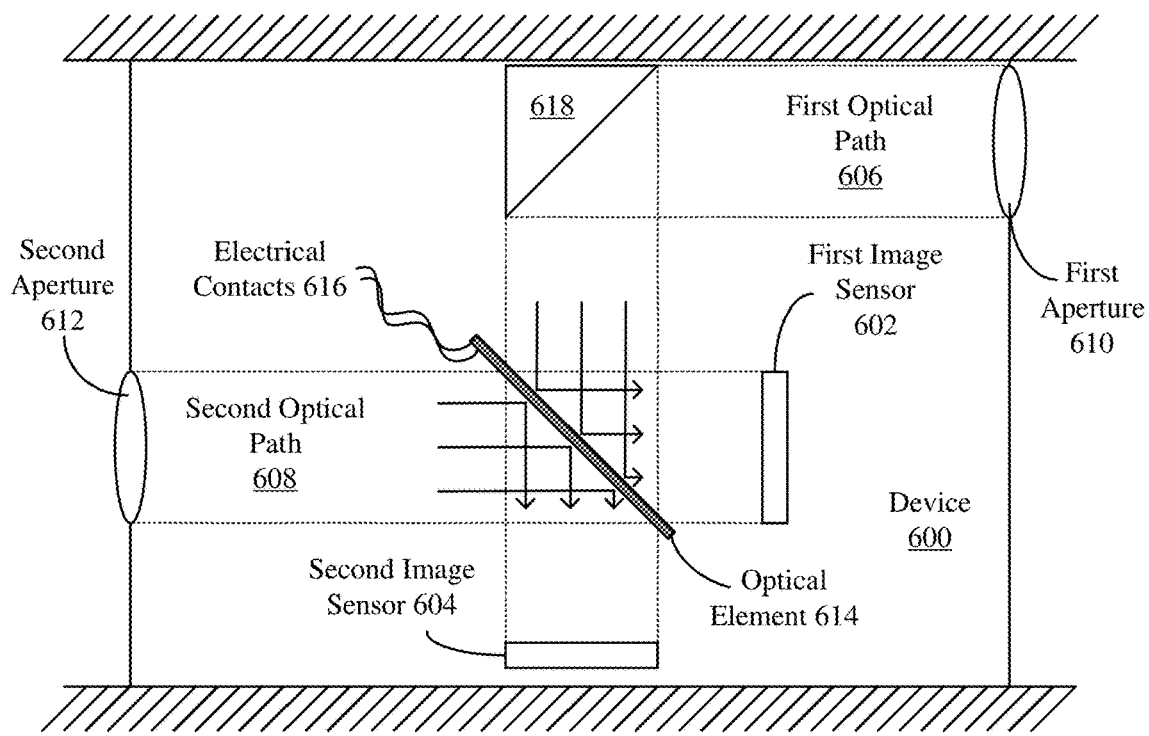
FIG. 6A shows a cross-section of an example device portion illustrating a first image sensor associated with a first optical path.
Figure 6B:
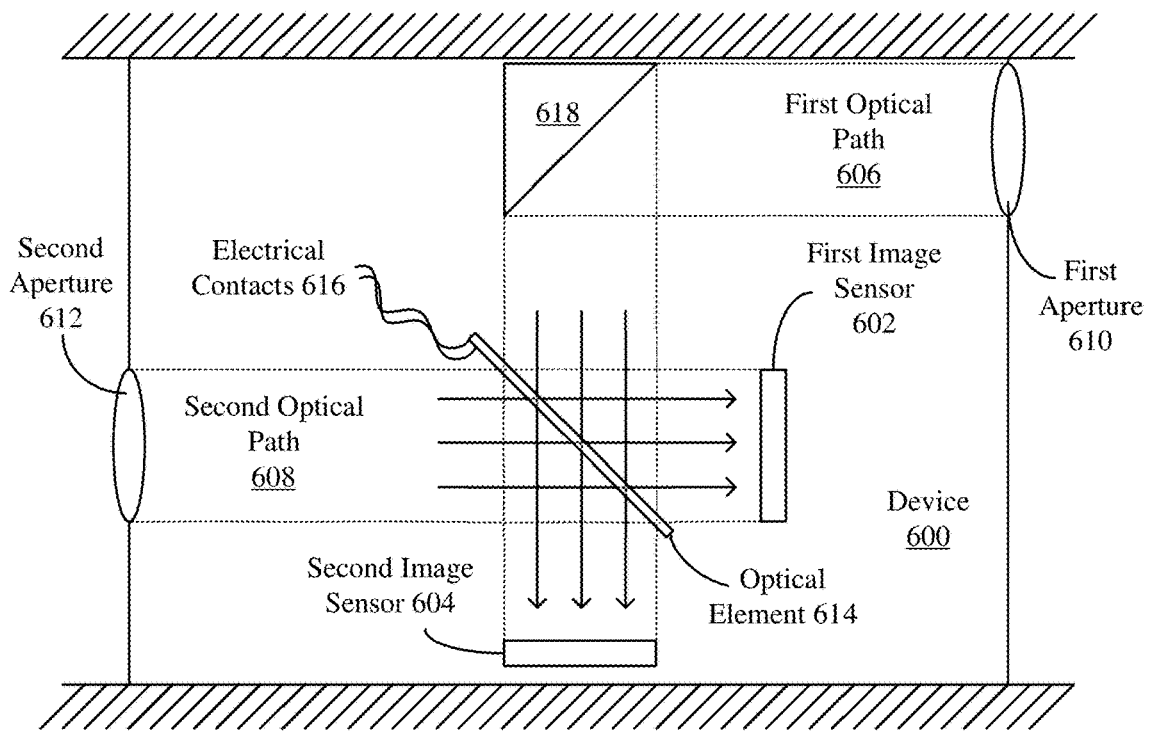
FIG. 6B shows the cross-section of the example device portion in FIG. 6A illustrating a second image sensor associated with the first optical path.

In some implementations, a transparency and a reflectiveness (or a refractive index) of the optical element is based on an electrical current applied to the optical element. For example, the optical element may be transparent when an electrical current is not applied to the optical element, and the optical element may be reflective and/or refractive when an electrical current is applied to the optical element. In this manner, the optical element may be coupled to an electrical current source (such as a power rail), and the electrical current source or means for directing electrical current from the electrical current source to the optical element (such as a switch) may be controlled by a device controller (such as controller 310 in FIG. 3A). FIG. 6A shows a cross-section of an example device 600 portion illustrating a first image sensor 602 associated with a first optical path 606. The first image sensor 602 is associated with the first optical path 606 based on whether an electrical current is applied to the optical element 614. FIG. 6B shows the cross-section of the example device 600 portion illustrating the second image sensor 604 associated with the first optical path 606. The second image sensor 604 is associated with the first optical path 606 based on whether an electrical current is applied to the optical element 614.

Referring to FIG. 6A, the optical element 614 is configured to direct light from the first optical path 606 (received via the first aperture 610) to the first image sensor 602 during a first OE mode. The device 600 may also include one or more components 618 configured to direct light to/from/along the first optical path 606. If the device 600 includes a second aperture 612 configured to direct light along a second optical path 608, the optical element 614 may be configured to direct light from the second optical path 608 to the second image sensor 604 during the first OE mode. The optical element 614 may be constructed such that a transparency and a reflectiveness (or a refractive index) of the optical element 614 is based on whether an electrical current is applied to the optical element 614 (such as via electrical contacts 616 that may be controlled by a device controller (such as controller 310 in FIG. 3A)).

In some implementations, the optical element 614 may include a switchable mirror that switches between transparency and reflectiveness based on an electrical current applied (referred to herein as a variable transmittance glass). An example implementation of a variable transmittance glass includes a magnesium nickel (Mg—Ni) alloy encasing a hydrogen ($H_2$) gas. When an electrical current is applied to the Mg—Ni alloy, the alloy absorbs the hydrogen gas and becomes transparent. When the electrical current is removed from the Mg—Ni alloy, the alloy dispels the hydrogen gas and becomes reflective. Another example variable transmittance glass includes a suspended particle device (SPD). An SPD may include nanometer scale particles suspended in a liquid. When an electrical current is applied to the SPD, the particles arrange in a similar orientation/align to allow light to pass through the SPD. When the electrical current is removed from the SPD, the particles unalign (such as return to their previous orientations), and the SPD becomes reflective. For example, the particles may be reflective and in a random orientation in a transparent liquid when an electrical current is not applied so as to be reflective. When an electrical current is applied, the particles may align such that a surface area of each particle is reduced or minimized from the perspective of light reaching the SPD (allowing the light to pass through the transparent liquid). The SPD may include a thin film applied to a transparent substrate (such as glass). Some other implementations of a variable transmittance glass include an electrochromic mirror. An electrochromic mirror changes states between transparent and opaque (such as reflective) when a burst of electrical current is applied to the mirror. For example, an electrochromic mirror may include lithium ions that change orientations each time a burst of electrical current is applied to the mirror.

While the optical element 614 is illustrated as changing states based on an electrical current applied to the optical element 614, other example optical elements may switch states based on other stimuli. For example, state changes of the optical element may be based on a change in temperature (such as applying heat), a change in magnetism, a change in pressure, and so on. Therefore, the stimulus to cause a state change in the optical element is not limited to electrical current.

The optical element 614 may include or be coupled to electrical contacts 616 to apply electrical current to the optical element 614 (either to maintain the optical element 614 in a specific state or to cause the optical element 614 to change states). In some implementations, the electrical contacts 616 are coupled to a power rail or other electrical current source, and application of the electrical current may be controlled by a switch between the source and the electrical contacts 616. The switch may be controlled by a controller (such as controller 310 in FIG. 3A). In some examples, the controller 310 may control switching the optical element 614 between being reflective for a first OE mode and transparent for a second OE mode.

FIG. 6B shows the cross-section of the device 600 portion in FIG. 6A with the optical element 614 in a transparent state. During the second OE mode, the device 600 is configured to direct light from the first optical path 606, through the optical element 614, and to the second image sensor 604. If the device 600 includes a second aperture 612 configured to direct light along a second optical path 608, the device 600 is also configured to direct light from the second optical path 608, through the optical element 614, and to the first image sensor 602.

Figure 6C:
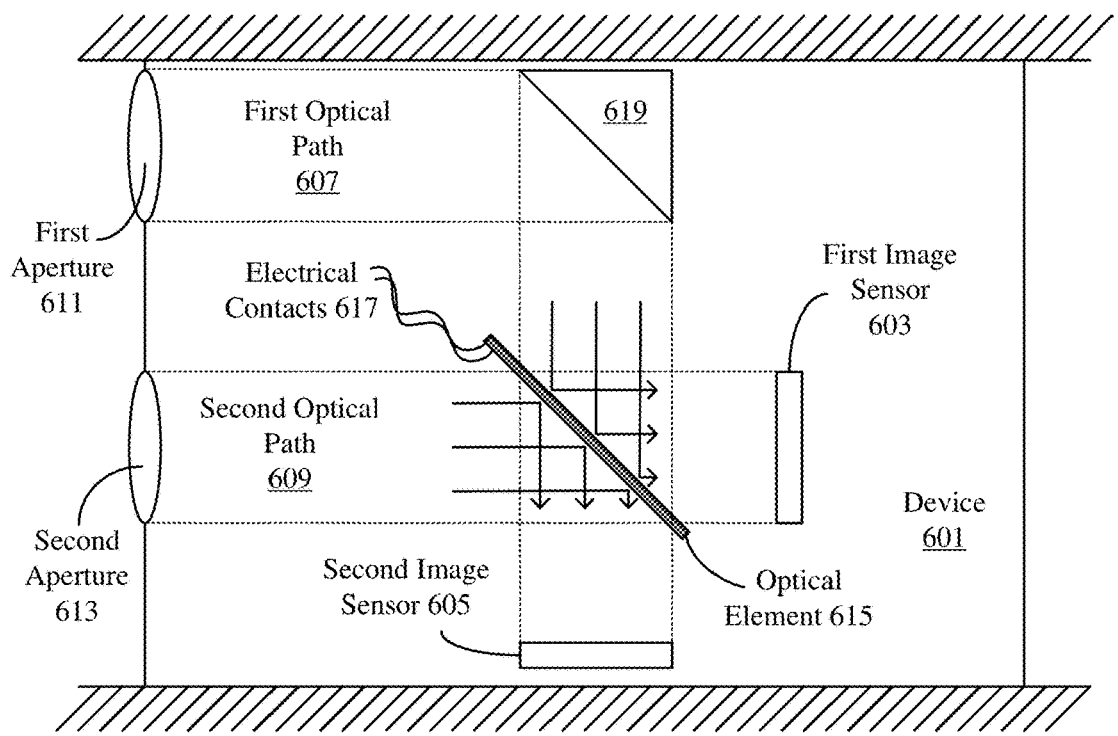
FIG. 6C shows a cross-section of an example device portion illustrating a first image sensor associated with a first optical path.
Figure 6D:
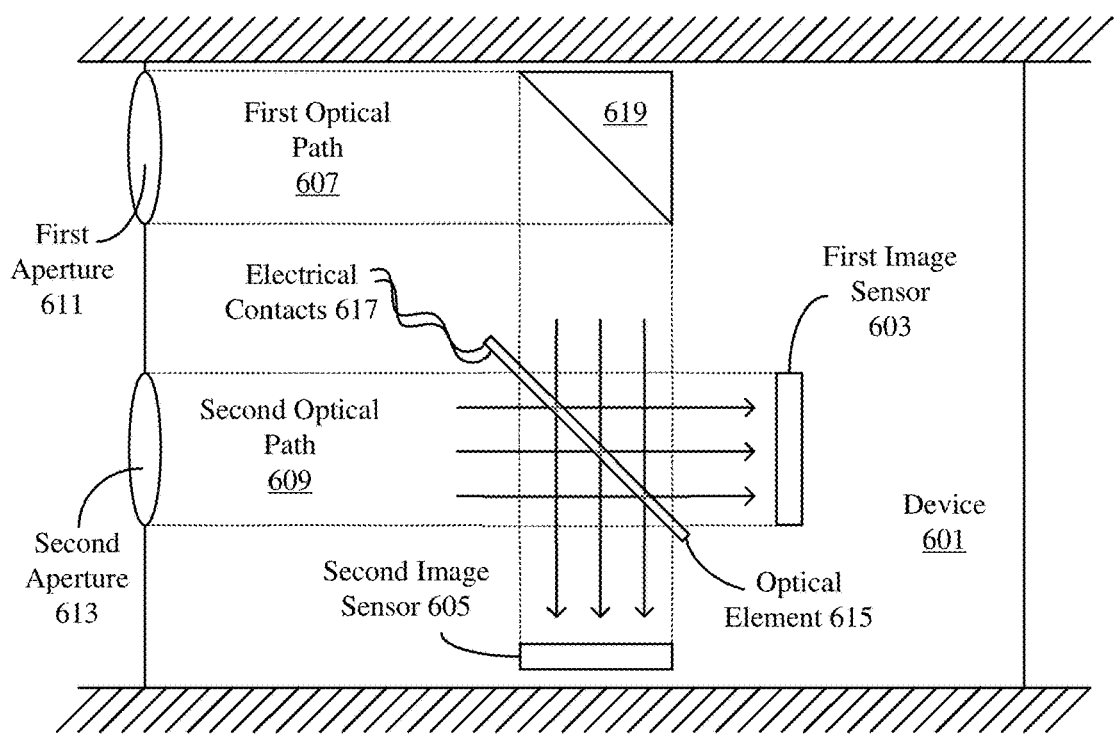
FIG. 6D shows the cross-section of the example device portion in FIG. 6C illustrating a second image sensor associated with the first optical path.

FIGS. 6A and 6B illustrate the first aperture 610 and the second aperture 612 being on different sides of the device 600. Similar to FIGS. 4C and 4D, the apertures may be on the same side of the device, such as illustrated in FIG. 6C and FIG. 6D. FIG. 6C shows a cross-section of an example device portion illustrating a first image sensor 603 associated with a first optical path 607. FIG. 6D shows the cross-section of the example device portion illustrating a second image sensor 605 associated with the first optical path 607. The device 601 may be similar to the device 600 other than the first aperture 611 being on the same side of the device 601 as the second aperture 613. In this manner, the first image sensor 603 may be similar to the first image sensor 602, the second image sensor 605 may be similar to the second image sensor 604, the first optical path 607 may be similar to the first optical path 606, the second optical path 609 may be similar to the second optical path 608, the optical element 615 may be similar to the optical element 614, and the electrical contacts 617 may be similar to the electrical contacts 616. The device 601 may include one or more suitable components 619 for directing light in the device 601. FIGS. 6A and 6B may illustrate example component configurations for device 330 in FIG. 3B, and FIGS. 6C and 6D may illustrate example component configurations for device 335 in FIG. 3C or for device 340 in FIG. 3D.

FIGS. 6E-6H show other example implementations of an optical element for switching between OE modes. In some implementations, the cross-sections may be from a top of a device. For example, the cross-section may be from a top of a smartphone in a portrait mode. In this manner, the one or more image sensors may be perpendicular to a front and rear of the device (such as a front and rear of a smartphone). However, the one or more image sensors may be positioned on any suitable plane with reference to the device. For example, the cross-section may be from a side of the device (such as a side of a smartphone in a portrait mode), and the one or more image sensors may be parallel to a top and a bottom of the device. In another example, the cross-section may be from a front of the device (such as a front of a smartphone including a display), and the one or more image sensors may be parallel to a top of the device, parallel to a side of the device bordering the top, or oriented along plane between the plane for the top of the device and the plane for the side of the device. The present disclosure is not limited to a specific orientation of the one or more image sensors in the device. Similarly for FIGS. 4A-7F, the present disclosure is not limited to a specific orientation of the one or more image sensors in a device.

Figure 6E:
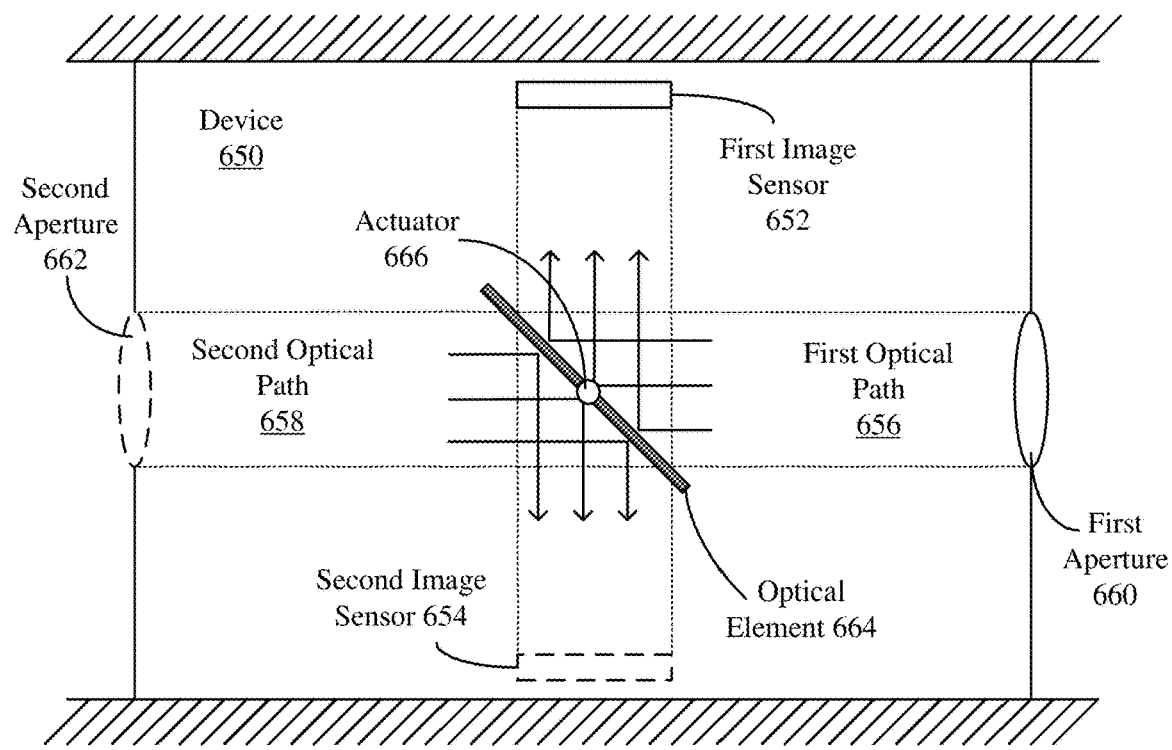
FIG. 6E shows a cross-section of an example device portion illustrating a first image sensor associated with a first optical path.

FIG. 6E shows a cross-section of an example device portion illustrating a first image sensor 652 associated with a first optical path 656. A first aperture 660 is configured to direct light along a first optical path 656, and a second aperture 662 may be configured to direct light along a second optical path 658. The optical element 664, in a first orientation with reference to the first optical path 656 for a first OE mode, directs light from the first optical path 656 to the first image sensor 652.

In some implementations, the example device 650 includes a first image sensor 652 shared by at least two apertures 660 and 662. In some other implementations, the first image sensor 652 and an optional second image sensor 654 may share one or more apertures (such as the aperture 660 and an optional aperture 662). For an example device including both image sensors 652 and 654 and both apertures 660 and 662, the optical element 664 may direct light from the second optical path 658 to the second image sensor 654 for the first OE mode. The optical element 664 may be similar to the optical element 414 in FIG. 4A.

Figure 6F:
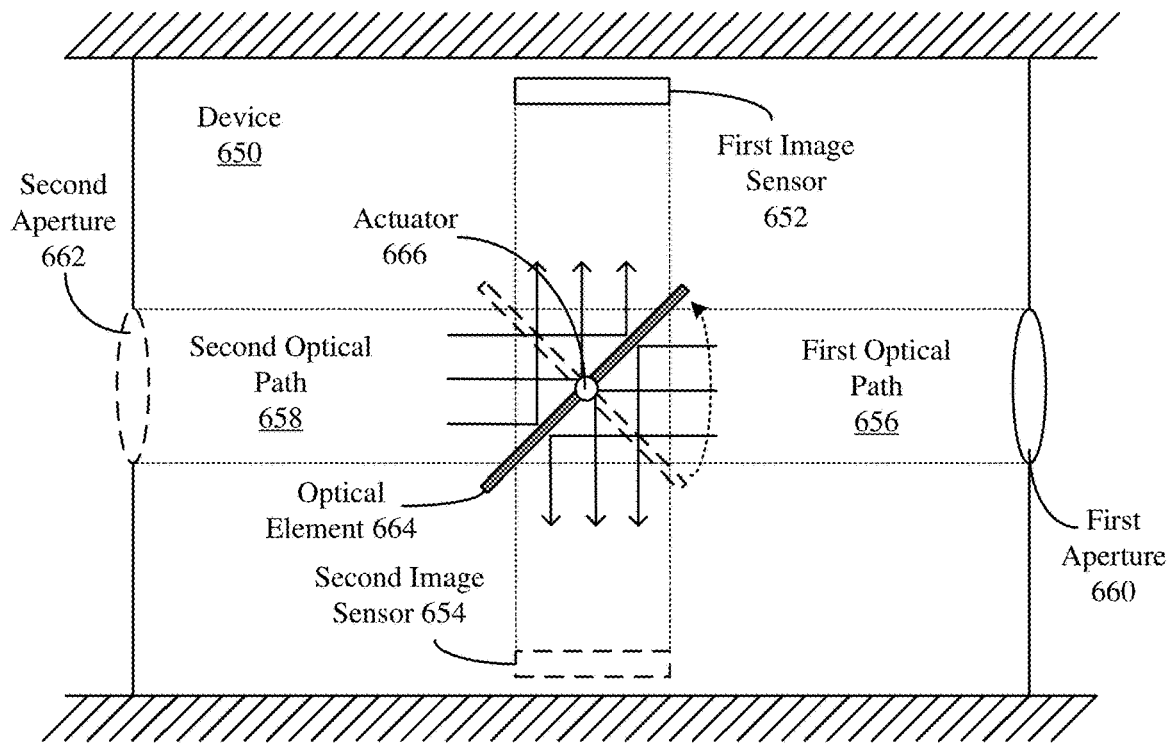
FIG. 6F shows the cross-section of the example device portion in FIG. 6E illustrating the first image sensor associated with a second optical path.

In switching between a first OE mode and a second OE mode, the actuator 666 may rotate the optical element 664 to a second orientation with reference to the first optical path 656. The actuator 666 may be similar to the actuator 416 in FIG. 4A, except the actuator 666 rotates the optical element 664 along an axis towards a center of the optical element 664 (instead of an axis towards one end of the optical element). FIG. 6F shows the cross-section of the example device portion illustrating the first image sensor 652 associated with the second optical path 658. If the device 650 includes a second aperture 662, the optical element 664, in the second orientation for a second OE mode, is configured to direct light from the second optical path 658 to the first image sensor 652. If the device 650 includes a second image sensor 654, the optical element 664, in the second orientation for a second OE mode, may be configured to direct light from the first optical path 656 to the second image sensor 654. In some other implementations, the optical element may be a prism or other object that is moved or rotated to switch between OE modes.

Figure 6G:
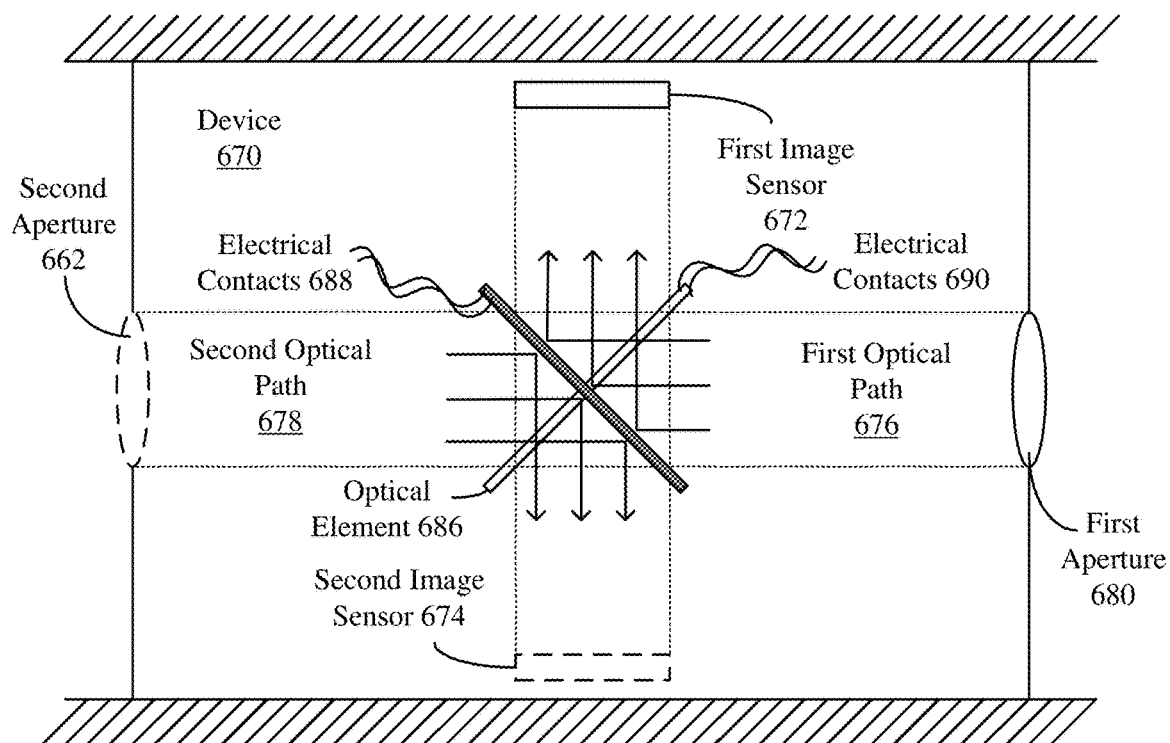
FIG. 6G shows a cross-section of an example device portion illustrating a first image sensor associated with a first optical path.

In some implementations, instead of rotating the optical element, the optical element may be a prism or other structure configured to direct light based on a stimulus applied to the optical element. FIG. 6G shows a cross-section of an example device portion illustrating a first image sensor 672 associated with a first optical path 676. The device 670 may be similar to the device 650 in FIG. 6E other than the type of optical element used. In this manner, the first image sensor 672 may be similar to the first image sensor 652, the optional second image sensor 674 may be similar to the optional second image sensor 654, the first optical path 676 may be similar to the first optical path 656, the optional second optical path 678 may be similar to the optional second optical path 658, the first aperture 680 may be similar to the first aperture 660, and the optional second aperture 682 may be similar to the optional second aperture 662.

Figure 6H:
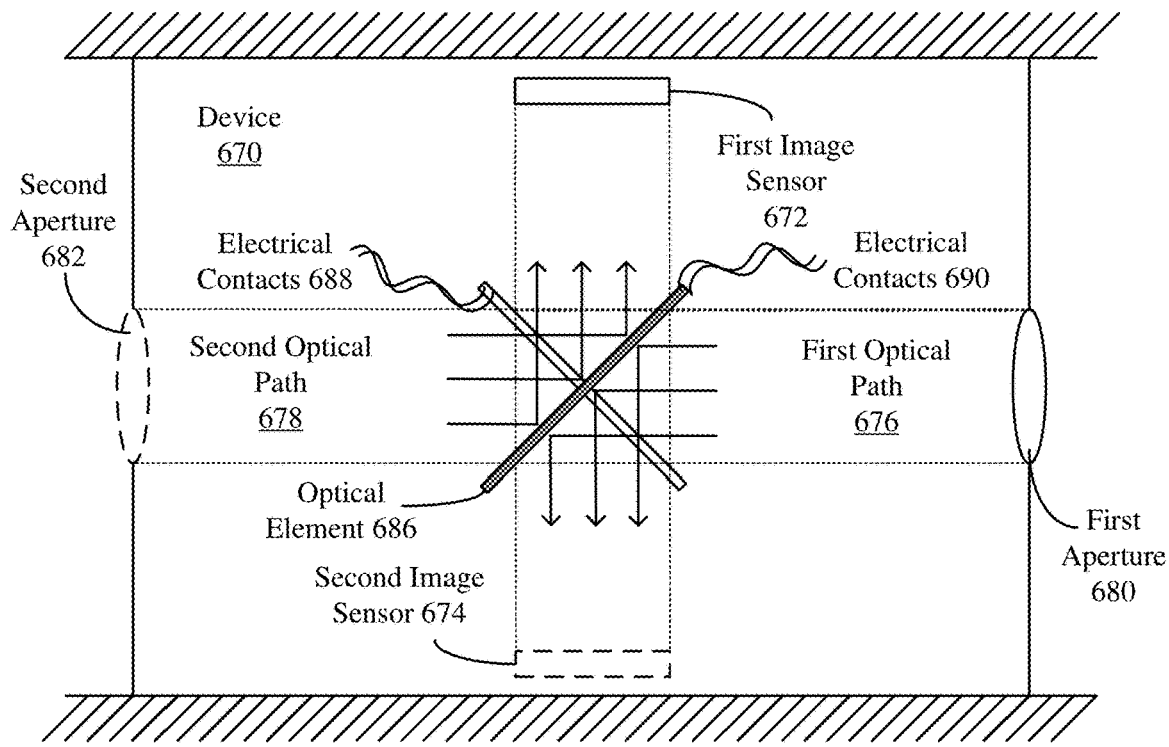
FIG. 6H shows the cross-section of the example device portion in FIG. 6G illustrating the first image sensor associated with a second optical path.

While the optical element 686 is illustrated as changing states based on application of an electrical current via electrical contacts 688 and electrical contacts 690, any suitable stimulus may be used and may be applied in any manner. In some implementations, a first portion of the optical element 686 includes a first set of molecules having a first orientation when an electrical current is applied via the electrical contacts 688, and a second portion of the optical element 686 includes a second set of molecules having a first orientation when an electrical current is applied via the electrical contacts 690. While two electrical contacts are illustrated, any suitable number may be used (such as one or more electrical contacts). When the first set of molecules and the second set of molecules are in the first orientation, the optical element 686 may be configured to direct light as shown in FIG. 6G. The first set of molecules and the second set of molecules may also have a second orientation when no electrical current is applied. In this manner, when the first set of molecules and the second set of molecules are in the second orientation, the optical element 686 may be configured to direct light as shown in FIG. 6H. FIG. 6H shows the cross-section of the example device portion in FIG. 6G illustrating a second image sensor 674 associated with the first optical path 676.

In some other implementations, the optical element 686 may include separate components of two or more optical elements combined together. For example, a first portion of the optical element 686 may be similar to the optical element 614 in FIG. 6A. The first portion may be controlled based on an electrical current applied via the electrical contacts 688. A second portion of the optical element 686 may be similar to the optical element 614 rotated by 90 degrees. The second portion may be controlled based on an electrical current applied via the electrical contacts 690. In this manner, switching between OE modes may include switching between providing an electrical current via contacts 688 and not providing an electrical current via contacts 690 for a first OE mode and not providing an electrical current via contacts 688 and providing an electrical current via contacts 690 for a second OE mode.

While adjustment of the optical element is shown in the examples of rotating the optical element, moving the optical element, or applying an electrical current (or other stimulus) to the optical element, any combination of the example adjustments (or other suitable means for adjusting the optical element, such as applying heat) may be performed. For example, the device may be configured to translationally move and rotate the optical element as appropriate. In another example, the device may be configured to rotate the optical element and apply an electrical current to the optical element. In some implementations, the optical element may be configured to service more than two optical paths or two image sensors based on a combination of adjustment means for the optical element.

As noted herein, a first image sensor may be coupled to a first group of one or more lenses, or a second image sensor may be coupled to a second group of one or more lenses. The first group or the second group may be configured such that the first image sensor is associated with a different FOV, optical factor, or depth of field than the second image sensor. The first image sensor or the second image sensor associated with one or more lenses is depicted in the examples shown in FIGS. 7A-7F. The following examples depicted in FIGS. 7A-7F illustrate the optical element as rotating (similar to FIGS. 4A and 4B). However, the adjustment of the optical element being a rotation of the optical element is for clarity purposes in explaining aspects of the disclosure. If an optical element is to be adjusted, the optical element may be adjusted in any suitable manner (including being rotated, being moved, or changing states based on a stimulus).

As noted herein, a first image sensor may be associated with a first FOV, a first optical zoom, or a first depth of field, and a second image sensor may be associated with a second FOV, a second optical zoom, or a second depth of field. In some implementations, the first image sensor may be disposed to receive light that propagates through one or more lenses to enable the associated FOV, optical zoom, or depth of field. In some implementations, the second image sensor may be disposed to receive light that propagates through one or more lenses to enable the associated FOV, optical zoom, or depth of field. In some other implementations, the second image sensor may be configured for the associated FOV, optical zoom, or depth of field without the use of one or more lenses.

Figure 7A:
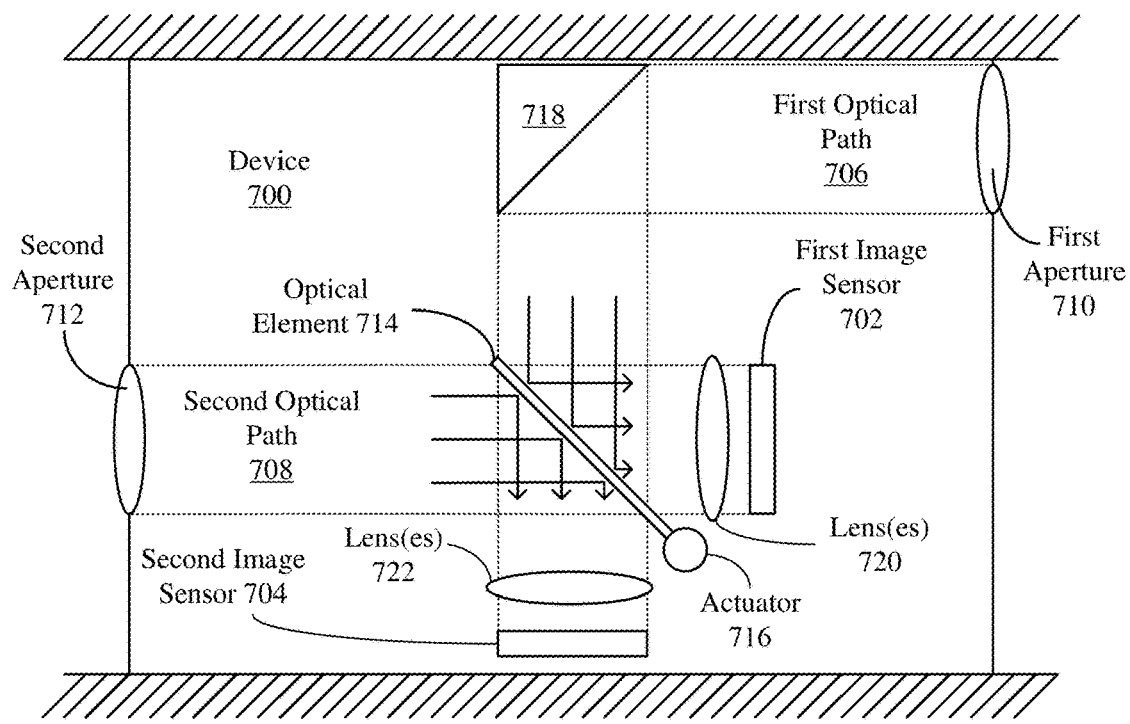
FIG. 7A shows a cross-section of an example device portion illustrating a first image sensor and a second image sensor associated with one or more lenses to adjust a field of view (FOV) for image capture.

FIG. 7A shows a cross-section of an example device 700 portion illustrating a first image sensor 702 associated with one or more lenses 720. The one or more lenses 720 may direct light toward the first image sensor 702 and adjust a FOV, zoom factor, or depth of field for image capture. In some implementations, the device 700 may also include one or more lenses 718 associated with the second image sensor 704. The one or more lenses 722 may direct light toward the second image sensor 704 and adjust a FOV, zoom factor, or depth of field for image capture. The one or more lenses 720 (and, optionally, one or more lenses 718) may be configured in any suitable manner to direct light received to the first image sensor 702 (or to the second image sensor 704). If the device 700 is a smartphone and the first aperture 710 is front facing (such as coinciding with a display of the smartphone), the smartphone may be configured to capture selfie images with differing characteristics (such as differing FOVs, zoom factors, or depths of fields) based on the device mode. If the smartphone includes the second aperture 712 as a rear facing aperture, the smartphone may be configured to capture images (such as group images, images of landscape scenes, and so on) with differing characteristics (such as differing FOVs, zoom factors, or depths of field) based on the device mode. The other components of the device 700 (including the first optical path 706, the second optical path 708, and the component 718) may be similar to like components illustrated in FIGS. 4A-4B.

Figure 7B:
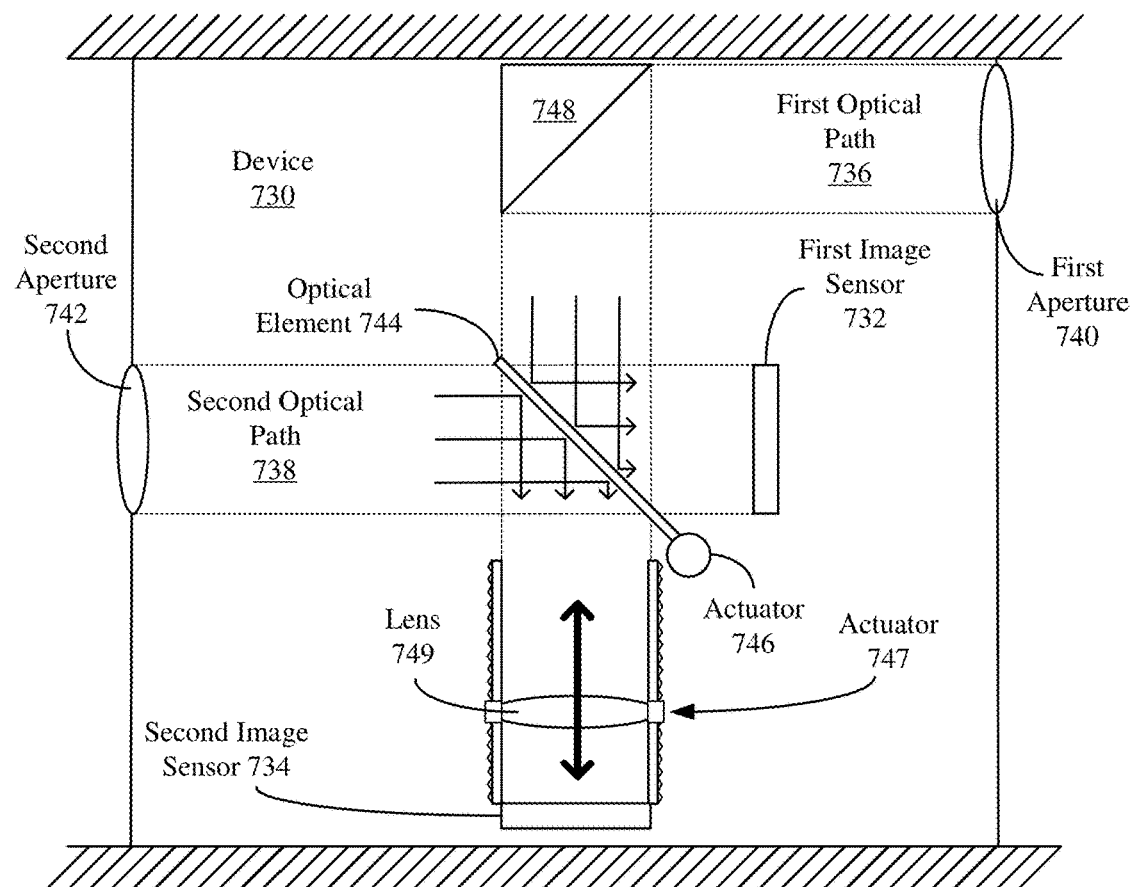
FIG. 7B shows a cross-section of an example device portion illustrating a second image sensor associated with a moveable lens.

In some implementations, one or more lenses associated with the image sensor may be movable with reference to the image sensor. In this manner, a FOV, zoom factor, or depth of field may be adjusted based on moving the one or more lenses. FIG. 7B shows a cross-section of an example device 730 portion illustrating a second image sensor 734 associated with a moveable lens 749. In some implementations, the movable lens includes one or more lenses. The one or more lenses may be for focus or zoom purposes, or for other suitable purposes (such as adjusting a FOV). If the device 730 is a smartphone (or a device having similar proportion), a smartphone may enable a longer distance between the first aperture 740 and the second image sensor 734 if at least a portion of the distance is parallel to the smartphone's display. In this manner, the device 730 may include an optical system to move one or more lenses with reference to the second image sensor 734 (or with reference to another lens of the one or more lenses). While the example depicted in FIG. 7B shows one lens 749, the lens 749 may include any number of lenses and means to move the lenses with reference to one another or the second image sensor 734.

The device 730 includes an actuator 747 to move the lens 749. Moving the lens 749 may be for a focus operation for the second image sensor 734 or to adjust a zoom factor for the second image sensor 734. While not shown, the first image sensor 732 may also be associated with one or more moveable lenses. As illustrated, a position of the lens 749 may be adjusted with reference to the second image sensor 734 when the device 730 is configured to use the second image sensor 734 for image capture for light received from the second aperture 742 (such as in a first OE mode). Adjustment of the position of the lens 749 may also occur when the device 730 is configured to use the second image sensor 734 for image capture for light received from the first aperture 740 (such as in a second OE mode). In some implementations, a device controller (such as controller 310 in FIG. 3A) is configured to control the actuator 747. The actuator 747 may move the lens 749 based on a mechanical force, electrical force, magnetic force, or other suitable force. For example, the actuator 747 may move the lens 749 along a guide with different positions away from the second image sensor 734. In this manner, the controller 310 may control a position of the lens 749.

Figure 7C:
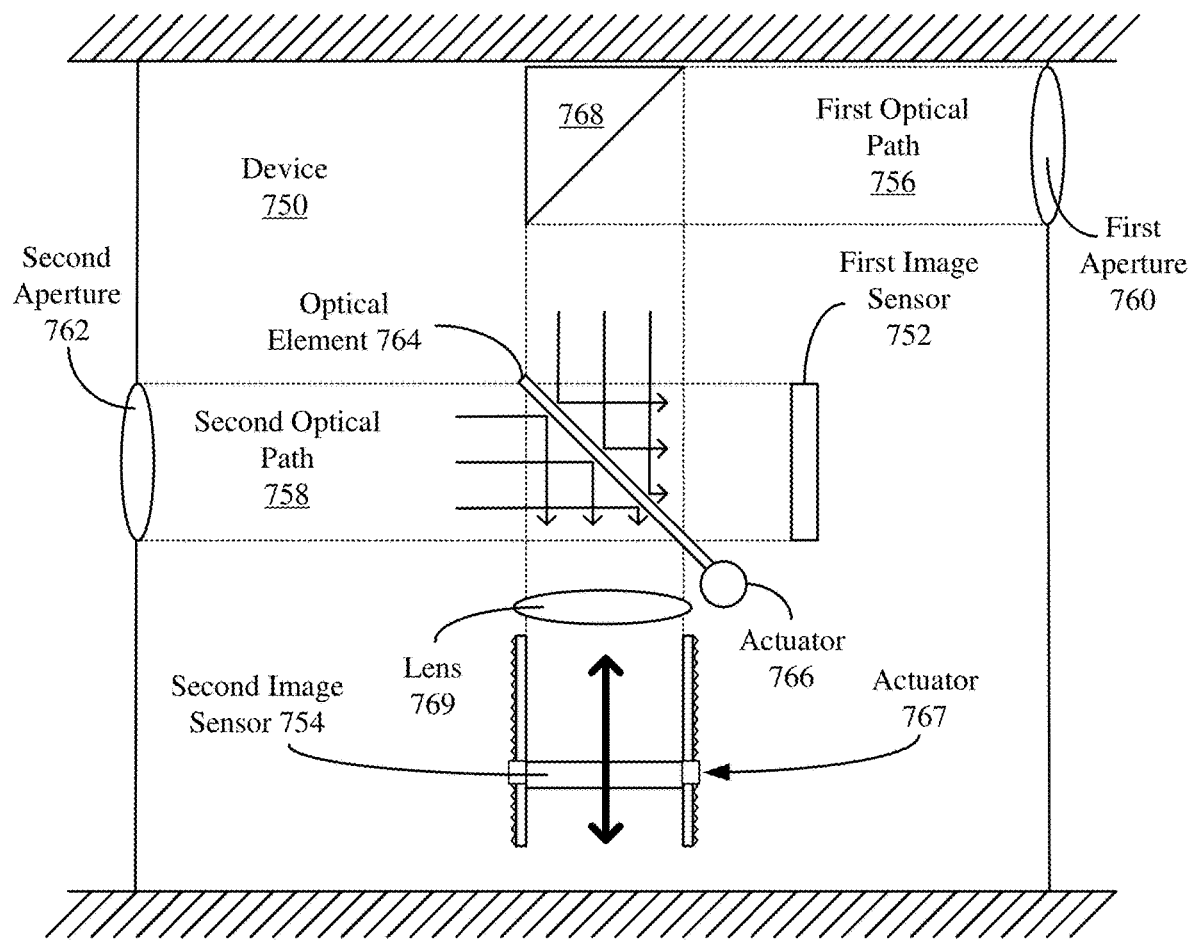
FIG. 7C shows a cross-section of an example device portion illustrating a second image sensor that is moveable.

In some implementations, the second image sensor may move with reference to one or more lenses. FIG. 7C shows a cross-section of an example device 750 portion illustrating a second image sensor 754 that is moveable with reference to the lens 769. While the lens 769 is shown as not moving with reference to the device 750, the lens 769 may also be moveable. The device 750 may be similar to the device 730 in FIG. 7B other than the second image sensor 754 being movable. In some implementations, the second image sensor 754 may be moved similar to how the lens 749 (FIG. 7B) is moved. For example, the second image sensor 754 may be coupled to an actuator 767, and the actuator may be configured to move the second image sensor 754 (such as via a mechanical force, an electrical force, a magnetic force, or other suitable force). In this manner, an FOV, zoom factor, or depth of field associated with the second image sensor 754 may be adjusted.

Figure 7D:
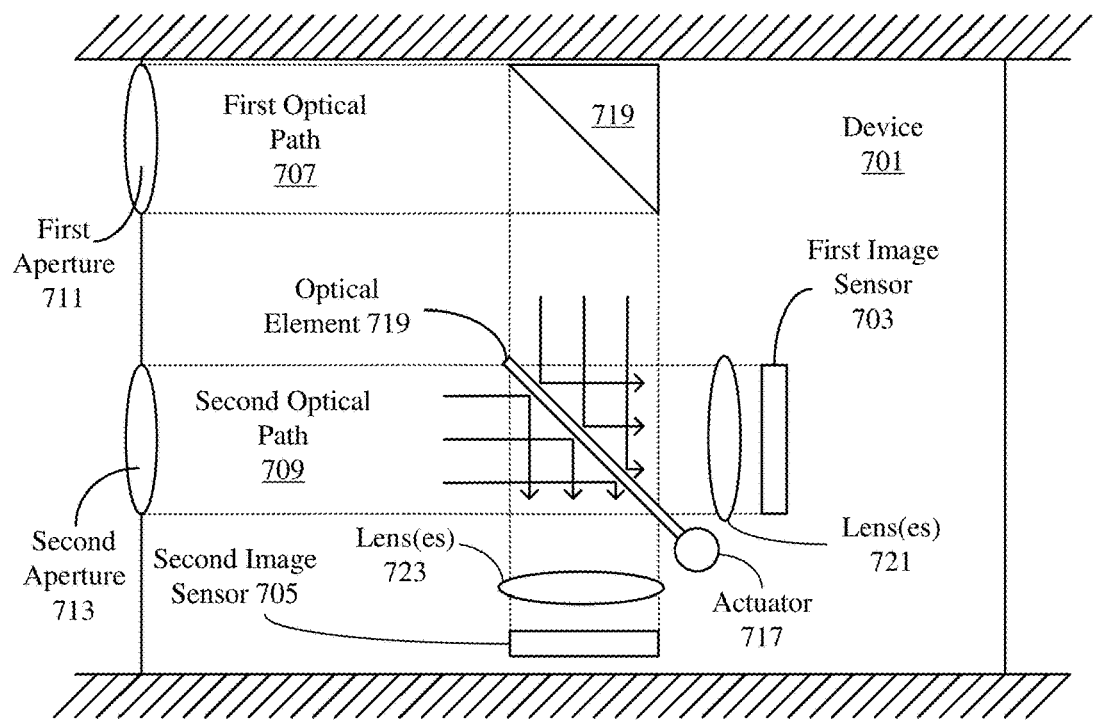
FIG. 7D shows a cross-section of an example device portion illustrating a first image sensor and a second image sensor associated with one or more lenses to adjust a field of view (FOV) for image capture.
Figure 7E:
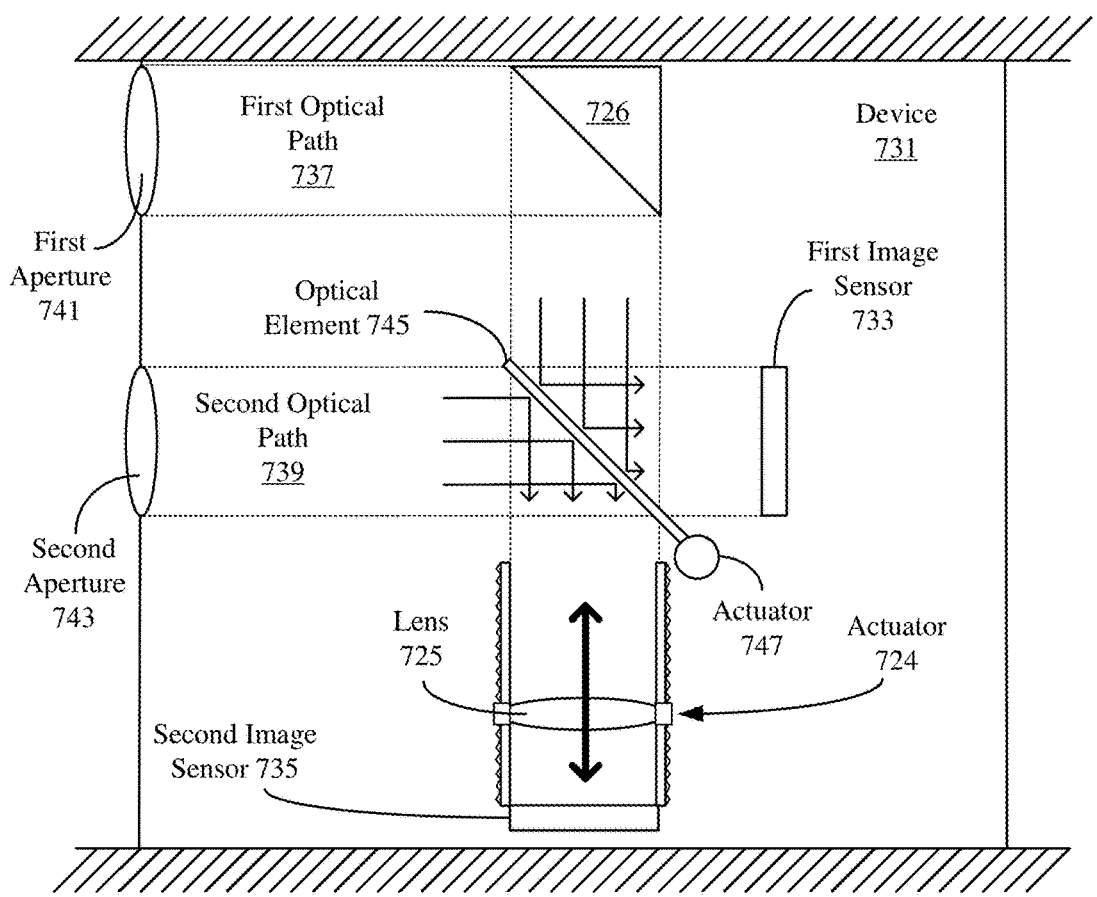
FIG. 7E shows a cross-section of an example device portion illustrating a second image sensor associated with a moveable lens.
Figure 7F:
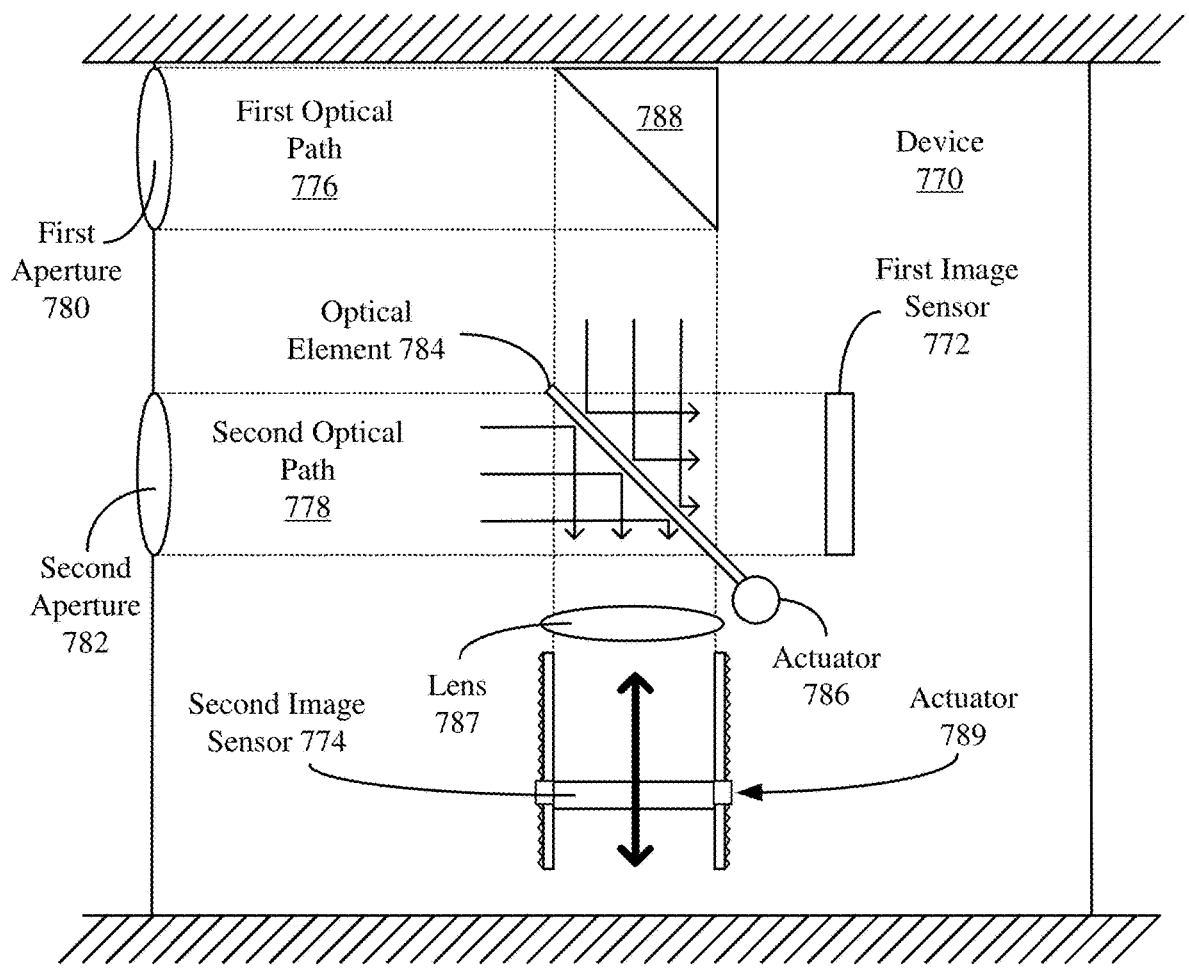
FIG. 7F shows a cross-section of an example device portion illustrating a second image sensor that is moveable.

FIGS. 7A-7C illustrate a first aperture and a second aperture being on different sides of the device. However, the apertures may be on the same side of the device, such as illustrated in FIGS. 7D-7F, respectively. FIG. 7D shows a cross-section of an example device 701 portion illustrating a first image sensor 703 associated with a first optical path 707. The device 701 may be similar to the device 700 in FIG. 7A, other than the apertures 711 and 713 being on the same side of the device. FIG. 7E shows a cross-section of an example device 731 portion illustrating a first image sensor 733 associated with a first optical path 737. The device 731 may be similar to the device 730 in FIG. 7B, other than the apertures 741 and 743 being on the same side of the device. FIG. 7F shows a cross-section of an example device 770 portion illustrating a first image sensor 772 associated with a first optical path 776. The device 770 may be similar to the device 750 in FIG. 7C, other than the apertures 780 and 782 being on the same side of the device. FIGS. 7A-7C may illustrate example component configurations for device 330 in FIG. 3B, and FIGS. 7D-7F may illustrate example component configurations for device 335 in FIG. 3C or for device 340 in FIG. 3D.

Referring back to FIGS. 3E and 3F, whether the device is in a first mode or a second mode may be based on a threshold zoom factor or a threshold FOV. If the device is configured to move one or more lenses or an image sensor (such as depicted in FIGS. 7B, 7C, 7E, and 7F) the device may adjust an optical zoom or FOV in an incremental manner by moving one or more lenses or an image sensor. When the one or more lenses or the image sensor reaches a maximum movement, the device may switch modes to use the other image sensor. For example, referring back to FIG. 7F, the second image sensor 774 may be associated with an optical zoom from 1× to 5× based on moving the image sensor, and the first image sensor 772 may be associated with a 0× optical zoom. If the current zoom factor is set to 5× (such as the slider being all the way to the right in selection tool 353 in FIG. 3F), the device 770 may be configured to use the second image sensor 774 for image capture. The user may decrease the zoom factor (such as by pressing the W or moving the slider to the left). As the zoom factor decreases, the device 770 moves the second image sensor 774 until the second image sensor 774 reaches a limit (associated with a 1× optical zoom). If the user continues to decrease the zoom factor to less than 1×, the device 770 may switch device modes and use the first image sensor 772 associated with 0× optical zoom. In some implementations, digital processing of the images from the first image sensor 772 may be performed to simulate the zoom factor being decreased. If the device shows a preview (such as from the preview on the bottom in FIG. 3F to the preview on the top of FIG. 3F in decreasing the zoom factor), the preview may show the zoom factor gradually decreasing.

If the device mode is based on a threshold FOV, zoom factor, or depth of field, the threshold may be based on the physical limitations of moving the one or more lenses and/or the image sensor. In the above example, the threshold zoom factor may be 1×, with the second image sensor 774 used for a zoom factor greater than the threshold and the first image sensor 772 used for a zoom factor less than the threshold. If the one or more lenses and the image sensors are fixed, a threshold may be based on a digital processing requirement of images from the image sensors, a resolution of the image sensors, or other image capture characteristics.

As described, a device may be configured to use a single aperture for different FOV based images, for different zoom based images, for different depth of field based images, or for other suitable differences in image capture between device modes. In the examples, two or more image sensors may share a first optical path (and associated aperture) in the device. In some examples, the two or more image sensors may share a second optical path (and associated aperture) in the device. How the optical path is shared may be based on an optical element (such as whether the optical element is in a first OE mode or a second OE mode).

Figure 8A:
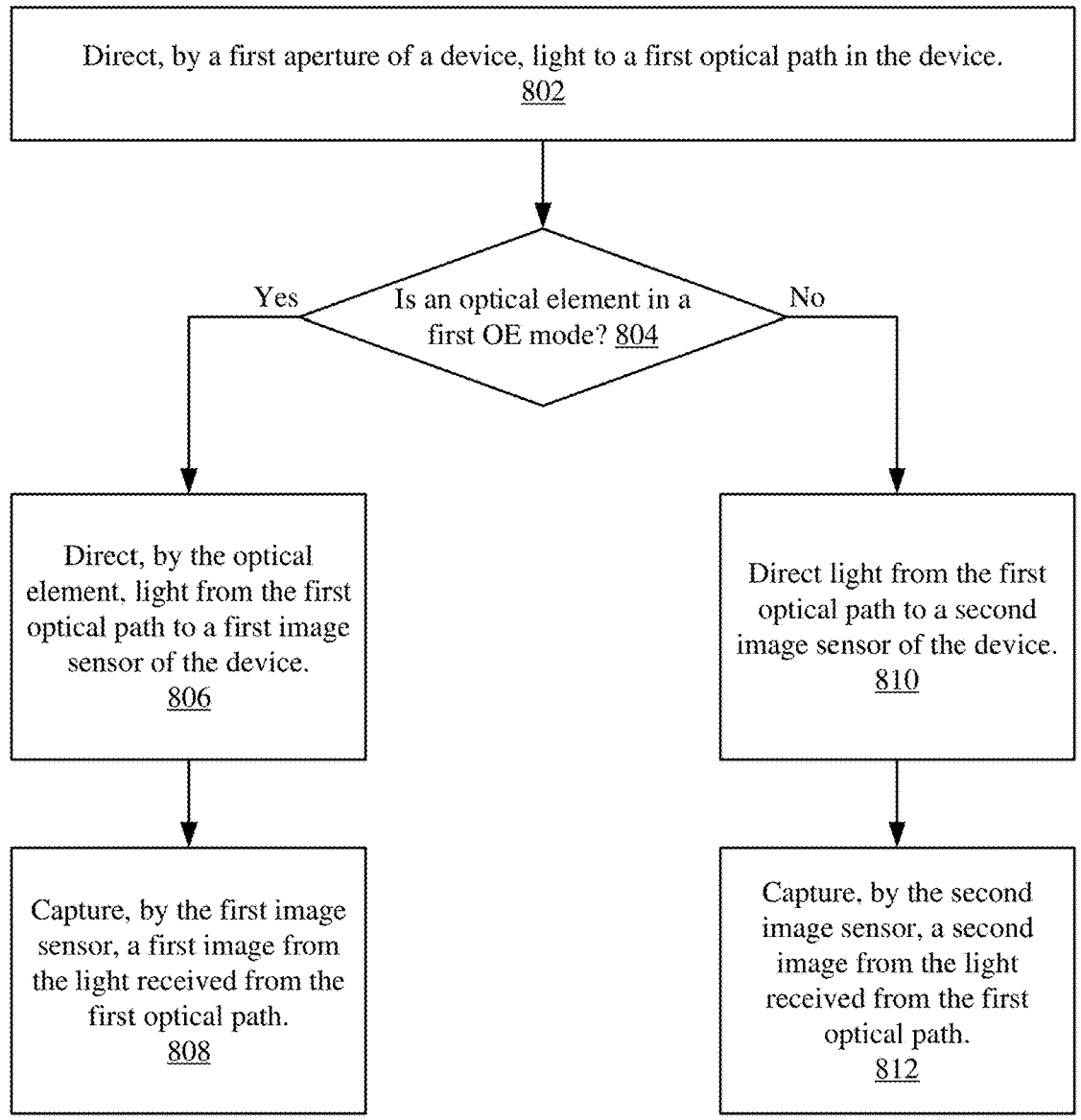
FIG. 8A shows an illustrative flow chart depicting an example operation for a first image sensor and a second image sensor to share a first optical path.

FIG. 8A shows an illustrative flow chart depicting an example operation 800 for a first image sensor and a second image sensor to share a first optical path. The first image sensor, the second image sensor, and the first optical path may be as depicted in FIGS. 3A-7F (or as otherwise described). The operation 800 and other operations (such as operation 900 in FIG. 9) are described as being performed by the device 300 in FIG. 3A for clarity, but may apply to any suitable device or device configuration.

At 802, a first aperture 320 directs light to a first optical path 301 in the device 300. At decision block 804, if the optical element 304 of the device 300 is in a first OE mode, the operation 800 proceeds to step 806. For example, the optical element 304 may be in a first orientation, a first position, have an electrical current or other stimulus applied, and so on. If the optical element 304 is not in a first OE mode (such as the optical element 304 being in a second orientation, a second position, have no electrical current or other stimulus applied, and so on), the operation 800 proceeds to step 810. Referring to step 806, an optical element 304 directs light from the first optical path 301 to a first image sensor 302. For example, the optical element 304 may reflect or refract light from the first optical path 301 to the first image sensor 302 based on an orientation of the optical element 304, a position of the optical element 304, a state of the optical element 304 (based on electrical current to be applied to the optical element 304), and so on. At 808, the first image sensor 302 captures a first image from the light received from the first optical path 301.

Referring to step 810, the device 300 directs light from the first optical path 301 to a second image sensor 303. For example, the optical element 304 may not block light from the first optical path 301 to allow the light to reach the second image sensor 303. In another example, the optical element 304 may have an orientation or be in a state based on a stimulus (such as electrical current) to allow light from the first optical path 301 to pass through the optical element 304 and to the second image sensor 303. At 812, the second image sensor 303 captures a second image from the light received from the first optical path 301. As noted herein, the controller 310 may be configured to adjust the optical element 304 to switch between OE modes for the example operation 800.

The device 300 may also include additional apertures coupled to additional optical paths. For example, as shown in FIG. 3A, the device 300 may include a second aperture 322 configured to direct light along a second optical path 324. The optical element 304 may be configured to direct light from the second optical path 324 to the first image sensor 302 or to the second image sensor 303 for image capture.

Figure 8B:
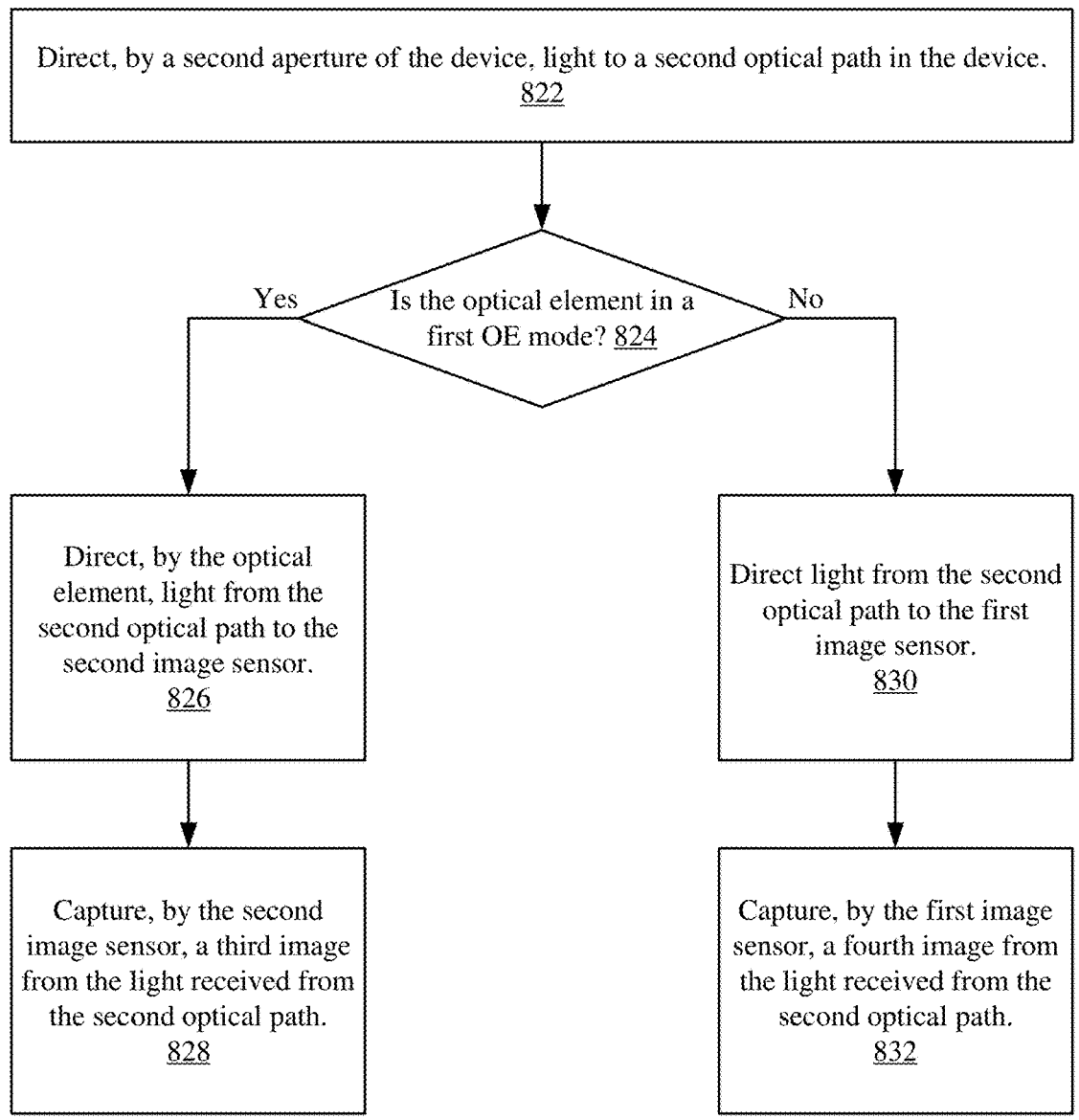
FIG. 8B shows an illustrative flow chart depicting an example operation for the first image sensor and the second image sensor in FIG. 8 to share a second optical path.

FIG. 8B shows an illustrative flow chart depicting an example operation 820 for the first image sensor 302 and the second image sensor 303 to also share a second optical path 324. Example operation 820 may be complementary to (such as being performed concurrently with) the example operation 800 in FIG. 8A. At 822, a second aperture 322 directs light to a second optical path 324 in the device 300. At decision block 824, if the optical element 304 is in a first OE mode, the operation 820 proceeds to step 826. If the optical element 304 is not in a first OE mode (such as the optical element 304 being in a second orientation, a second position, and so on), the operation 820 proceeds to step 830. Referring to step 826, an optical element 304 directs light from the second optical path 324 to the second image sensor 303. For example, the optical element 304 may reflect light from the second optical path 324 to the second image sensor 303 based on an orientation of the optical element 304, a position of the optical element 304, a state of the optical element 304 (based on electrical current to be applied to the optical element 304), and so on. At 828, the second image sensor 303 captures a third image from the light received from the second optical path 324.

Referring to step 830, the device 300 directs light from the second optical path 324 to the first image sensor 302. For example, the optical element 304 may be in a position to not block light from the second optical path 324 to allow the light to reach the first image sensor 302. In another example, the optical element 304 have an orientation or be in a state based on a stimulus (such as electrical current) to allow light from the second optical path 324 to pass through the optical element 304 and to the first image sensor 302. At 832, the first image sensor 302 captures a fourth image from the light received from the second optical path 324. As noted herein, the controller 310 may be configured to adjust the optical element 304 to switch between OE modes for the example operation 820.

FIG. 9A shows an illustrative flow chart depicting an example operation 900 for image capture. At 902, the device 300 identifies whether the device is to be in a first device mode or a second device mode. For example, the controller 310 determines whether the first image sensor 302 or the second image sensor 303 is to be used for image capture. In some implementations, the controller 310 may determine the device mode based on a user input (904). For example, the user may use a GUI via the display 314 to indicate that the device 300 is to be in a second device mode (such as indicating that the second image sensor is to be used). In some other implementations, the controller 310 may determine the device mode based on one or more of a FOV (906), a zoom factor (908), or a depth of field (910). For example, a user may indicate a desired FOV, zoom factor, or depth of field, and the device 300 may compare the desired FOV, zoom factor or depth of field to the FOV, zoom factor, or depth of field associated with the first image sensor and to the FOV, zoom factor, or depth of field associated with the second image sensor. The device 300 may then select the first image sensor or the second image sensor based on the comparison. For example, a threshold zoom factor may be used to determine whether the device 300 is to be in a first device mode or a second device mode. If the image to be captured is associated with a zoom factor less than the threshold, the device 300 may determine that the device 300 is to be in the first device mode. If the image to be captured is associated with a zoom factor greater than the threshold, the device 300 may determine that the device 300 is to be in the second device mode.

In some implementations, the controller 310 may determine the device mode based on a state of the device 300 (911). For example, the first image sensor 302 may be a lower power image sensor, and the second image sensor 303 may be a higher power image sensor. When the device 300 has a locked (or off) display 314 (such as in a low power state, locked state, and so on), the device 300 may be configured to perform object detection using the first image sensor 302 to determine if a face may be entering a field of view for facial recognition using the second image sensor 303. In this manner, the controller 310 may determine that the device 300 is in a first device mode when in a low power state (to detect objects entering the field of view). When an object is detected, the controller 310 may switch the device 300 to the second device mode to perform facial recognition using the second image sensor 303.

At 912, the device 300 may control the optical element 304 based on the identified device mode. For example, the controller 310 may determine whether the optical element 304 is to be adjusted so that the optical element 304 directs light from a shared optical path to the image sensor associated with the identified device mode. If the optical element 304 is to be adjusted, the controller 310 may instruct one or more components to adjust the optical element 304. In some implementations, the optical element 304 directs light from the first aperture 320 (which may propagate along the first optical path 301) to the first image sensor 302 in a first OE mode (914). In addition, or to the alternative, the optical element 304 may direct light from the first aperture 320 to the second image sensor 303 in a second OE mode (916). If the device 300 includes a second aperture 322 to direct light to a second optical path 324 shared by the first image sensor 302 and the second image sensor 303, the optical element 304 may direct light from the second aperture 322 to the second image sensor 303 in the first OE mode, and the optical element 304 may direct light from the second aperture 322 to the first image sensor 302 in the second OE mode.

In some implementations, the OE mode may be based on light information from an image sensor. If the first image sensor 302 is a lower power image sensor for object detection and the second image sensor 303 is a higher power image sensor for facial recognition, the controller 310 may first control the OE mode to direct light from the desired aperture to the first image sensor 302 for object detection (during a first device mode). When the controller 310 determines from the images from the first image sensor 302 that a face may have entered the field of view, the controller 310 may switch the OE mode to direct light from the desired aperture to the second image sensor 303 for facial recognition (during a second device mode). In some implementations, the OE mode may also be based on measurements from one or more sensors 326 (such as orientation measurements from a magnetometer or other suitable measurements from other sensors).

FIG. 9B shows an illustrative flow chart depicting an example operation 920 for controlling an optical element 304. The operation 920 may be an example implementation of 912 in FIG. 9A. At 922, the device 300 identifies whether the optical element 304 is to be in the first OE mode or the second OE mode based on the identified device mode. For example, the controller 310 may determine whether the optical element 304 is to direct light from the first optical path 301 to the first image sensor 302 or to the second image sensor 303 based on which image sensor is to be used for image capture. In some implementations, the controller 310 identifies the OE mode based on which aperture is to be used (924). For example, if a first aperture 320 is on a front side of a smartphone, a second aperture 322 is on a back side (opposite the front side) of the smartphone, and the smartphone is on a table front side up, the controller 310 may determine that the first aperture 320 is to be used (such as based on light information from images captured by the first image sensor 302 or the second image sensor 303, based on orientation measurements from one or more sensors 326, and so on).

In addition or to the alternative, the controller 310 may identify the OE mode based on the imaging application (926). For example, if the device 300 is in a low power mode with a locked screen, the imaging application may be object detection (during a first device mode) using a lower power image sensor and facial recognition (during a second device mode) using a higher power image sensor. The OE mode may thus be based on directing light from the desired aperture to the first image sensor 302 during object detection and directing light from the desired aperture to the second image sensor 303 during facial recognition. In another example, the OE mode may change while the device 300 is in a single device mode. For example, the OE mode may switch (such as alternate) while using a first image sensor 302 for three dimensional imaging. In this manner, operation 920 may be performed multiple times while the device 300 is in a specific device mode. Identifying the OE mode (including whether the OE mode is to change during the device mode) may thus be based on the imaging application. For the determined OE mode, the controller 310 may determine in which state the optical element 304 is to be. For example, the controller 310 may determine if the optical element 304 is to be in a first or second orientation (via rotation), a first or second position (via a translational movement), or a first or second material state (via application of a stimulus, such as an electrical current, heat, and so on).

In some implementations, the controller 310 may receive feedback from one or more components moving, rotating, or applying a stimulus to the optical element 304 to determine the current state of the optical element 304. In some other implementations, the controller 310 may determine the current OE mode based on previous instructions or controls for the optical element 304 to place the optical element 304 into a specific OE mode. For example, the controller 310 or another suitable component may store the current OE mode based on the controller's instructions to or control of the optical element 304. In this manner, the controller 310 may compare the current OE mode to the identified OE mode to determine if the optical element 304 is to change OE modes or otherwise be adjusted.

At 928, the device 300 may adjust the optical element 304 based on the identified OE mode. In some implementations, if the controller 310 determines that a difference exists between the current OE mode and the identified OE mode, the controller 310 may control the optical element 304 to place the optical element 304 in the identified OE mode. For example, the device 300 may rotate the optical element 304 (930). In this manner, the controller 310 may instruct or control an actuator to rotate the optical element 304. In another example, the device 300 may translationally move the optical element (932). In this manner, the controller 310 may instruct or control an actuator to apply a physical force, a magnetic force, or other suitable force to the optical element 304 to translationally move the optical element 304 into another position. In a further example, the device 300 may apply (which may include removing or adjusting a level of) a stimulus to the optical element 304 (934). One stimulus may be an electrical current applied to the optical element 304 (936). For example, the controller 310 may control a switch to deliver or remove an electrical current from a power rail to the optical element. In another example, the controller 310 may control an electrical current level applied to the optical element, and one or more properties of the optical element 304 may be based on the electrical current level. For example, a refractive index, a reflectiveness, or a transparency may vary based on a change in electrical current applied to the optical element 304.

When the device 300 is in the first device mode, the first image sensor 302 may capture one or more images (such as a succession of images for video) for processing. When the device 300 is in the second device mode, the second image sensor 303 may capture one or more images (such as a succession of images for video) for processing. The image signal processor 312 or other portions of the image processing pipeline in the device 300 may process the one or more images to generate a final image or video (such as applying one or more image processing filters, encoding a sequence of images for video, and so on). As noted herein, the device mode may change during video capture (such as when adjusting a FOV, zoom factor, or depth of field for the video). In this manner, the image signal processor 312 (and other components) may process a first group of images from the first image sensor 302 and process a second group of images from the second image sensor 303. The first group of images and the second group of images may be encoded together to generate the video.

Figure 9C:
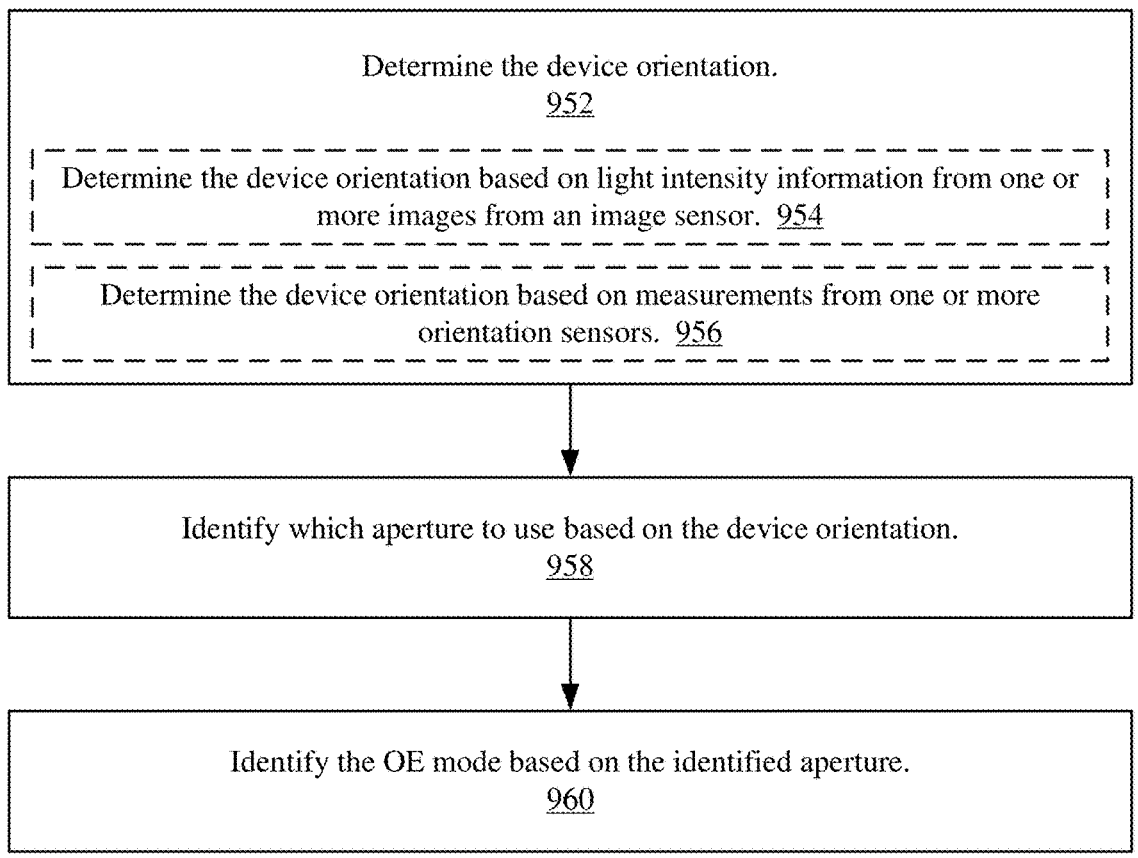
FIG. 9C shows an illustrative flow chart depicting an example operation for controlling an optical element based on a device orientation.

As noted above, the optical element may be controlled based on information from one or more device sensors. For example, the controller 310 may control an OE mode based on an orientation of the device 300 (such as determined from orientation measurements from a magnetometer, light intensity measurements from a first image sensor 302, and/or other suitable measurements). FIG. 9C shows an illustrative flow chart depicting an example operation 950 for controlling an optical element 304 based on a device orientation. The device orientation may be determined using one or more device sensors. The device sensors for device 300 may include one or more sensors 326 (such as an orientation sensor, which may include a gyroscope or a magnetometer), the first image sensor 302, the second image sensor 303, or any other suitable sensor of the device 300. Operation 950 may be an example implementation of step 924 in FIG. 9B.

For step 924 (FIG. 9B), the controller 310 may identify the OE mode based on which aperture is to be used for image capture.

At 952 in FIG. 9C, the controller 310 determines the orientation of the device 300. In some implementations, the controller 310 determines the device orientation based on light intensity information from one or more images from an image sensor (954). For example, if the device 300 is in a first OE mode such that light from the first aperture 320 is directed to the first image sensor 302 and the device 300 is set on a surface or is otherwise oriented such that the first aperture 320 is blocked from receiving light from the scene, the controller 310 may determine that the orientation of the device 300 is such that the first aperture 320 is directed down towards a surface. If the second aperture 322 is on a different side of the device 300 than the first aperture 320, the second aperture 322 may be the desired aperture based on the light intensity information. In addition or to the alternative, the controller 310 may determine the device orientation based on measurements from one or more orientation sensors (956). For example, a magnetometer or gyroscope may provide measurements indicating an orientation of the device 300 to the controller 310. The orientation may indicate that a first aperture 320 is directed down (such as towards a surface on which the device 300 is resting). If the second aperture 322 is on a different side of the device 300 than the first aperture 320, the second aperture 322 may be the desired aperture based on the orientation measurements.

At 958, the controller 310 determines which aperture to use based on the orientation of the device 300. For example, if the device 300 is a smartphone with a first aperture 320 on a front side and a second aperture 322 on a back side, which aperture is to be used may be based on which side is facing up when the smartphone is resting on a surface (such as a table or chair). If the device 300 is oriented with the front side down/towards the surface, the controller 310 may identify the second aperture 322 as the aperture to use (with the first aperture 320 directed towards the surface). If the device 300 is oriented with the back side down/towards the surface, the controller 310 may identify the first aperture 320 as the aperture to use (with the second aperture 322 directed towards the surface).

At 960, the controller 310 identifies the OE mode based on the identified aperture. For example, if the display 314 is locked, the device 300 may perform object detection using the first image sensor 302 (which may be a lower power image sensor, such as an AO image sensor). If the device 300 is identified as being oriented front side up, the device 300 may determine that the first aperture 320 is to be used. Since the first aperture 320 and the first image sensor 302 are to be used, the controller 310 may identify the first OE mode for the first aperture 320 to direct light towards the first image sensor 302. When the device 300 is to perform facial recognition using the second image sensor 303, the device 300 may identify the second OE mode for the first aperture 320 to direct light towards the second image sensor 303. In this manner, the device 300 may control the optical element 304 for image capture during different device modes.

Aspects of an adjustable optical element may also be used for emitters. In some implementations, the device may be configured for active depth sensing. For example, the device may include one or more emitters to emit light for active depth sensing. Active depth sensing may be used for operations including laser auto focus for a camera, facial recognition for screen unlock, range finding, depth mapping (such as for virtual reality or augmented reality applications), and so on. In some implementations, an emitter may be shared by multiple apertures. In this manner, emissions from the emitter may be directed by an optical element out of a first aperture or out of a second aperture. Conversely, an aperture may be shared by a first emitter and a second emitter (such as for different active depth sensing techniques), or the aperture may be shared by an emitter for active depth sensing or a receiver (such as an image sensor). For example, the device may be configured to perform different active depth sensing techniques (including structured light depth sensing or time of flight depth sensing) or the device may be configured to perform a combination of active depth sensing and image capture using a shared aperture. FIGS. 10-17 depict example device configurations and operations for a device configured to perform one or more active depth sensing techniques.

Figure 10:
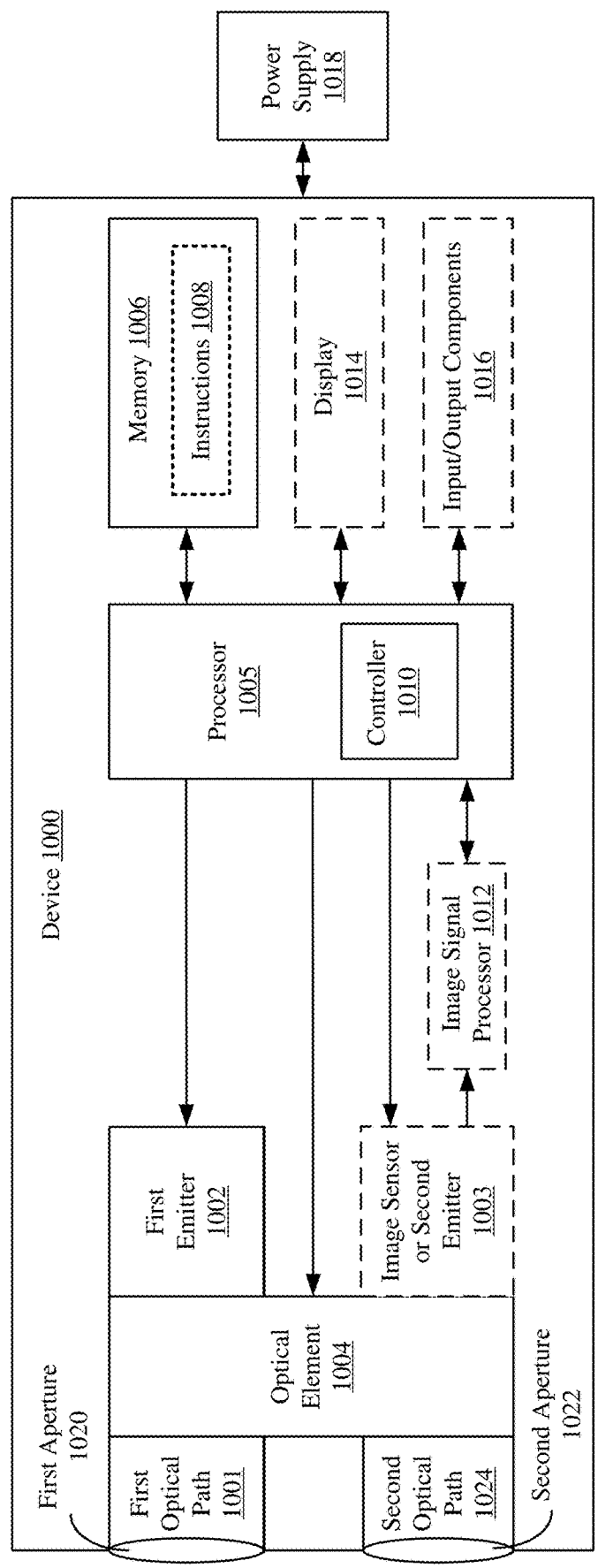
FIG. 10 shows a block diagram of an example device including a first emitter for active depth sensing coupled to a first optical path when the device is in a first mode and a second optical path when the device is in a second mode.

FIG. 10 shows a block diagram of an example device 1000 including a first emitter 1002 for active depth sensing. At least a portion of the components in the example device 1000 may be similar to the components in the example device 300 in FIG. 3A. For example, the example device 1000 may include a processor 1005 (which may include a controller 1010 configured to control the optical element 1004). The device 1000 may also include a memory 1006 storing instructions 1008, an optional display 1014, one or more optional I/O components 1016, and a power supply 1018. The processor 1005, memory 1006, controller 1010, display 1014, I/O components 1016, and power supply 1018 may be similar to the processor 305, memory 306, controller 310, display 314, I/O components 316, and power supply 318 depicted in FIG. 3A. The device 1000 may also include other components not shown in FIG. 10, similar to the device 300 in FIG. 3A. For example, the device 1000 may include one or more sensors (such as orientation or motion sensors, positioning sensors, temperature sensors, and so on).

The device 1000 may include a first aperture 1020 that directs light along a first optical path 1001 or receives light from the first optical path 1001. The device 1000 may also include a second aperture 1022 that directs light along a second optical path 1024 or receives light from the second optical path 1024. In some implementations, the first emitter 1002 is shared by the first aperture 1020 and the second aperture 1022. For example, the device 1000 includes an optical element 1004. The optical element 1004 is configured to direct light from the first emitter 1002 to the first optical path 1001 when the optical element 1004 is in a first OE mode. When the optical element 1004 is in a second OE mode, light from the first emitter 1002 is propagated along the second optical path 1024.

In some implementations, the device 1000 includes an image sensor or a second emitter 1003. With an image sensor or second emitter 1003, the device 1000 may be configured to be in a first device mode (using the first emitter 1002) or a second device mode (using the image sensor or second emitter 1003). For example, if the device 1000 includes an image sensor, a first device mode may be an active depth sensing mode using the first emitter 1002, and a second device mode may be an image capture mode using the image sensor.

In some implementations, the image sensor may be a lower power image sensor (such as described above with reference to FIG. 3A). For example, the lower power image sensor may be an AO image sensor to be used in different operating states of the device (such as for object detection). For example, the device 1000 may be configured to perform active depth sensing for facial recognition (such as for screen unlock). The first emitter 1002 may emit a distribution of light for the active depth sensing, and facial recognition may be performed during a first device mode. The lower power image sensor may measure light intensities in different regions of a scene for object detection (such as to detect whether a possible face moves into a center of the field of view of the image sensor). Object detection may be performed during a second device mode. In this manner, a single aperture may be used during the second device mode for object detection using the image sensor and may be used during the first device mode for facial recognition based on active depth sensing using the first emitter 1002. As described above with reference to FIGS. 3A and 9C, the aperture to be used may be based on an orientation of the device 1000, which may be determined from measurements from one or more sensors or light intensity information captured by the image sensor.

In another example, if the device 1000 includes a second emitter, a first device mode may be a first active depth sensing mode using the first emitter 1002, and a second device mode may be a second active depth sensing mode using the second emitter 1003. In another example, one of the device modes may be a flashlight mode if the second (or first) emitter is a flood illuminator. The first emitter 1002 (and, optionally, a second emitter 1003) may be configured to emit a determined wavelength of light (such as IR light or light at another suitable wavelength). In some other implementations, light having a range of wavelengths may be emitted.

For an image sensor, when the optical element 1004 is in a first OE mode, the optical element 1004 may direct light propagated along the second optical path 1024 to the image sensor. When the optical element 1004 is in a second OE mode, the optical element 1004 may direct light propagated along the first optical path 1001 to the image sensor. For a second emitter, when the optical element 1004 is in a first OE mode, the optical element 1004 may direct light from the second emitter to the second optical path 1024. When the optical element 1004 is in a second OE mode, the optical element 1004 may direct light from the second emitter to the first optical path 1001.

While not shown, the device 1000 may include one or more receivers for active depth sensing. In some implementations, the device 1000 may include one or more receivers configured to receive reflections of the light emitted by the first emitter 1002 during a first device mode. The one or more receivers may also be configured to receive reflections of the light emitted by a second emitter 1003 during a second device mode. For example, the one or more receivers may include an IR image sensor (or other suitable image sensor) to capture reflections of the IR light (or at another suitable wavelength) emitted by the first emitter 1002. In some other implementations, the one or more receivers for active depth sensing may be outside of the device 1000. In this manner, the device 1000 may act as the emitter for an active depth sensing system.

The memory 1006 may be a non-transient or non-transitory computer readable medium storing computer-executable instructions 1008 to perform all or a portion of one or more operations described in this disclosure (such as for adjusting a position of an optical element). If active depth sensing includes structured light depth sensing, the memory 1006 may also include a library of codewords used to process images from an active depth sensing receiver in order to determine one or more depths of objects in a scene.

The processor 1005 may be one or more suitable processors (such as general purpose processors) capable of executing scripts or instructions of one or more software programs (such as instructions 1008) stored within the memory 1006. For example, the processor 1005 may be an applications processor and execute an active depth sensing application (such as for screen unlock, laser auto focus, and so on). In additional or alternative aspects, the processor 1005 may include integrated circuits or other hardware to perform functions or operations described in this disclosure.

The processor 1005 includes a controller 1010. If the device 1000 includes an image sensor or second emitter 1003, the controller 1010 may be configured to select the emitter (or image sensor) to be used. The controller 1010 is also configured to control the optical element 1004 (such as switching between a first OE mode and a second OE mode). In some implementations, the controller 1010 may be configured to adjust the position of the optical element 304 (such as by rotating or translationally moving the optical element 1004). For example, the controller 1010 may instruct an actuator to translationally move the optical element 1004 when switching between OE modes. In another example, the controller 1010 may instruct an actuator to rotate the optical element 1004 when switching between OE modes.

In some other implementations, the controller 1010 may be configured to adjust a state of the optical element 1004 (such as by applying an electrical current or other stimulus). The optical element's state may include a reflectiveness or transparency (or refractive index) of the optical element 1004 based on the stimulus. For example, the controller 1010 may cause electrical current to not be applied to the optical element 1004 for a first OE mode and cause electrical current to be applied to the optical element 1004 for a second OE mode.

Similar to the controller 310 in FIG. 3A, the controller 1010 may determine an orientation of the device 1000 from measurements from one or more orientation sensors or light intensity measurements from the image sensor (such as from a lower power image sensor when the display 1014 is locked or the device 1000 is in a low power or inactive state). The controller 1010 determining the device mode or the OE mode may be based on the orientation of the device 1000. The device mode or the OE mode may also be based on the device state.

The controller 1010 may be embodied in software (such as in instructions 1008 stored in memory 1006), hardware (such as one or more integrated circuits), or a combination of both. In some other device implementations, the controller 1010 may be embodied in a separate processor from the processor 1005 or dedicated hardware. For example, a discrete processor may include the controller 1010 and the image signal processor 1012. The discrete processor may include one or more application specific integrated circuits (ASICs) and/or a one or more general purpose processors. The discrete processor may be configured to perform operations associated with image capture, active depth sensing, computer vision (such as virtual reality (VR), augmented reality (AR), or stereoscopic vision), and so on for which the first emitter 1002 or the image sensor or second emitter 1003 are used.

While shown to be coupled to each other via the processor 1005 in the example device 1000, the processor 1005, the memory 1006, the image signal processor 1012, the optional display 1014, and the optional I/O components 1016 may be coupled to one another in various arrangements. For example, the processor 1005, the memory 1006, the image signal processor 1012, the optional display 1014, and the optional I/O components 1016 may be coupled to each other via one or more local buses (not shown for simplicity).

The image signal processor 1012 may be configured to process captured images from the image sensor 1003. In some implementations, the image signal processor 1012 includes one or more filters of an image processing pipeline, and the filters may be configured based on instructions from the processor 1005. If the images from the image sensor 1003 or for depth mapping, the image signal processor 1012 may be configured for processing the images to determine one or more depths. For example, the image signal processor 1012 may use a library of codewords to identify codewords in an image for structured light depth sensing.

In some aspects, the image signal processor 1012 may execute instructions from a memory (such as instructions 1008 from the memory 1006 or instructions stored in a separate memory coupled to or included in the image signal processor 1012). In some other aspects, the image signal processor 1012 may include specific hardware to perform one or more operations described in the present disclosure. In some further aspects, the image signal processor 1012 may include a combination of specific hardware and the ability to execute software instructions. In some implementations, if the device 1000 does not include an image sensor 1003 (such as instead including a second emitter 1003), the device 1000 may not include the image signal processor 1012.

Similar to optical element 304 depicted in FIG. 3A, the optical element 1004 may be adjusted in some manner to switch between modes of the device 1000. For example, the optical element 1004 may include a reflective surface (such as a mirror) or a refractive element (such as a pentaprism) to direct light from the first emitter 1002 to the first optical path 1001 during a first OE mode. When the optical element 1004 switches to a second OE mode, the optical element 1004 may be translationally moved, may be rotated, or otherwise may be adjusted to not cause the light from the first emitter 1002 to be directed to the first optical path 1001.

If the device 1000 includes an image sensor or second emitter 1003, the optical element 1004 may also be configured to direct light from/to the second optical path 1024 to/from the image sensor or second emitter 1003 in the first OE mode. For example, the optical element 1004 may include a second reflective surface or a second refractive element to direct light from/to the second optical path 1024 to/from the image sensor or second emitter 1003 during the first mode. When switching to the second OE mode, the optical element 1004 may be moved, may be rotated, or otherwise may be adjusted to not cause the light to/from the image sensor or second emitter 1003 to be directed from/to the second optical path 1024. For example, for an image sensor, the light from the first optical path 1001 may be directed to the image sensor 1003. For a second emitter, the light from the second emitter 1003 may be directed to the first optical path 1001. Example operations and configurations of an optical element 1004 are described in more detail with reference to FIGS. 14A-16F, and may be similar to operations and configurations of an optical element depicted in FIGS. 4A-6H.

Any suitable active depth sensing system or technique may be used by or included in the device 1000. In this manner, the first emitter 1002 (and, optionally, the second emitter 1003) is configured to emit a light configured for the type of active depth sensing system. In some implementations, the first emitter 1002 is configured to emit a flood illumination of light (such as IR light), and a depth of an object may be based on an intensity of a reflection of the light as measured at an active depth sensing receiver (such as at an IR image sensor). In some other implementations, the active depth sensing system may be based on emitting a known distribution of light (which may be referred to as a structured light depth sensing system, and is described in more detail with reference to FIG. 11). In some further implementations, the active depth sensing system may be a direct TOF active depth sensing system (described in more detail with reference to FIG. 12). In some other implementations, the active depth sensing system may be an indirect TOF active depth sensing system (described in more detail with reference to FIG. 13). The first emitter 1002 (and, optionally, the second emitter 1003) may include an emitter configured for one or more of the example active depth sensing systems described herein (or another suitable active depth sensing system).

Figure 11:
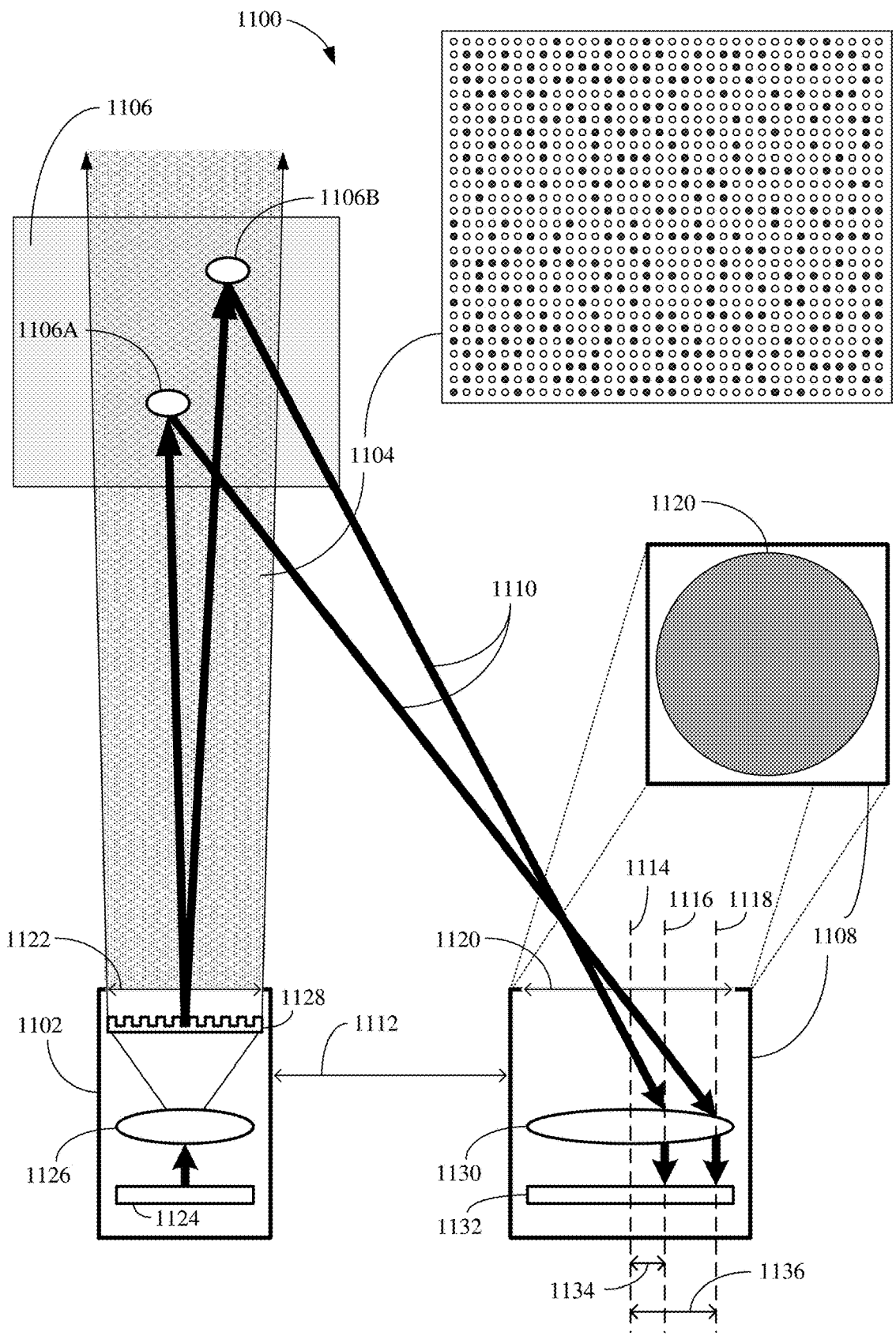
FIG. 11 shows a depiction of an example active depth sensing system including an emitter for emitting a distribution of light.

FIG. 11 shows a depiction of an example active depth sensing system 1100 including an emitter 1102 for emitting a distribution of light (such as distribution 1104). The active depth sensing system 1100 (which herein also may be referred to as a structured light system) may be used to generate a depth map (not pictured) of a scene 1106 or may be used in the performance of one or more operations based on depths of objects in the scene 1106. For example, the scene 1106 may include a face, and the active depth sensing system 1100 may be used for identifying or authenticating the face for screen unlock or security purposes. The active depth sensing system 1100 may include an emitter 1102 and a receiver 1108. The emitter 1102 may be referred to as a "transmitter," "projector," and so on, and should not be limited to a specific transmission component. Throughout the following disclosure, the terms projector and emitter may be used interchangeably. The receiver 1108 may be referred to as a "detector," "sensor," "sensing element," "photodetector," and so on, and should not be limited to a specific receiving component.

While the disclosure refers to the distribution as a light distribution, any suitable wireless signals at other frequencies may be used (such as radio frequency waves, sound waves, etc.), and the device may be configured to direct such wireless signals in the device. Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. In some implementations, the memory 1006 may include a library of codewords for the codewords included in the distribution emitted by the first emitter 1002 (and, optionally, a second emitter 1003). The library of codewords may then be used to identify codewords in reflections of the light emitted by the first emitter 1002 (or second emitter 1003) as received by a receiver, and the location of the codewords on the receiver's sensor may be used to determine one or more depths in the scene. In another implementation, an image sensor 1003 may be configured to capture images including reflections of a codeword distribution emitted by an associated emitter. The memory 1006 may store a library of codewords for the associated emitter, and the image signal processor 1012 may use the library of codewords in processing the images from the image sensor 1003. The distribution may be organized and used in any way, and the present disclosure should not be limited to a specific type of distribution or type of wireless signal.

The emitter 1102 may be configured to project a distribution 1104 of light points onto the scene 1106. Black circles in the distribution 1104 may indicate where no light is projected for a possible point location, and white circles in the distribution 1104 may indicate where light is projected for a possible point location. In some example implementations, the emitter 1102 may include one or more light sources 1124 (such as one or more lasers), a lens 1126, and a light modulator 1128. The light source 1124 may include any suitable light source. In some example implementations, the light source 1124 may include one or more distributed feedback (DFB) lasers. In some other example implementations, the light source 1124 may include one or more vertical cavity surface-emitting lasers (VCSELs). In some examples, the one or more light sources 1124 include a VCSEL array, DFB laser array, or other suitable laser array.

The emitter 1102 also may be coupled to an aperture 1122 from which the emitted light escapes the emitter 1102 onto the scene. In some implementations, the aperture 1122 may be the first aperture 1020 or the second aperture 1022 in FIG. 10. While not shown in FIG. 11 for simplicity in explanation, the emitter 1102 may be coupled to an optical element 1004 to direct the light to the first aperture 1020 or the second aperture 1022. In some implementations, the emitter 1102 may further include a diffractive optical element (DOE) to diffract the emissions from one or more light sources 1124 into additional emissions. In some aspects, the light modulator 1128 (to adjust the intensity of the emission) may comprise a DOE. A DOE may include a material situated in the projection path of the light from the light source 1124. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more lights points from one or more lasers and project an intended distribution with a greater number of light points than emitted by the one or more lasers.

In projecting the distribution 1104 of light points onto the scene 1106, the emitter 1102 may output one or more light points from the light source 1124 through the lens 1126 (and/or through a DOE or light modulator 1128) and onto the scene 1106. In some implementations, the emitter 1102 may be positioned on the same reference plane as the receiver 1108, and the emitter 1102 and the receiver 1108 may be separated by a distance called the baseline (1112). In some other implementations, the emitter 1102 and the receiver 1108 may be positioned on different reference planes. The emitter 1102 may be positioned on a first reference plane, and the receiver 1108 may be positioned on a second reference plane. The first reference plane and the second reference plane may be the same reference plane, may be parallel reference planes separated from each other, or may be reference planes that intersect at a non-zero angle. The angle and location of the intersection on the reference planes is based on the locations and orientations of the reference planes with reference to each other. The reference planes may be oriented to be associated with a common side of the device. For example, both reference planes (whether parallel or intersecting) may be oriented to receive light from a common side of the device (such as from a back side of the device, a front side of the device, a top side of the device, and so on).

In device production, minor differences or errors in manufacturing may cause differences in orientation or positioning of the first reference plane or the second reference plane. In one example, mounting the emitter 1102 or the receiver 1108 on a printed circuit board (PCB) may include an error (within a tolerance) that the orientation of the emitter 1102 or the receiver 1108 differs from the orientation of the PCB. In another example, orientations of different PCBs including the emitter 1102 and the receiver 1108 may differ slightly than as designed (such as a slight variation in orientations when the PCBs are designed to be along a same reference plane or parallel to one another). A first reference plane and a second reference plane of a device may be referred to as being the same reference plane, parallel reference planes, or intersecting reference planes as intended through device design without regard to variations in the orientations of the reference planes as a result of manufacturing, calibration, and so on in producing the device.

In some example implementations, the light projected by the emitter 1102 may be IR light. IR light is provided as an example emission from the emitter 1102. In the following description, other suitable wavelengths of light may be used. For example, light in portions of the visible light spectrum outside the IR light wavelength range or ultraviolet light may be output by the emitter 1102. Alternatively, other signals with different wavelengths may be used, such as microwaves, radio frequency signals, and other suitable signals.

The scene 1106 may include objects at different depths from the structured light system (such as from the emitter 1102 and the receiver 1108). For example, objects 1106A and 1106B in the scene 1106 may be at different depths. The receiver 1108 may be configured to receive, from the scene 1106, reflections 1110 of the transmitted distribution 1104 of light points. To receive the reflections 1110, the receiver 1108 may capture an image. When capturing the image, the receiver 1108 may receive the reflections 1110, as well as (i) other reflections of the distribution 1104 of light points from other portions of the scene 1106 at different depths and (ii) ambient light. Noise may also exist in the captured image. The active depth sensing system 1100 may be configured to filter or reduce the ambient light interference and noise to isolate the reflections of the distribution 1104 in the captured image.

In some example implementations, the receiver 1108 may include a lens 1130 to focus or direct the received light (including the reflections 1110 from the objects 1106A and 1106B) on to the sensor 1132 of the receiver 1108. The receiver 1108 also may include or be coupled to an aperture 1120. In some implementations, the aperture 1120 may be the first aperture 1020 or the second aperture 1022 in FIG. 10. Assuming for the example that only the reflections 1110 are received, depths of the objects 1106A and 1106B may be determined based on the baseline 1112, displacement and distortion of the light distribution 1104 (such as in codewords) in the reflections 1110, and intensities of the reflections 1110. For example, the distance 1134 along the sensor 1132 from location 1116 to the center 1114 may be used in determining a depth of the object 1106B in the scene 1106. Similarly, the distance 1136 along the sensor 1132 from location 1118 to the center 1114 may be used in determining a depth of the object 1106A in the scene 1106. The distance along the sensor 1132 may be measured in terms of number of pixels of the sensor 1132 or a distance (such as millimeters).

In some example implementations, the sensor 1132 (such as an IR image sensor) may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 1132 including an array of photodiodes, the sensor 1132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 1132 may include at least a number of pixels equal to the number of possible light points in the distribution 1104. For example, the array of photodiodes or the CMOS sensor may include a number of photodiodes or a number of pixels, respectively, corresponding to the number of possible light points in the distribution 1104. The sensor 1132 logically may be divided into groups of pixels or photodiodes (such as 4×4 groups) that correspond to a size of a bit of a codeword. The group of pixels or photodiodes also may be referred to as a bit, and the portion of the captured image from a bit of the sensor 1132 also may be referred to as a bit. In some example implementations, the sensor 1132 may include the same number of bits as the distribution 1104.

If the light source 1124 transmits IR light (such as NIR light at a wavelength of, e.g., 940 nm), the sensor 1132 may be an IR sensor to receive the reflections of the NIR light. The sensor 1132 also may be configured to capture an image using a flood illuminator (not illustrated). In some implementations, the sensor 1132 may be an example of an image sensor 1003 in FIG. 10, an image sensor 302 in FIG. 3A, or an image sensor 303 in FIG. 3A. While not shown for simplicity, an optical element 1004 may be configured to direct light from the aperture 1120 to the sensor 1132. For example, when the sensor 1132 is an example implementation of the image sensor 1003, the optical element 1004 may direct light from a first aperture 1020 or from a second aperture 1022 to the sensor 1132 in different OE modes. In this manner, the sensor 1132 may be shared by multiple apertures.

As illustrated, the distance 1134 (corresponding to the reflections 1110 from the object 1106B) is less than the distance 1136 (corresponding to the reflections 1110 from the object 1106A). Using triangulation based on the baseline 1112 and the distances 1134 and 1136, the differing depths of objects 1106A and 1106B in the scene 1106 may be determined in generating a depth map of the scene 1106. Determining the depths may further include determining a displacement or a distortion of the distribution 1104 (such as a distortion of a codeword) in the reflections 1110.

Although a number of separate components are illustrated in FIG. 11, one or more of the components may be implemented together or include additional functionality. All described components may not be required for an active depth sensing system 1100, or the functionality of components may be separated into separate components. Additional components not illustrated also may exist (such as an optical element and additional apertures). For example, the receiver 1108 may include a bandpass filter to allow signals having a determined range of wavelengths to pass onto the sensor 1132 (thus filtering out signals with a wavelength outside of the range). In this manner, some incidental signals (such as ambient light) may be prevented from interfering with the captures by the sensor 1132. The range of the bandpass filter may be centered at the transmission wavelength for the emitter 1102. For example, if the emitter 1102 is configured to transmit NIR light with a wavelength of 940 nm, the receiver 1108 may include a bandpass filter configured to allow NIR light having wavelengths within a range of, e.g., 920 nm to 960 nm. Therefore, the examples described with reference to FIG. 11 are for illustrative purposes, and the present disclosure is not limited to the example structured light system 1100 for active depth sensing.

Figure 12:
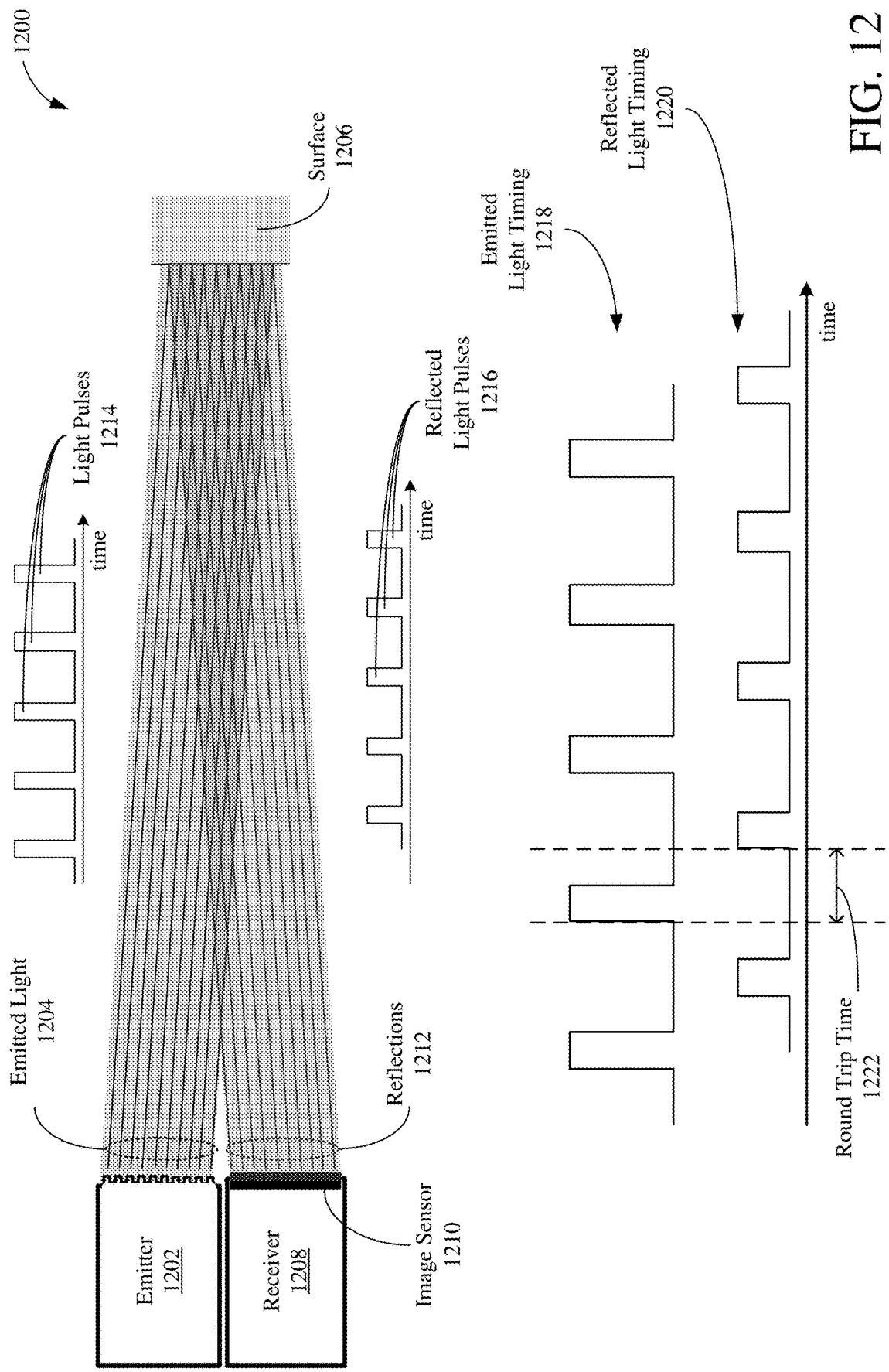
FIG. 12 shows a depiction of a direct time-of-flight (TOF) active depth sensing system including an emitter.
Figure 13:
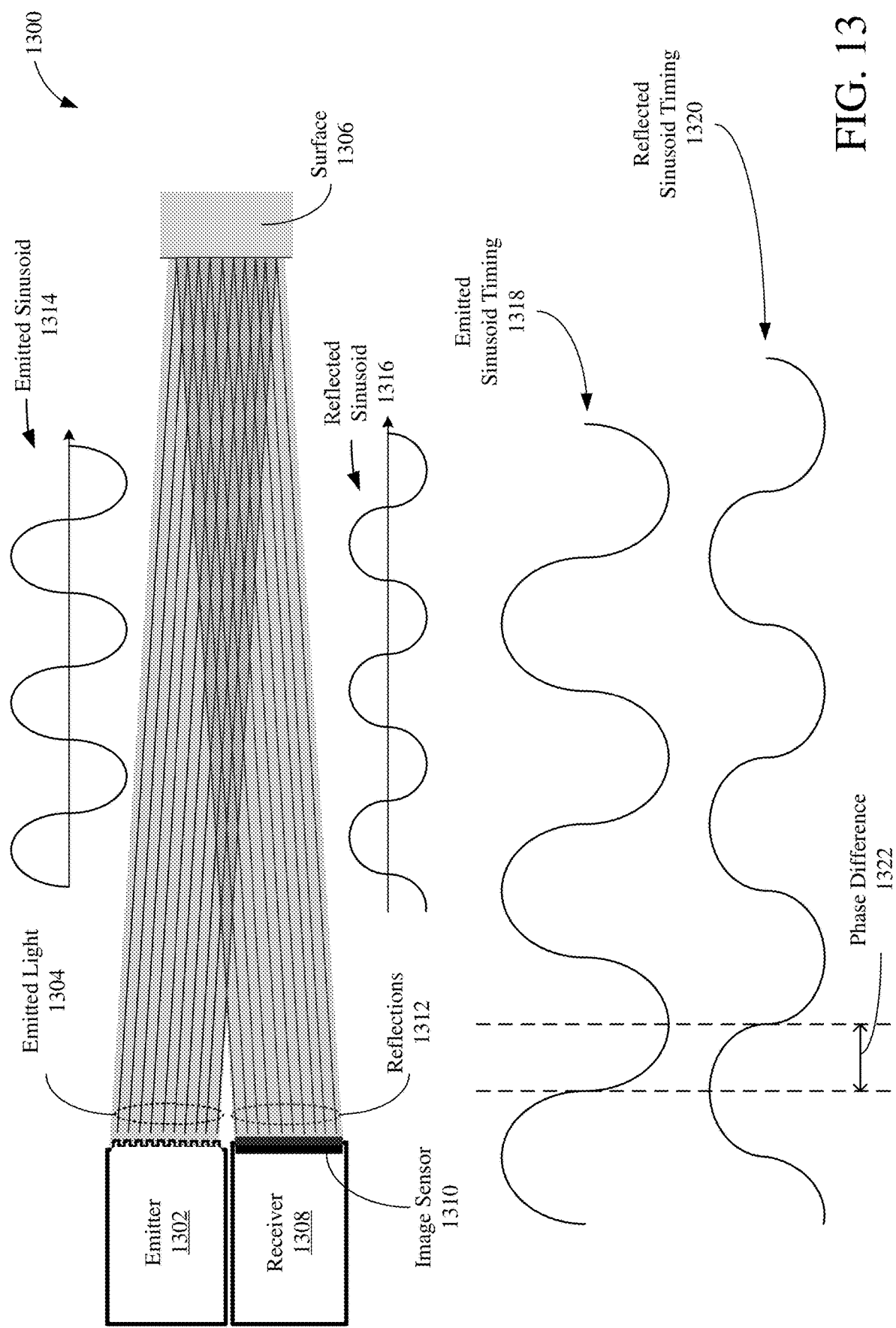
FIG. 13 shows a depiction of an indirect TOF active depth sensing system including an emitter.

Other active depth sensing systems may include TOF active depth sensing systems. An example TOF active depth sensing system includes a direct TOF active depth sensing system (such as depicted in FIG. 12). A direct TOF system emits pulses, senses the pulses, and determines a difference in time between emitting a pulse and sensing a reflection of the pulse. The direct TOF system uses the time difference to determine a round trip time, and thus a depth of an object from the TOF system. Another example TOF active depth sensing system includes an indirect TOF active depth sensing system (such as depicted in FIG. 13). An indirect TOF system may also be referred to as a Frequency Modulated Continuous Wave (FMCW) TOF system. An indirect TOF system emits a periodic signal (such as a continuous wave sinusoidal signal or periodic pulsed light), senses a reflection of the signal, and determines a phase difference between the emitted signal and the sensed reflection of the signal. The indirect TOF system uses the phase difference to determine a depth of an object from the TOF system.

FIG. 12 shows a depiction of a direct TOF active depth sensing system 1200 including an emitter 1202. The emitter 1202 may be an example implementation of the first emitter 1002 depicted in FIG. 10. The emitter 1202 may be configured to emit signals (such as light 1204) toward a scene including surface 1206. While the emitted light 1204 is illustrated as being directed to surface 1206, the field of the emission by the emitter 1202 may extend beyond the size of the surface 1206. For example, a TOF system emitter may have a fixed focal length lens that defines the field of the emission for the emitter. The emitter 1202 may be an example implementation of the first emitter 1002 or the second emitter 1003. While not shown for simplicity, an optical element may be configured to direct light from the emitter 1202 to one of multiple apertures (such as apertures 1020 and 1022 in FIG. 10).

The emitted light 1204 includes light pulses 1214 at known time intervals (such as a defined period). The receiver 1208 includes an image sensor 1210 to sense the reflections 1212 of the emitted light 1204. The reflections 1212 include the reflected light pulses 1216, and the round trip time 1222 is determined for the light by comparing the timing 1218 of the emitted light pulses 1214 to the timing 1220 of the reflected light pulses 1216. The distance of the surface 1206 from the TOF system 1200 may be calculated to be half the round trip time multiplied by the speed of the emissions (such as the speed of light for light emissions). The depth may be determined using equation (1) below:

$$D = \frac{TOF * c}{2} \quad (1)$$

where D is the depth of the surface 1206 from the direct TOF system 1200 and c is the speed of light (based on the emitter 1202 emitting light 1204).

The image sensor 1210 may include an array of photodiodes and components to sense the reflections and produce an array of currents or voltages corresponding to the intensities of the light received. Each entry in the array may be referred to as a pixel or cell. The voltages (or currents) from a pixel may be compared over time to detect reflections 1212 of the emitted light 1204. For example, the signal from a pixel may be compared to a threshold (corresponding to noise or ambient light interference), and peaks greater than the threshold may be identified as reflected light pulses 1216 sensed by the image sensor 1210. The threshold may be based on ambient light, noise, or other interference. For example, an amount of ambient light may exist (without the emitted light 1204), and the threshold may be based on the magnitude of ambient light (such as measured by the image sensor 1210 when the emitter 1202 is not emitting). The upper limit of the effective range of a TOF system 1200 may be the distance where the noise or the degradation of the signal before sensing the reflections cause the signal-to-noise ratio (SNR) to be too great for the image sensor 1210 to accurately sense the reflected light pulses 1216. To reduce interference (and thus increase range or improve the signal to noise ratio), the receiver 1208 may include a bandpass filter before the image sensor 1210 to filter incoming light outside of a wavelength range centered at the wavelength of the emitted light 1204.

In some implementations, each pixel of an image sensor 1210 of a direct TOF system 1200 may include a single-photon avalanche diode (SPAD) due to its sensitivity and responsivity to enable identifying pulses in the reflections and resolving the arrival time of pulsed light reflections. Each SPAD may be coupled to a readout circuit, a time-correlated time-to-digital converter (TDC) and one or more memory cells of the image sensor 1210 to enable the image sensor 1210 to capture images. An alternative to a direct TOF system is an indirect TOF system. The image sensor 1210 may be an example implementation of the image sensor 1003 in FIG. 10 or the image sensor 302 or 303 in FIG. 3A. While not shown for simplicity, an optical element may be configured to direct light from a first aperture or a second aperture (such as apertures 1020 and 1022 in FIG. 10) to the image sensor 1210.

FIG. 13 shows a depiction of an indirect TOF active depth sensing system 1300 including an emitter 1302. The emitter 1302 may be an example implementation of the first emitter 1002 depicted in FIG. 10. The emitter 1302 may be configured to emit signals (such as light 1304) toward a scene including surface 1306. While not shown for simplicity, an optical element may direct light from the emitter 1302 to one or multiple apertures based on an OE mode. While the emitted light 1304 is illustrated as being directed to surface 1306, the field of the emission by the emitter 1302 may extend beyond the size of the surface 1306. For example, a TOF system emitter may have a fixed focal length lens that defines the field of the emission for the transmitter.

The emitted light 1304 includes a sinusoidal signal 1314 (or other suitable periodic signal) of a defined frequency. The receiver 1308 includes an image sensor 1310 to sense the reflections 1312 of the emitted light 1304. The image sensor 1310 may be an example implementation of the image sensor 1003 in FIG. 10 or the image sensor 302 or 303 in FIG. 3A. While not shown for simplicity, an optical element may be configured to direct light from a first aperture or a second aperture (such as apertures 1020 and 1022 in FIG. 10) to the image sensor 1310. The reflections 1312 include the reflected sinusoidal signal 1316. A phase difference 1322 between the emitted sinusoidal signal 1314 and the reflected sinusoidal signal 1316 (as illustrated by emitted sinusoid timing 1318 and reflected sinusoid timing 1320) is determined. The phase difference 1322 may indicate a round trip time and thus may be used to determine the distance of the surface 1306 from the indirect TOF system 1300. To produce the sinusoidal signal 1314, the TOF system 1300 may be configured to modulate a carrier signal to produce the sinusoid wave. For example, a 940 nanometer wavelength light may be modulated to create the sinusoidal signal 1314. The frequency of the wave may be referred to herein as a modulation frequency. In comparing the relationship of TOF and phase difference, the TOF may be defined in terms of the measured phase difference (PD) and the modulation frequency ($f_{mod}$), as depicted in equation (2) below:

$$TOF = \frac{PD}{2\pi f_{mod}} \quad (2)$$

In a simplified example, if the PD is $\pi$ and $f_{mod}$ is approximately 250 kilohertz (kHz), the TOF is 2 microseconds (1 divided by 500 kHz). Referring back to equation (1), the depth D based on the TOF equaling 2 microseconds is approximately 300 meters.

While FIG. 13 illustrates the emitted light 1304 as having a sinusoidal waveform (illustrated by sinusoid 1314), any suitable waveform may be used. For example, the TOF system 1300 may be configured to stepwise increase and decrease the intensity of the emitted light in a periodic pattern. In this manner, the waveform of the emitted light may approximate a square wave (such as for a periodic pulsed signal). Other waveforms may be used, including a saw waveform and so on. As used herein, a sinusoid waveform or wave may refer to any suitable waveform for the signals (including an approximated square wave).

In some implementations, the indirect TOF system 1300 may include a demodulation circuit for each pixel of the image sensor 1310 (referred to herein as a demodulation pixel or a lock-in pixel). Each demodulation pixel may include a demodulation photodetector and be configured to generate and store one or more voltages corresponding to a phase or phase difference of the reflected sinusoidal signal received at the photodiode of the array and the emitted sinusoidal signal. The phase difference may be determined from the one or more stored voltages. For example, a demodulation pixel may generate a voltage signal (such as using a current from a photodiode to determine whether to send a pixel voltage (such as a rail voltage) or a low voltage as the voltage signal). An example image sensor 1310, using the demodulation pixels, may generate an array of voltages for a single capture by the image sensor 1310. The array of voltages may be processed to generate a PD for each pixel, and the PDs are processed to generate one or more depths of objects in the scene.

While some example active depth sensing systems are described in the present disclosure, any suitable active depth sensing system may be used. The first emitter 1002 (or the second emitter 1003) of the device 1000 in FIG. 10 is not limited to a specific type of emitter for active depth sensing or a specific type or configuration of active depth sensing. As such, a device mode of the device 1000 may be configured for any suitable configuration of active depth sensing.

As noted herein, an optical element 1004 may be configured to switch between two or more OE modes for active depth sensing. For example, if the first aperture 1020 is positioned on a first side of the device 1000 and the second aperture 1022 is positioned on a second side of the device 1000, a first OE mode may be associated with active depth sensing for light emitted from the first side of the device 1000, and a second OE mode may be associated with active depth sensing for light emitted from the second side of the device 1000. Also as noted herein, the device 1000 may be configured to switch between two or more device modes. For example, if the device 1000 includes a second emitter 1003, a first device mode may be associated with a first type or configuration of active depth sensing using the first emitter 1002, and a second device mode may be associated with a second type or configuration of active depth sensing using the second emitter 1003. For example, the first emitter 1002 may be configured to emit a first distribution of light, and the second emitter 1003 may be configured to emit a second distribution of light (such as a distribution of light having different size or distribution of codewords than the first distribution of light). In another example, the first emitter 1002 may be configured to emit a distribution of light for structured light depth sensing, and the second emitter 1003 may be configured to emit pulsed light for TOF depth sensing. In some other implementations, the device 1000 may be configured to switch between one or more active depth sensing modes and one or more image capture modes. For example, if the device 1000 includes an image sensor 1003, the device 1000 may be configured to switch between an active depth sensing mode using the first emitter 1002 and an image capture mode using the image sensor 1003. If the device 1000 includes an image sensor or second emitter 1003, an OE mode of the optical element 1004 may depend on a device mode of the device 1000. In some implementations, the device 1000 may not include an image sensor or a second emitter 1003, and the device 1000 may not have different device modes. The OE mode of the optical element 1004 may depend from other criteria, such as an intended direction of emission for active depth sensing.

Figure 14A:
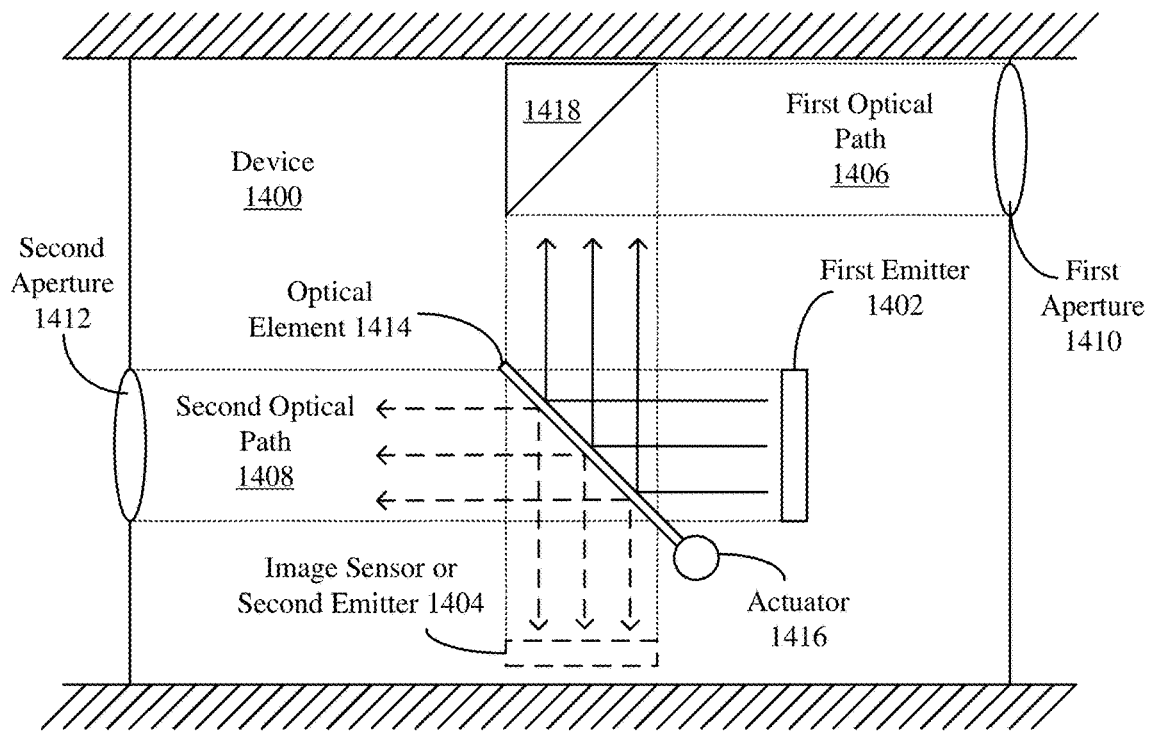
FIG. 14A shows a cross-section of an example device portion illustrating a first emitter associated with a first optical path.
Figure 14B:
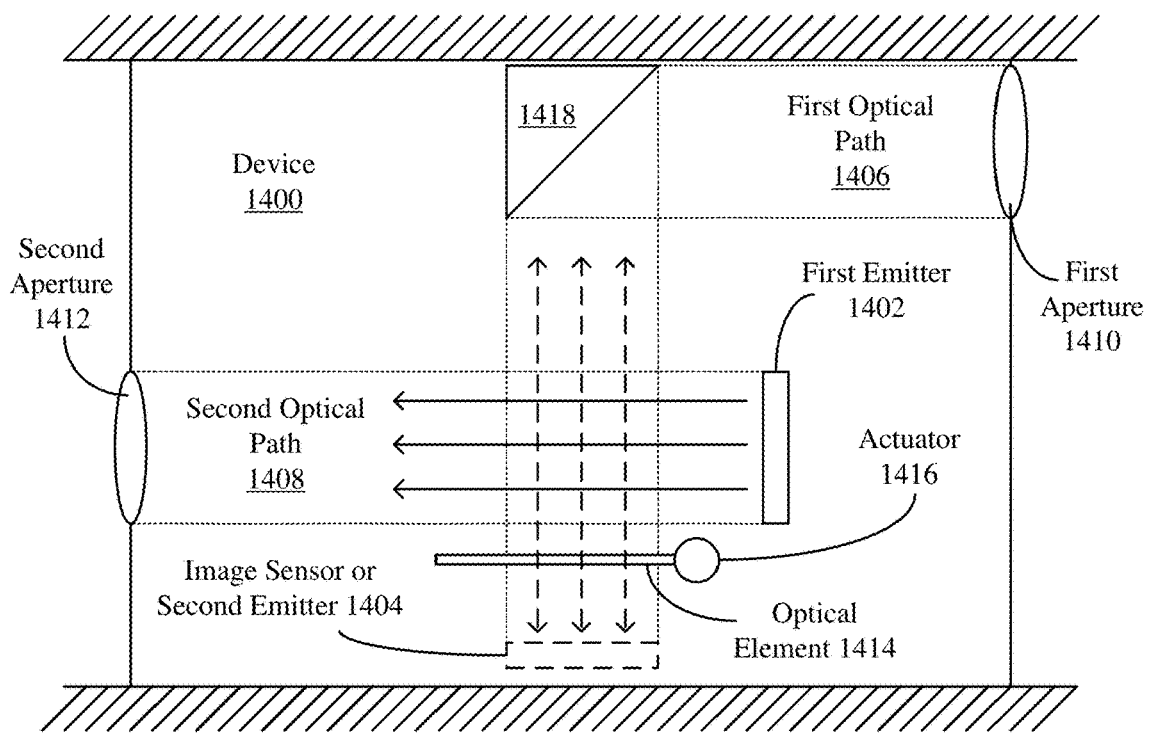
FIG. 14B shows the cross-section of the example device portion in FIG. 14A illustrating the first emitter associated with a second optical path.
Figure 15A:
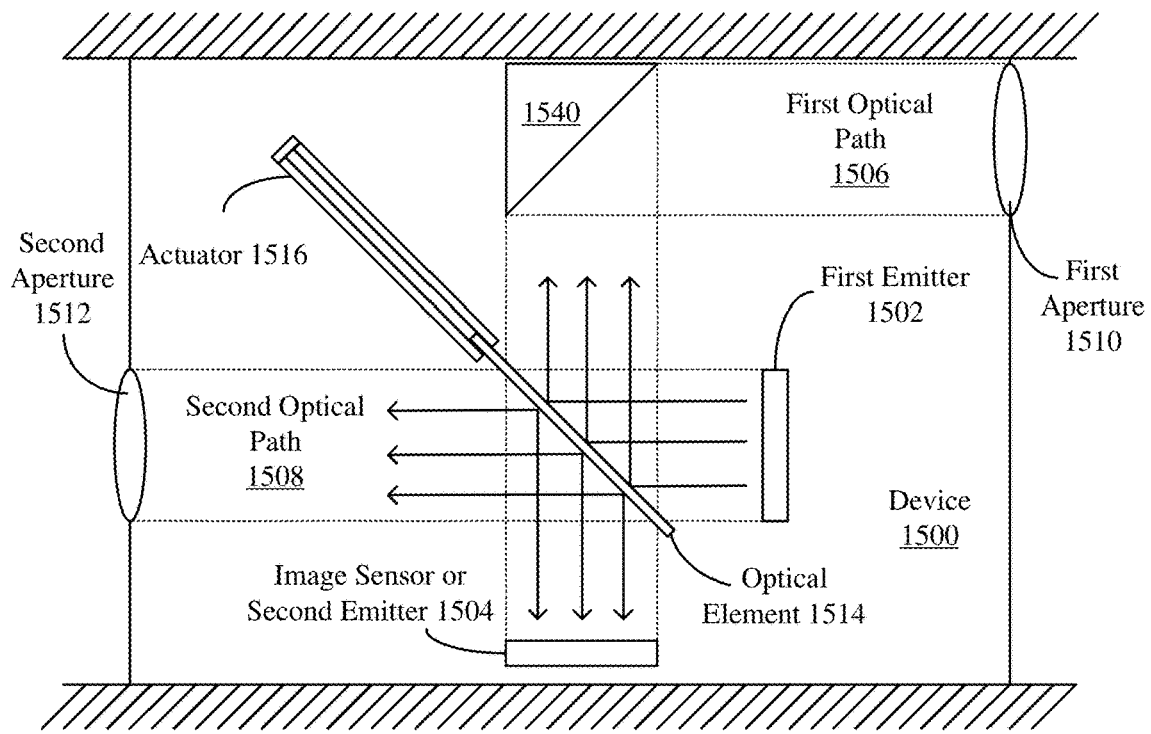
FIG. 15A shows a cross-section of an example device portion illustrating a first emitter associated with a first optical path.
Figure 15B:
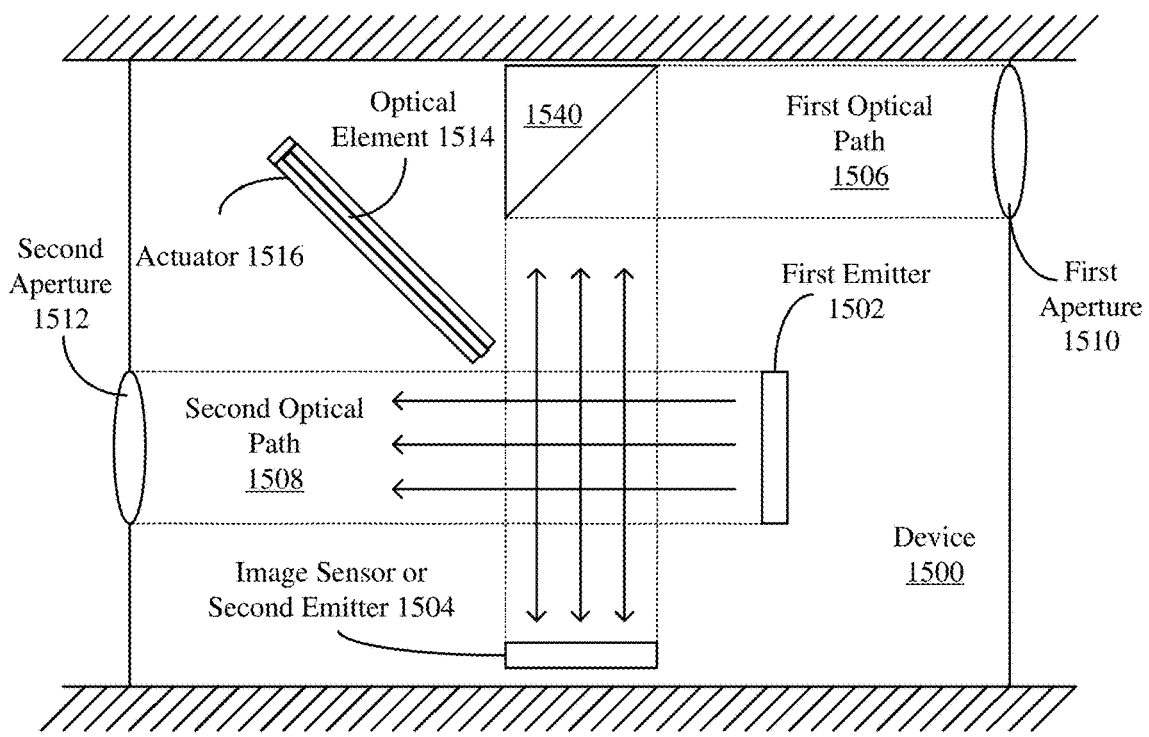
FIG. 15B shows the cross-section of the example device portion in FIG. 15A illustrating the first emitter associated with a second optical path.
Figure 16A:
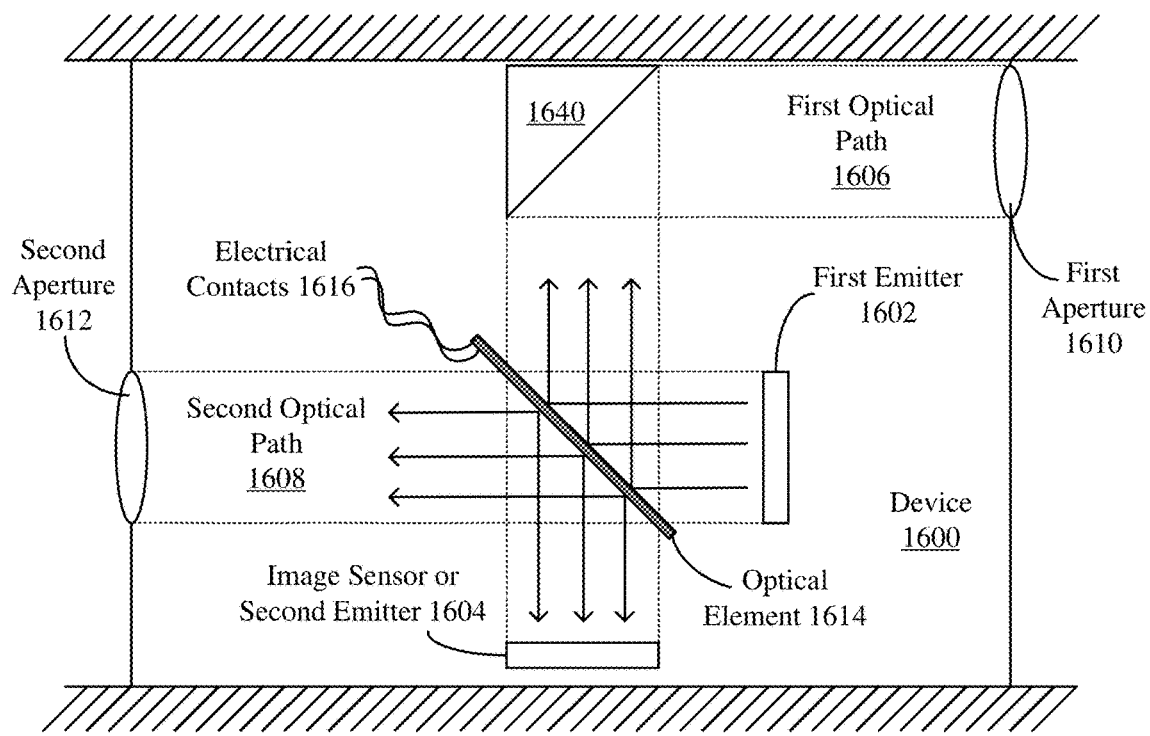
FIG. 16A shows a cross-section of an example device portion illustrating a first emitter associated with a first optical path.
Figure 16B:
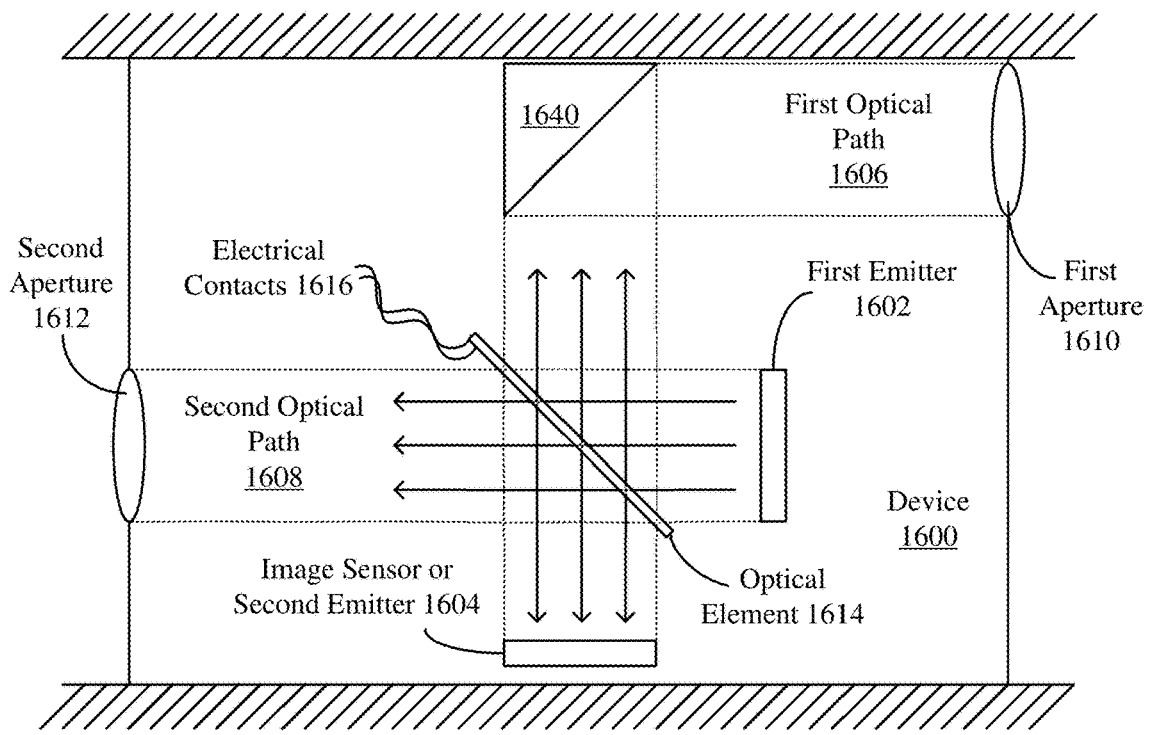
FIG. 16B shows the cross-section of the example device portion in FIG. 16A illustrating the first emitter associated with a second optical path.

In switching between OE modes, the device 1000 (such as the controller 1010) may adjust the optical element 1004. For example, the device 1000 may rotate the optical element 1004 (such as depicted in FIGS. 14A and 14B and similar to as depicted in FIGS. 4A and 4B), adjust a position of the optical element 1004 (such as depicted in FIGS. 15A and 15B and similar to as depicted in FIGS. 5A and 5B), or adjust a state of the optical element 1004 based on a stimuli (such as an electrical current) applied to the optical element (such as depicted in FIGS. 16A and 16B and similar to as depicted in FIGS. 6A and 6B). The optical element and adjusting the optical element depicted in FIGS. 16C-16F may be similar to as depicted in FIGS. 6E-6H.

FIG. 14A shows a cross-section of an example device 1400 portion illustrating a first emitter 1402 associated with a first optical path 1406 when the device 1400 is in a first mode. The optical element 1414 is configured to direct light from the first emitter 1402 to the first optical path 1406 (and on to the first aperture 1410) during a first OE mode. The optical element 1414 is similar to the optical element 414 in FIGS. 4A and 4B. Light may propagate along the first optical path 1406, and the light may be from the first aperture 1410 or the optical element 1414. One or more components 1418 may direct the light between the first optical path 1406 and the optical element 1414. The device 1400 includes a second aperture 1412 configured to direct light along a second optical path 1408 or receive light propagated along the second optical path 1408 in the device 1400. While the apertures 1410 and 1412 are shown on different sides of the device 1400, the apertures 1410 and 1412 may be on a same side of the device 1400. The optical element 1414 (and any components 1418) may be in any suitable orientation and configuration to direct light between the first optical path 1406 and the first emitter 1402 during a first device mode. If the first aperture 1410 is positioned on the left side of device 1400 illustrated in FIG. 14A (similar to FIG. 4C), the component 1418 may direct light received from the optical element 1414 to the first aperture 1410 (or vice versa). In the second OE mode, the first emitter 1402 may emit light that is emitted outside of the device 1400 via the second aperture 1412 (such as depicted in FIG. 14B). In the illustrated example device 1400, the optical element 1414 may block the light from the first emitter 1402 from reaching the second aperture 1412 (with the light instead being reflected to the first aperture 1410).

If the device 1400 includes an image sensor 1404, the optical element 1414 may be configured to direct the light from the second optical path 1408 to the image sensor 1404 in the first OE mode. If the device 1400 includes a second emitter 1404, the optical element 1414 may be configured to direct the light from the emitter 1404 to the second optical path 1408.

An actuator 1416 may rotate the optical element 1414 to switch between OE modes. The actuator 1416 may be similar to the actuator 416 in FIG. 4A and FIG. 4B. For example, the actuator 1416 may include or be coupled to a rotatory motor or other means to rotate the optical element 1414 between a first orientation and a second orientation, and the actuator 1416 is controlled by a controller (such as controller 1010 in FIG. 10). As noted above in describing FIGS. 4A and 4B, the examples in FIGS. 14A and 14B (and later figures) may refer to the orientation of the optical element with reference to a first optical path. While the examples in FIGS. 14A and 14B (and later figures) may refer to the orientation of the optical element with reference to a first optical path, the orientation of the optical element may be with reference to any suitable device component or suitable reference within the device. For example, the orientation may be with reference to an orientation of an image sensor, with reference to an orientation of an emitter, with reference to a direction of light approaching the optical element from an optical path, and so on.

FIG. 14B shows the cross-section of the device 1400 portion in FIG. 14A with the optical element 1414 at an example second orientation with reference to the first optical path 1406 for a second OE mode. In the second OE mode, the device 1400 is configured to direct light from the first emitter 1402 to the second optical path 1408. If the device 1400 includes an image sensor or second emitter 1404, the device 1400 is also configured to direct light from/to the first optical path 1406 to/from the image sensor or second emitter 1404 during the second device mode.

As noted above for optical element 414 (FIGS. 4A and 4B), a reflectiveness and transparency or a refractive index of the optical element 1414 may be based on an angle of incidence of light received at the optical element 1414. In this manner, the reflectiveness and transparency of the optical element 1414 may be based on the orientation of the optical element 1414 with reference to the first optical path 1406. The optical element 1414 may be composed of materials as described above for optical element 414.

If the apertures 1410 and 1412 are on different sides of the device, an OE mode may be based on an intended direction to emit light from the device 1400 (or for capturing an image for an image sensor 1404). If the apertures 1410 and 1412 are on the same side of the device, for a second device mode including an image sensor 1404, the image sensor 1404 may be used for wider FOV imaging or three dimensional imaging (such as described above with reference to FIGS. 3C, 3D and 3F). For a first device mode (or a second device mode including a second emitter 1404), the apertures on a same side of the device may be oriented and configured to direct light from the emitter on to different portions of a scene (such as described herein with reference to wider FOV imaging). In this manner, the light from the emitter may be emitted onto a larger portion of the scene than if only one aperture is used.

Referring back to FIGS. 4E and 4F, multiple instances of the image capture system may coexist in a device. In some implementations, multiple instances of the active depth sensing system may exist in the device 1000. In addition, or to the alternative, one or more instances of the active depth sensing system may exist with one or more instances of the image capture system in a device. For example, referring back to FIG. 3G, a first aperture 364 and a second aperture 366 may be associated with an active depth sensing system (similar to as illustrated in FIG. 14A). A third aperture 368 and a fourth aperture 370 may be associated with a second active depth sensing system (similar to as illustrated in FIG. 14A) or an image capture system (similar to as illustrated in FIG. 4A). If two emitters 1002 and 1003 share a first aperture 364 and a second aperture 366, and two image sensors 302 and 303 share a third aperture 368 and a fourth aperture 370, a first image sensor may be associated with a first emitter, and a second image sensor may be associated with a second emitter. In this manner, the device may include multiple active depth sensing systems. In another example, the device may include one emitter and three image sensors (with the emitter and one image sensor sharing two apertures). While FIGS. 14C and 14D show an example of a combination of image sensors and emitters, any combination, number, and configuration of emitters, image sensors, optical elements, and so on may be included in a device.

Figure 14C:
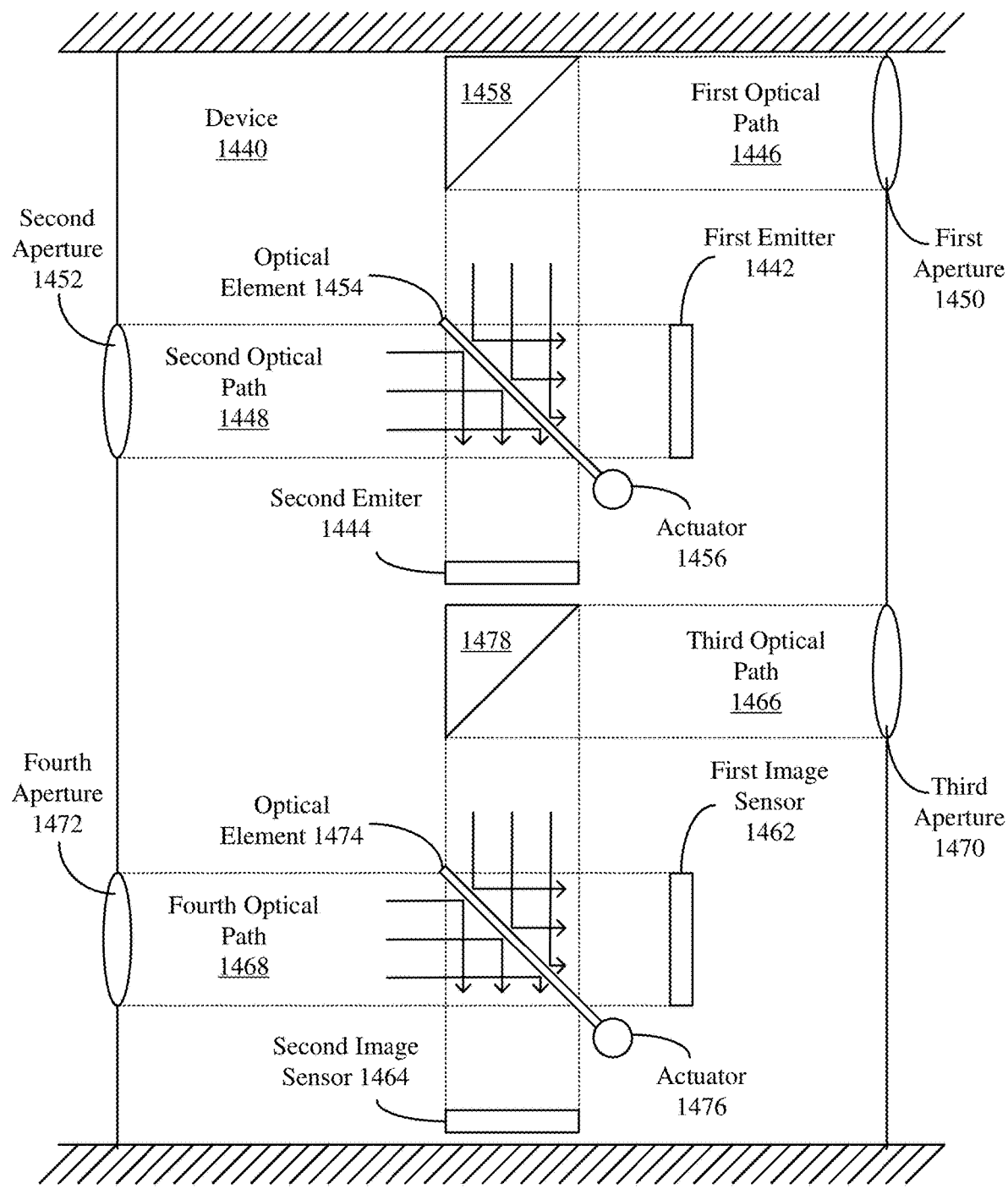
FIG. 14C shows a cross-section of an example device portion illustrating a first emitter associated with a first optical path and a first image sensor associated with a third optical path.

FIG. 14C shows a cross-section of an example device 1440 portion illustrating a first emitter 1442 associated with a first optical path 1446 and a first image sensor 1462 associated with a third optical path 1466. The optical element 1454 may direct light from the first emitter 1442 to the first optical path 1446 based on the optical element 1454 being in a first orientation. The optical element 1474 may direct light from the third optical path 1466 to the first image sensor 1462 based on the optical element 1474 being in a first orientation. In some implementations, the optical element 1454 may also direct light from the second emitter 1444 to the second optical path 1448 based on the optical element 1454 being in a first orientation, and the optical element 1474 may direct light from the third optical path 1466 to the second image sensor 1464 based on the optical element 1474 being in a first orientation. Comparing FIG. 14C to FIG. 4A and FIG. 14A, the components 458 and 478 may be similar to components 418 or 1418, the optical elements 454 and 474 may be similar to optical elements 414 or 1414, and the actuators 456 and 476 may be similar to actuators 416 or 1416.

If the first image sensor 1462 is the receiver for the first emitter 1442, active depth sensing may be performed using the emitter/sensor pair. If the second image sensor 1464 is the receiver for the second emitter 1444, active depth sensing may also be performed using the emitter/sensor pair. The two pairs may be configured for different types of active depth sensing or a different configuration of a same type of active depth sensing. While FIGS. 14C and 14D show emitters sharing apertures and image sensors sharing apertures, a first emitter 1442 may share apertures with a second image sensor 1464, and a second emitter 1444 may share apertures with a first image sensor 1462. For example, in FIG. 14C the second emitter 1444 and the second image sensor 1464 may be switched. In some other implementations, the apertures may be arranged on any side. For example, apertures 1450 and 1452 may be arranged on a side of the device with aperture 1472, and aperture 1470 may be on a different side of the device 1440. In this manner, active depth sensing may be desired in a specific direction from the device (such as from a rear of a smartphone), but image capture may be desired from multiple sides of the device (such as also from a front of a smartphone for selfie imaging). If the apertures for active depth sensing are configured to allow light to be emitted on a wider portion of the scene (and the image sensor is configured to capture images for the wider FOV of the scene), an OE mode for optical element 1454 may alternate to allow depth sensing for a wider portion of the scene (similar to operations for wider FOV imaging described herein). While a few example configurations are described, any suitable configuration of components may be used.

Figure 14D:
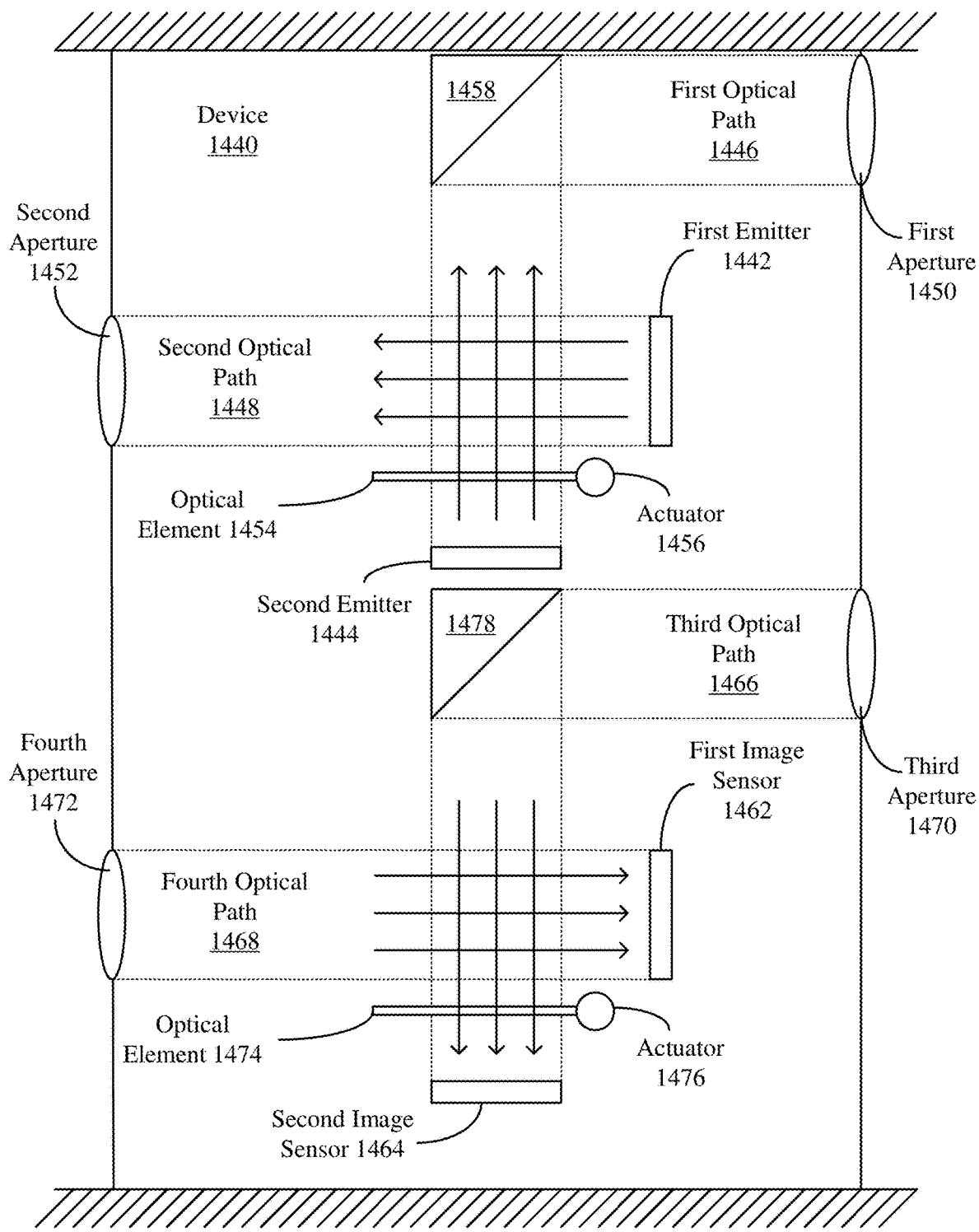
FIG. 14D shows a cross-section of the example device portion in FIG. 14C illustrating a second emitter associated with the first optical path and a second image sensor associated with the third optical path.

FIG. 14D shows a cross-section of the example device 1440 portion illustrating the second emitter 1444 associated with the first optical path 1446 and the second image sensor 1464 associated with the third optical path 1466. The optical element 1454 (in a second orientation) may allow light from the second emitter 1444 to reach the first aperture 1450, and the optical element 1474 (in a second orientation) may allow light from the third optical path 1466 to reach the second image sensor 1464. The optical element 1454 may also allow light from the first emitter 1442 to reach the second aperture 1452, and the optical element 1474 may allow light from the fourth optical path 1468 to reach the first image sensor 1462. Comparing FIG. 14D to FIG. 4B and FIG. 14B, the components 1458 and 1478 may be similar to components 418 or 1418, the optical elements 1454 and 1474 may be similar to optical elements 414 or 1414, and the actuators 1456 and 1476 may be similar to actuators 416 or 1416. In some implementations, one optical element may be shared by the emitters or image sensor 1442, 1444, 1462, and 1464. For example, the emitters and image sensors may be positioned such that one larger optical element may be rotated to direct light as shown in FIG. 14C or FIG. 14D. In some other implementations, the optical elements 1454 and 1474 may have different OE modes from one another or switch modes at different times. In some further implementations, the optical element 1454 and 1474 may be moved or have a stimulus applied to be adjusted. Other configurations may exist, and the disclosure is not limited to the above examples.

FIGS. 15A-16F depict a device including an image sensor or second emitter associated with the optical element. However, the depictions are for clarity in explaining aspects of the disclosure. As shown in FIGS. 10, 14A, and 14B, a device is not required to include the image sensor or second emitter associated with the optical element. As such, the disclosure (including the examples depicted in FIGS. 15A-16F) is not limited to requiring an image sensor or second emitter associated with the optical element.

FIG. 15A shows a cross-section of an example device 1500 portion illustrating a first emitter 1502 associated with a first optical path 1506. The optical element 1514 is configured to direct light from the first emitter 1502 to the first optical path 1506 in a first OE mode. If the device 1500 includes an image sensor or second emitter 1504, the optical element 1514 is also configured to direct light from/to the optical path 1508 to/from the image sensor or second emitter 1504. The light along the first optical path 1506 may exit the device 1500 via the first aperture 1510. If the device 1500 includes an image sensor 1504, light along the second optical path 1508 may enter the device via the second aperture 1512. If the device 1500 includes a second emitter 1504, light from the second emitter 1504 along the second optical path 1508 may exit the device 1500 via the second aperture 1512. Similar to FIGS. 14A and 14B, the device 1500 may include one or more components 1540 configured to direct light between the first optical path 1506 (or the second optical path 1508) and the optical element 1514.

The optical element 1514 may be configured similar to the optical element 514 depicted in FIGS. 5A and 5B. For example, the optical element 1514 may include a one sided mirror or a double sided mirror, a prism, or other suitable element for directing light. An actuator 1516 may be configured to move the optical element 1514 between a first position (such as illustrated in FIG. 15A) and a second position (such as illustrated in FIG. 15B). The actuator 1516 may be controlled by a device controller (such as controller 1010 in FIG. 10). The actuator 1516 may be configured similar to the actuator 516 in FIGS. 5A and 5B.

FIG. 15B shows the cross-section of the device 1500 portion in FIG. 15A with the optical element 1514 at an example second position in the device 1500 in a second OE mode. The device 1500 is configured to direct light from the first emitter 1502 to the second optical path 1508. If the device 1500 includes an image sensor or second emitter 1504, the device 1500 is also configured to direct light between the image sensor or second emitter 1504 and the first optical path 1506. While not shown, the apertures 1510 and 1512 may be on the same side of the device (similar to as illustrated in FIGS. 5C and 5D).

FIG. 16A shows a cross-section of an example device 1600 portion illustrating a first emitter 1602 associated with a first optical path 1606 for a first OE mode. The first emitter 1602 is associated with the first optical path 1606 based on whether an electrical current (or another suitable stimulus) is applied to the optical element 1614. FIG. 16B shows the cross-section of the example device 1600 portion illustrating the first emitter 1602 associated with a second optical path 1608 for a second OE mode. The first emitter 1602 is associated with the second optical path 1608 based on whether an electrical current (or another suitable stimulus) is applied to the optical element 1614. A transparency, reflectiveness, or refractive index of the optical element 1614 may be based on a level of stimulus applied to the optical element 1614 (such as an amount of electrical current applied). For example, the optical element 1614 may be transparent when an electrical current is applied, and the optical element 1614 may be reflective when an electrical current is not applied. The optical element 1614 may be configured similar to the optical element 614 depicted in FIGS. 6A and 6B. For example, the material composition of the optical element 614 and the optical element 1614 may be the same. In this manner, the optical element 1614 may include or be coupled to electrical contacts 1616 for applying an electrical current to the optical element 1614. The electrical contacts 1616 may be controlled by a device controller (such as the controller 1010 in FIG. 10) to control a state of the optical element 1614. Control of the optical element 1614 may be similar to control of the optical element 614 depicted in FIG. 6A and FIG. 6B. For example, the controller 1010 may control a switch to cause electrical current to be applied to or removed from the electrical contacts 1616 in order to switch between OE modes. While not shown, the apertures 1610 and 1612 may be on the same side of the device (similar to as illustrated in FIGS. 6C and 6D).

Figure 16C:
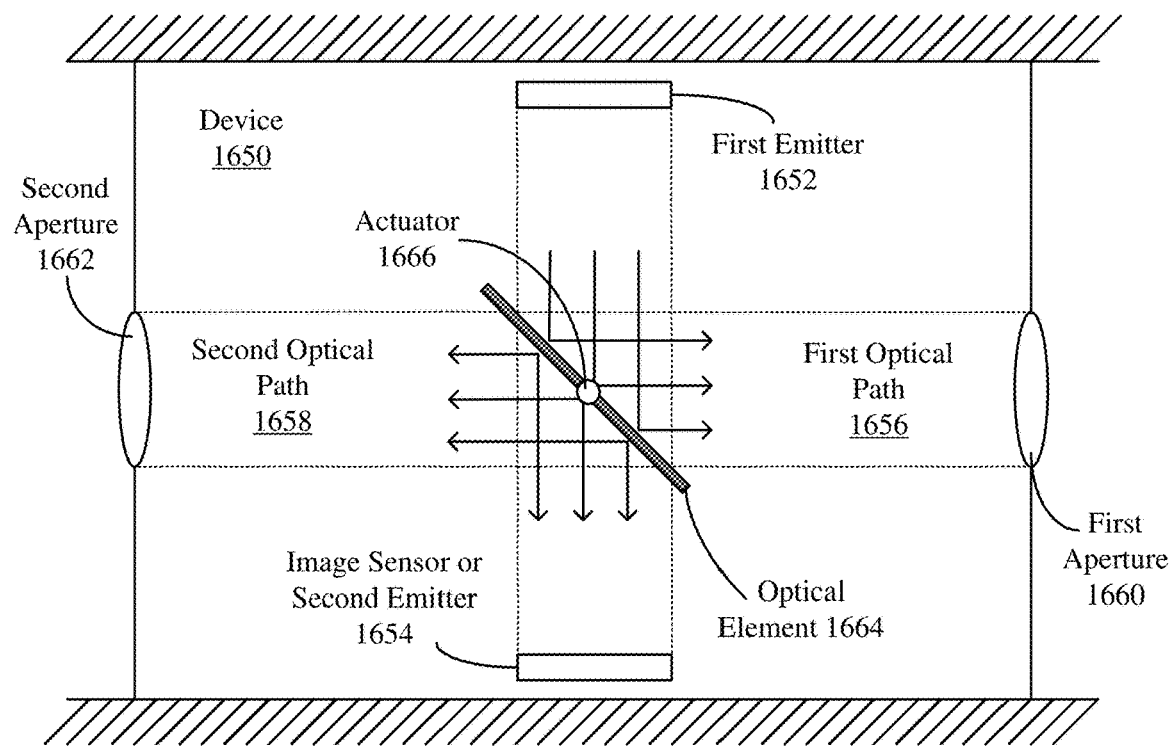
FIG. 16C shows a cross-section of an example device portion illustrating a first emitter associated with a first optical path.

FIGS. 16C-16F show other example implementations of an optical element for switching between OE modes. FIG. 16C shows a cross-section of an example device 1650 portion illustrating a first emitter 1652 associated with a first optical path 1656. A first aperture 1660 is configured to direct light along a first optical path 1656, and a second aperture 1662 is configured to direct light along a second optical path 1658. The optical element 1664, in a first orientation for a first OE mode, directs light from the first emitter 1652 to the first optical path 1656. The optical element 1664 may also direct light from/to the second optical path 1658 to/from the image sensor or second emitter 1654 for the first OE mode. The optical element 1664 may be similar to the optical element 664 in FIG. 6E.

Figure 16D:
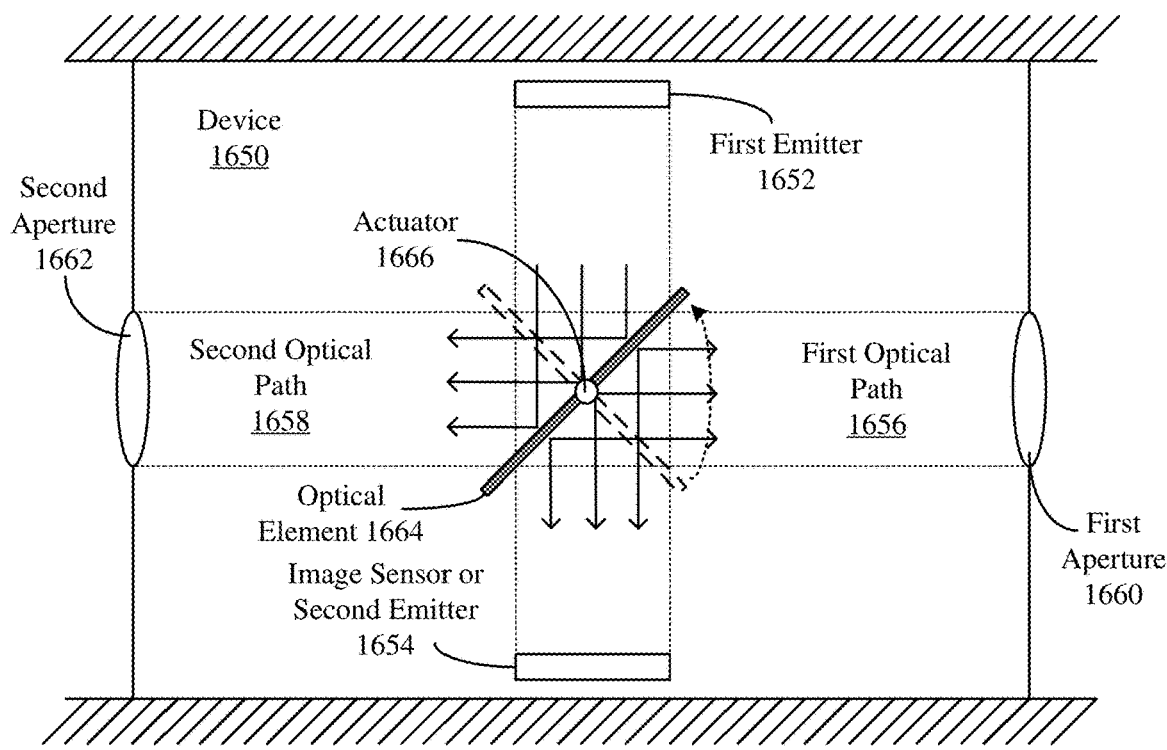
FIG. 16D shows the cross-section of the example device portion in FIG. 16C illustrating the first emitter associated with a second optical path.

In switching between a first OE mode and a second OE mode, the actuator 1666 may rotate the optical element 1664 to a second orientation. The actuator 1666 may be similar to the actuator 1416 in FIG. 14A, except the actuator 1666 rotates the optical element 1664 along an axis towards a center of the optical element 1664 (instead of an axis towards one end of the optical element). FIG. 16D shows the cross-section of the example device portion illustrating the first emitter 1652 associated with the second optical path 1658. The optical element 1664, in the second orientation for a second OE mode, is configured to direct light from the first emitter 1652 to the second optical path 1658. The optical element 664 is also configured to direct light from/to the first optical path 1656 to/from the image sensor or second emitter 1654. In some other implementations, the optical element may be a prism or other object that is moved or rotated to switch between OE modes.

Figure 16E:
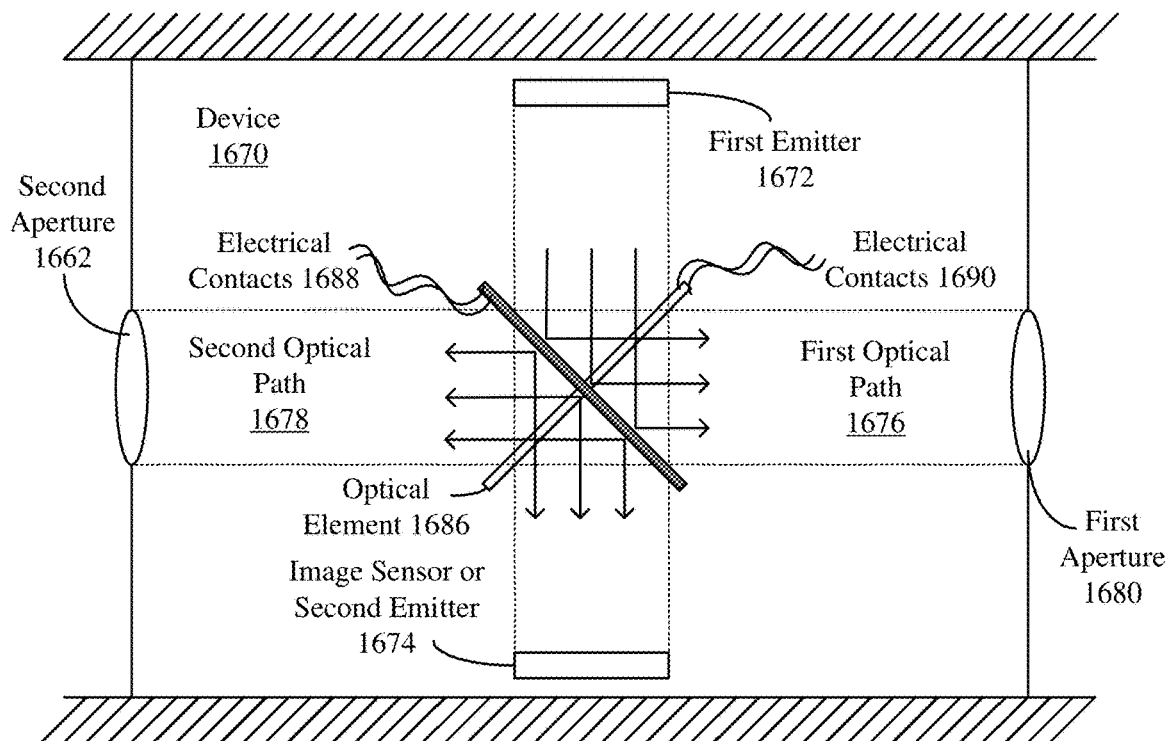
FIG. 16E shows a cross-section of an example device portion illustrating a first emitter associated with a first optical path.

In some implementations, instead of rotating the optical element, the optical element may be a prism or other structure configured to direct light based on a stimulus applied to the optical element. FIG. 16E shows a cross-section of an example device portion illustrating a first emitter 1672 associated with a first optical path 1676. The device 1670 may be similar to the device 1650 in FIG. 16C other than the type of optical element used. For example, the optical element 1686 may be similar to the optical element 686 in FIG. 6G. In this manner, the first emitter 1672 may be similar to the first emitter 1652, the image sensor or second 1674 may be similar to the image sensor or second emitter 1654, the first optical path 1676 may be similar to the first optical path 1656, the second optical path 1678 may be similar to the second optical path 1658, the first aperture 1680 may be similar to the first aperture 1660, and the second aperture 1682 may be similar to the second aperture 1662.

Figure 16F:
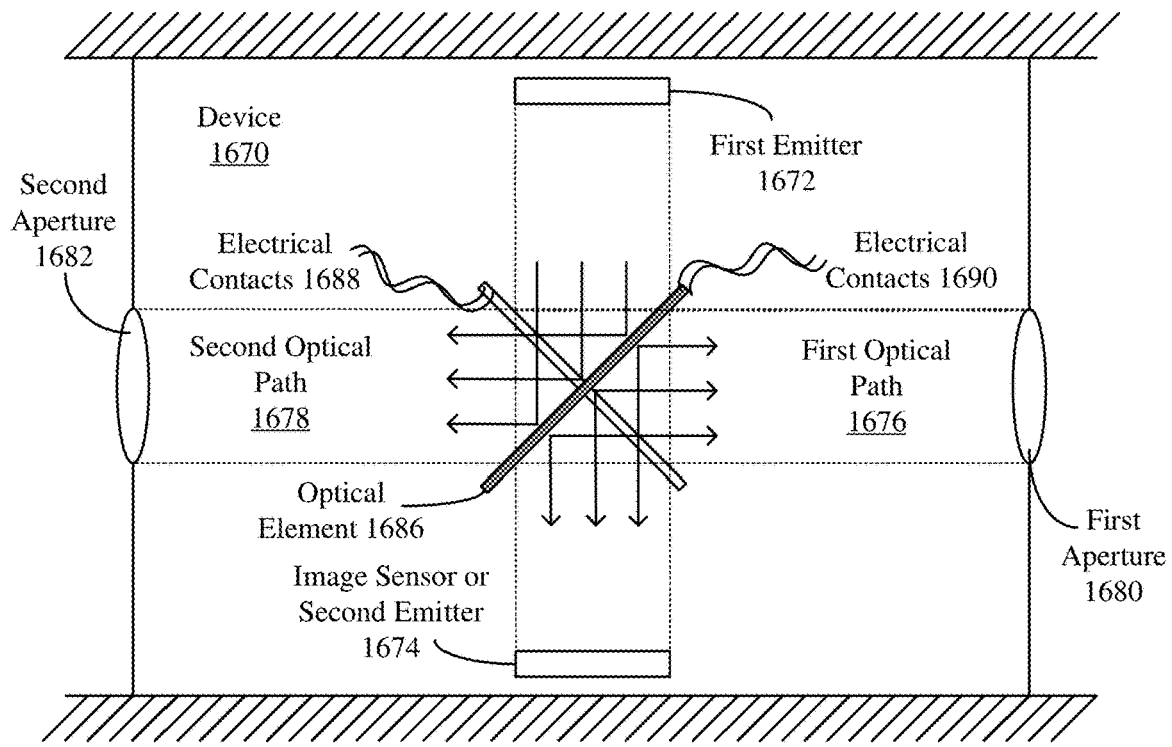
FIG. 16F shows the cross-section of the example device portion in FIG. 16E illustrating the first emitter associated with a second optical path.

While the optical element 1686 is illustrated as changing states based on application of an electrical current via electrical contacts 1688 and electrical contacts 1690, any suitable stimulus may be used and may be applied in any manner. In some implementations, a first portion of the optical element 1686 includes a first set of molecules having a first orientation when an electrical current is applied via the electrical contacts 1688, and a second portion of the optical element 1686 includes a second set of molecules having a first orientation when an electrical current is applied via the electrical contacts 1690. While two electrical contacts are illustrated, any suitable number may be used (such as one or more electrical contacts). When the first set of molecules and the second set of molecules are in the first orientation, the optical element 1686 may be configured to direct light as shown in FIG. 16E (and similar to as shown in FIG. 6G). The first set of molecules and the second set of molecules may also have a second orientation when no electrical current is applied. In this manner, when the first set of molecules and the second set of molecules are in the second orientation, the optical element 1686 may be configured to direct light as shown in FIG. 16F (and similar to as shown in FIG. 6H). FIG. 16F shows the cross-section of the example device portion in FIG. 16E illustrating the first emitter 1672 associated with the second optical path 1678.

In some other implementations, the optical element 1686 may include separate components of two or more optical elements combined together. For example, a first portion of the optical element 1686 may be similar to the optical element 1614 in FIG. 16A. The first portion may be controlled based on an electrical current applied via the electrical contacts 1688. A second portion of the optical element 1686 may be similar to the optical element 1614 rotated by 90 degrees. The second portion may be controlled based on an electrical current applied via the electrical contacts 1690. In this manner, switching between OE modes may include switching between providing an electrical current via contacts 1688 and not providing an electrical current via contacts 1690 for a first OE mode and not providing an electrical current via contacts 1688 and providing an electrical current via contacts 1690 for a second OE mode.

As depicted in FIGS. 14A-16F, directing light by the optical element for an active depth sensing mode may be similar to directing light by the optical element for an image capture mode (such as depicted in FIGS. 3A-6H). In this manner, aspects of the disclosure described herein with reference to an image capture mode may be applied with reference to an active depth sensing mode (such as depicted in FIGS. 10 and 14A-16H).

Figure 17A:
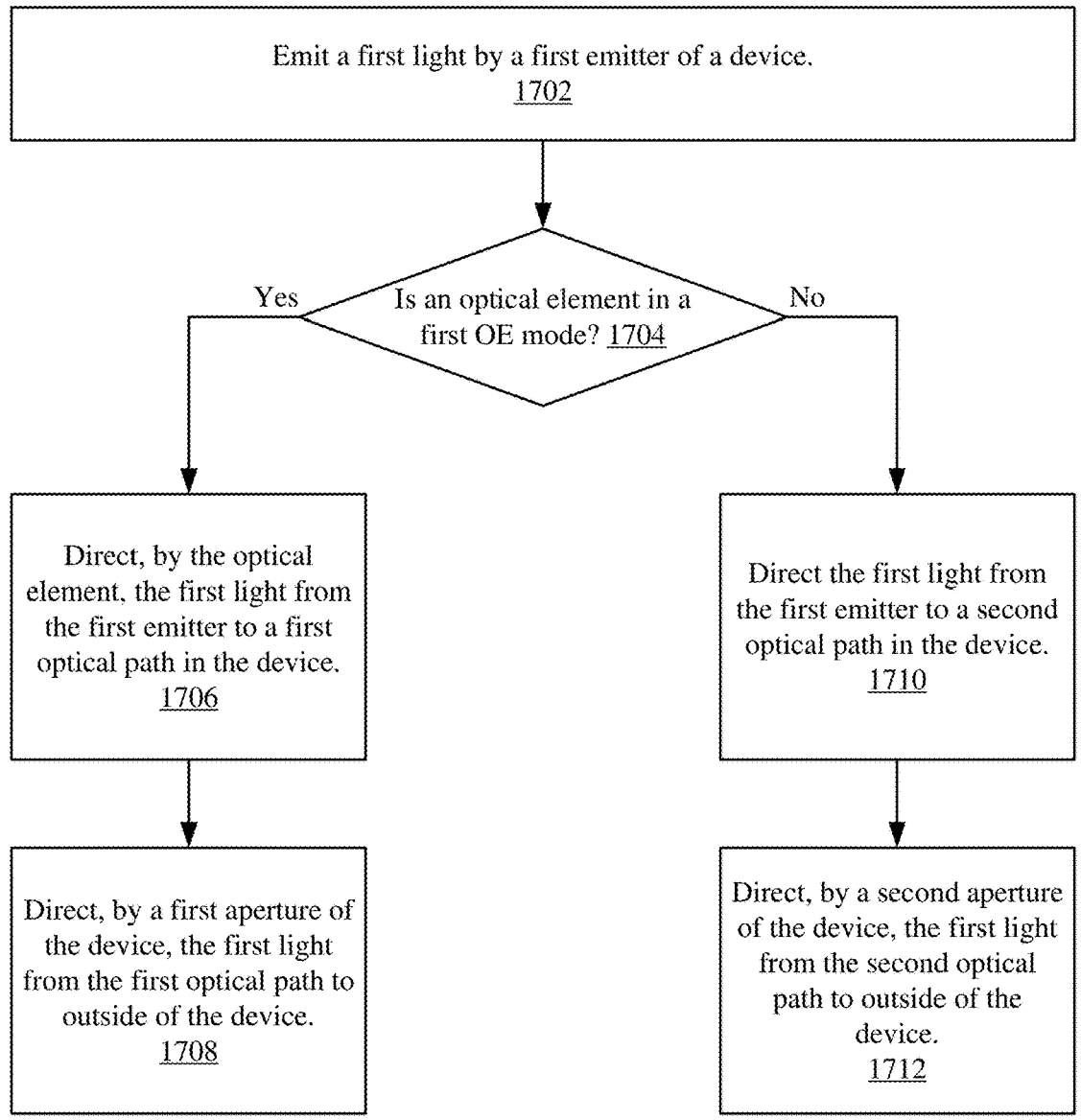
FIG. 17A shows an illustrative flow chart depicting an example operation for active depth sensing by a device.

FIG. 17A shows an illustrative flow chart depicting an example operation 1700 for active depth sensing. The first emitter, the first aperture, and the second aperture may be as depicted in FIGS. 10 and 14A-16B (or as otherwise described). FIG. 17A is described as being performed by the device 1000 depicted in FIG. 10 for clarity purposes. However, any suitable device or device configuration may be used to perform the example operation 1700.

At 1702, a first emitter 1002 of the device 1000 emits a first light for active depth sensing. For example, the first emitter 1002 may emit a first distribution of light, may emit a periodic pulsed light, or may emit a diffuse light (such as for flood illumination). At decision block 1704, if the optical element 1004 is in a first OE mode, the operation 1700 proceeds to step 1706. If the optical element 1004 is not in the first OE mode (such as being in a second OE mode), the operation 1700 proceeds to step 1710. Referring to step 1706, an optical element 1004 directs the first light emitted by the first emitter 1002 to a first optical path 1001. For example, the optical element 1004 may reflect or refract light from the first emitter 1002 to the first optical path 1001 based on an orientation of the optical element 1004, a position of the optical element 1004, a state of the optical element 1004 (based on an electrical current to be applied to the optical element 1004), and so on. At 1708, the first aperture 1020 directs the first light from the first optical path 1001 to outside of the device 1000.

Referring to step 1710, the device 1000 directs the first light from the first emitter 1002 to a second optical path 1024. For example, the optical element 1004 may be in a position to not block light from the first emitter 1002 to reach the second optical path 1024 (and the second aperture 1022). In another example, the optical element 1004 may have an orientation or be in a state based on a stimulus (such as an electrical current applied or not applied) to allow light from the first emitter 1002 to pass through the optical element 1004 and to the second optical path 1024. At 1712, the second aperture 1022 directs the first light from the second optical path 1024 to outside of the device 1000. As noted herein, the controller 1010 may be configured to adjust the optical element 1004 to switch between OE modes for the example operation 1700.

Figure 17B:
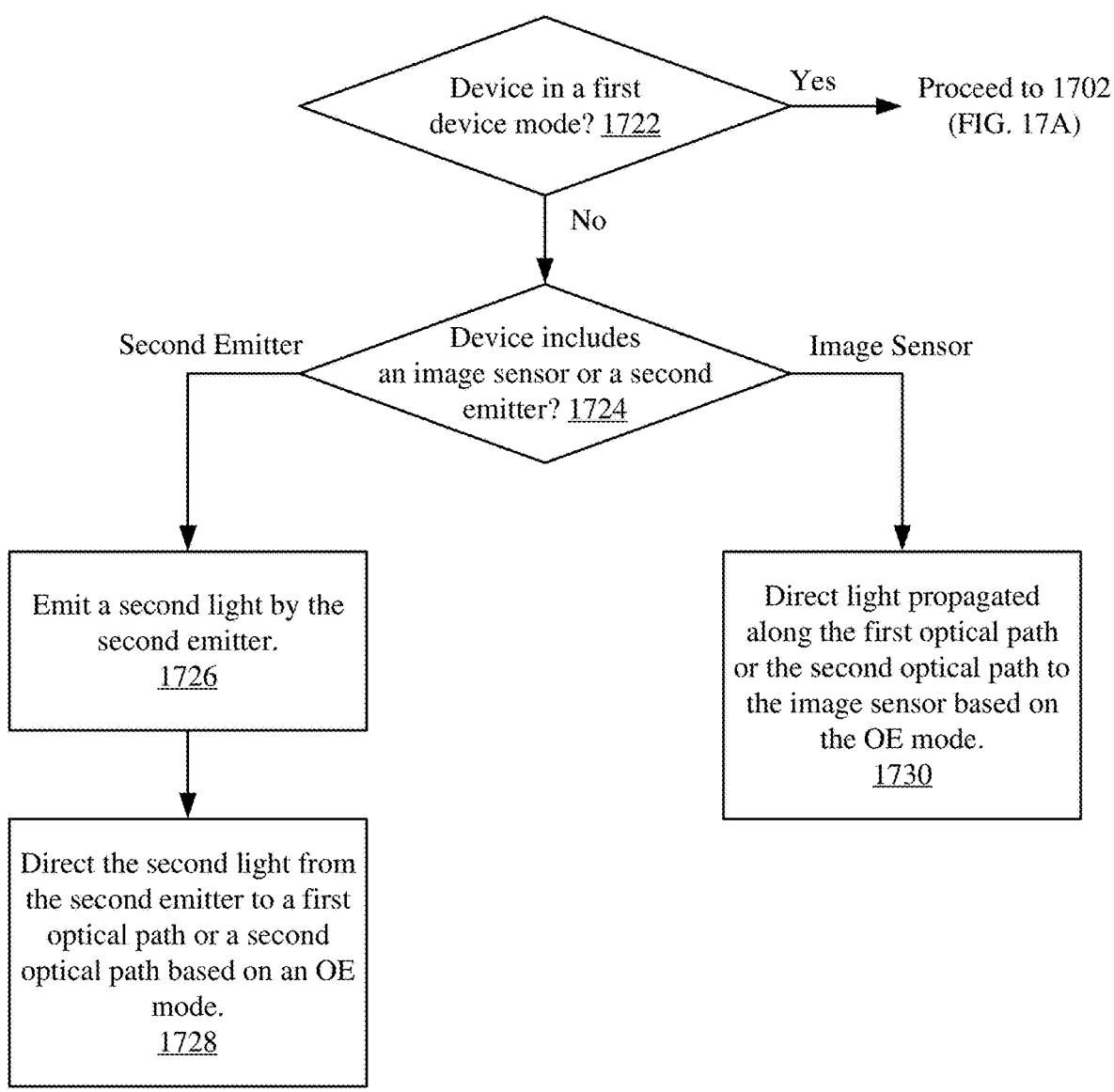
FIG. 17B shows an illustrative flow chart depicting an example operation for active depth sensing by a device configured for multiple device modes.

If the device 1000 includes the image sensor or second emitter 1003, the device 1000 may also have different device modes. FIG. 17B shows an illustrative flow chart depicting an example operation 1720 for active depth sensing by the device 1000 configured for different device modes. At decision block 1722, if the device 1000 is in a first device mode, operation may proceed to step 1702 in FIG. 17A. In this manner, the first emitter 1002 is to be used for active depth sensing. If the device 1000 is not in a first device mode (such as the device 1000 being in a second device mode), operation may proceed to decision block 1724. If the device 1000 is in a second device mode, an image sensor may be used for image capture or a second emitter may be used for active depth sensing.

At decision block 1724, if the device 1000 includes a second emitter, operation may proceed to 1726. If the device 1000 includes an image sensor, operation may proceed to 1730. Referring back to 1726, the second emitter emits a second light when the device 1000 is in the second device mode. For example, the first device mode may be a first active depth sensing mode using the first emitter, and the second device mode may be a second active depth sensing mode using the second emitter. The two active depth sensing modes may be for different types of active depth sensing techniques (such as structured light versus time of flight). In another example, the two active depth sensing modes may be for emitting different distributions of light for structured light depth sensing or for emitting different pulsed frequencies or different wavelengths of light for time of flight depth sensing. For example, a first emitter may be configured to emit sub-1000 nm wavelength light, and a second emitter may be configured to emit light with a wavelength greater than 1000 nm. In this manner, time of flight depth sensing may use different frequency light based on the application.

At 1728, the device 1000 directs the second light from the second emitter 1003 to a first optical path 1001 or a second optical path 1024 based on an OE mode. For example, if the optical element 1004 is in a first OE mode, the optical element 1004 may direct the second light toward the second aperture 1022. If the optical element 1004 is in a second OE mode, the optical element 1004 may direct the second light toward the first aperture 1020. The first OE mode may be associated with a first orientation of the optical element 1004, a first position of the optical element 1004, or a first state of the optical element 1004. The second OE mode may be associated with a second orientation of the optical element 1004, a second position of the optical element 1004, or a second state of the optical element 1004. In some implementations, the device 1000 is configured to adjust the optical element 1004 based on which OE mode is to be used. For example, the controller 1010 may instruct an actuator or otherwise control the optical element 1004 to rotate between orientations, move between positions, or apply a stimulus to the optical element 1004.

Referring back to 1724, if the device 1000 includes an image sensor, the device 1000 may direct light propagated along the first optical path or the second optical path to the image sensor based on the OE mode (1730). For example, if the optical element 1004 is in a first OE mode, the optical element 1004 may direct light from a second aperture 1022 (which propagates along the second optical path 1024) toward the image sensor 1003. If the optical element 1004 is in a second OE mode, the optical element 1004 may direct light from a first aperture 1020 (which propagates along the first optical path 1001) toward the image sensor 1003. In some implementations, the device 1000 is configured to adjust the optical element 1004 based on which OE mode is to be used. For example, the controller 1010 may instruct an actuator or otherwise control the optical element 1004 to rotate between orientations, move between positions, or apply a stimulus to the optical element 1004.

The controller 1010 (or another suitable component of the device 1000) may control the optical element 1004 for the different OE modes (and, optionally, during different device modes). FIG. 18 shows an illustrative flow chart depicting an example operation 1800 of controlling an optical element 1004 for active depth sensing. Operation 1800 may be performed by the controller 1010 or another suitable component of the device 1000.

At 1802, the device 1000 (such as the controller 1010) identifies whether the optical element 1004 is to be in a first OE mode or a second OE mode. In some implementations, the controller 1010 identifies the OE mode based on a device mode (1804). For example, if a first aperture 1020 is to be used for active depth sensing using a second emitter 1003 (which may correspond to a second device mode), the controller 1010 may identify that the optical element 1004 is to be in the second OE mode. In another example, is the first aperture 1020 is to be used for active depth sensing using the first emitter 1002 (which may correspond to a first device mode), the controller 1010 may identify that the optical element 1004 is to be in the first OE mode. In another example, if the device 1000 is to use both apertures to emit light across a wider portion of the scene for active depth sensing, the controller 1010 may determine that the first OE mode is to be used for a first portion of time and a second OE mode is to be used for a second portion of time (such as alternating OE modes).

In some implementations of basing the identification of OE modes on a device mode, the controller 1010 may identify the OE mode based on an efficiency of different active depth sensing systems. For example, a first emitter 1002 may emit a first distribution of light and the second emitter 1003 may emit a second distribution of light for structured light depth sensing. The first distribution of light may be sparser or have larger codewords than the second distribution of light. In this manner, a first depth map using the first distribution of light may have less resolution that a second depth map using the second distribution of light in the absence of interference (such as ambient light). However, the second distribution of light may be more susceptible to interference since light points may be more closely bunched and have a lower individual light intensity. For example, depth mapping using the second distribution of light may be more difficult in bright sunlight. In another example, depth mapping using the second distribution of light may be more difficult as the depths of objects increase. In this manner, the device 1000 may determine whether the current distribution of light being used is sufficient. For example, when the images including the reflections of the distribution of light are processed and depths are determined to generate a depth map, the depth map may include holes where a depth cannot be determined. If the number or sizes of holes reaches a threshold for the second distribution of light, the device 1000 may determine that the first emitter 1002 is to be used (with a sparser distribution of light emitted). In this manner, the device 1000 may determine to switch from a second device mode to a first device mode for active depth sensing. As a result, the controller 1010 may control the optical element to switch OE modes in order to switch from using the second distribution of light for active depth sensing to using the first distribution of light for active depth sensing.

In some other implementations, the controller 1010 identifies the OE mode based on an active depth sensing or imaging application (1806). For example, if the second aperture 1022 is a front facing aperture on a smartphone, and the smartphone is to perform active depth sensing using the first emitter 1002 for facial recognition, the controller 1010 may determine that the second aperture 1022 is to be used for active depth sensing. In this manner, the controller 1010 may identify that the optical element 1004 is to be in the second OE mode. In another example, if the smartphone is in a low power state or locked state, the device 1000 may be configured to perform an imaging application using a lower power image sensor for object detection (such as to detect if a possible face approaches the center of the field of view for the image sensor). If a possible face is detected, the controller 1010 may determine to switch OE modes in using the first emitter 1002 to emit a distribution of light for active depth sensing (such as for facial recognition).

In some further implementations, the controller 1010 identifies the OE mode based on a user input (1808). For example, if the apertures 1020 and 1022 are on different sides of the device 1000, the user may indicate in which direction from the device to perform active depth sensing. For example, the user may explicitly select a direction or otherwise indicate the OE mode through one or more inputs (such as via a GUI, audible command, haptic command, and so on).

In some implementations, the controller 1010 identifies the OE mode based on an orientation of the device 1000 (1809). For example, the controller 1010 may determine (such as based on orientation measurements or measurements of light intensities in images from the image sensor) that the device 1000 is resting on a surface with the first aperture 1020 directed up and the second aperture 1022 directed down towards the surface. The controller 1010 may determine that the first aperture 1020 is to be used for object detection using the image sensor and active depth sensing for facial recognition using the first emitter 1002. In this manner, the controller 1010 may identify a second OE mode for object detection (to direct light from the first aperture 1020 towards the image sensor), and the controller 1010 may identify a first OE mode for facial recognition (to direct light from the first emitter 1002 towards the first aperture 1020 for active depth sensing).

At 1810, the device 1000 controls the optical element 1004 based on the identified OE mode. For example, the controller 1010 may determine whether the optical element 1004 is to be adjusted for the identified OE mode, and the controller 1010 may adjust the optical element 1004 based on the identified OE mode (1812). As noted herein, adjusting the optical element 1004 may include rotating the optical element 1004, moving the optical element 1004, or applying a stimulus (such as an electrical current) to the optical element 1004. For example, the controller 1010 may compare the current OE mode to the identified OE mode and determine if a difference exists. If a difference exists, the controller 1010 may instruct (or otherwise control) an actuator to rotate or move the optical element 1004 or may control electrical contacts to apply or remove an electrical current to or from the optical element 1004. As noted herein, the optical element 1004 may change modes during device operation (including during a device mode). As such, operation 1800 may be performed multiple times.

In some implementations, the first device mode and the second device mode may occur concurrently. For example, if the device 1000 includes a second emitter 1003, active depth sensing may be performed using both emitters and both apertures of the device 1000. In another example, if the device 300 includes a second aperture 322, image capture may be performed using both image sensors and both apertures of the device 300. For example, active depth sensing or image capture from a front of a smartphone may be performed concurrently with active depth sensing or image captured from a rear of a smartphone. In another example, both active depth sensing and image capture may be performed from a same side of a device 1000. In some implementations, the active depth sensing may be a time of flight depth sensing for laser autofocus for the image sensor 1003 for image capture.

As noted herein, a device may include any suitable combination of image sensors, emitters, optical elements and so on, and the configuration of the components may be any suitable configuration. The device may perform any combination of the described methods herein. For example, a device may be configured for a plurality of active depth sensing modes and a plurality of image capture modes.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 306 in the example device 300 of FIG. 3A or the memory 1006 in the example device 1000 of FIG. 10) comprising instructions that, when executed by the processor (or a controller, a signal processor, or another suitable component), cause the device to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 305 or 1005 or the image signal processor 312 or 1012 in the example device 300 of FIG. 3A and example device 1000 of FIG. 10. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while specific orientations of an image sensor and an emitter are depicted, the orientations of such components may be other suitable orientations. For example, one or more emitters or one or more image sensors may be positioned on any suitable plane with reference to the device (such as a plane parallel to any side of the device, including a front, rear, top, bottom, and so on, or a plane between planes defined by two or more sides of the device). Therefore, the present disclosure is not limited to a specific orientation of an image sensor or a specific orientation of an emitter. In another example, while translational movement of the optical element is shown along one axis, translational movement may be along one or more suitable axes. In a further example, while rotation of the optical element is shown along one axis, rotation of the optical element may occur along any suitable number of axes.

Additionally, the functions, steps or actions of the method claims in accordance with aspects described herein need not be performed in any particular order unless expressly stated otherwise. For example, the steps of the described example operations, if performed by the device (such as by components including the controller 310 or 1010, the processor 305 or 1005, the signal processor 312 or 1012, or the optical element 304 or 1004) may be performed in any order and at any frequency. Furthermore, although elements or components may be described or claimed in the singular, the plural is contemplated unless limitation to the singular is explicitly stated. For example, an optical element may be configured to support three or more image sensors or emitters.

What is claimed is:

1. A device for active depth sensing, comprising:
    a first aperture configured to receive light propagated along a first optical path;
    a second aperture configured to receive light propagated along a second optical path;
    a first emitter configured to emit a first light; and
    an optical element configured to direct the first light from the first emitter towards the first optical path in a first optical element (OE) mode, wherein the first light from the first emitter is directed towards the second optical path in a second OE mode.

2. The device of claim 1, further comprising an actuator configured to move the optical element between a first position associated with the first OE mode and a second position associated with the second OE mode.

3. The device of claim 1, further comprising an actuator configured to rotate the optical element between a first orientation associated with the first OE mode and a second orientation associated with the second OE mode.

4. The device of claim 3, wherein a transparency and a reflectiveness of the optical element are based on an orientation of the optical element with reference to the first optical path.

5. The device of claim 1, further comprising a second emitter configured to emit a second light, wherein:
the optical element is further configured to direct the second light from the second emitter towards the second optical path when the optical element is in the first OE mode; and
the second light from the second emitter is directed towards the first optical path in the second OE mode.

6. The device of claim 1, further comprising one or more receivers configured to receive a reflection of the first light for active depth sensing.

7. The device of claim 1, further comprising an image sensor configured to capture one or more images, wherein:
the optical element is configured to direct a light received by the second aperture toward the image sensor in the first OE mode; and
a light received by the first aperture is directed toward the image sensor in the second OE mode.

8. The device of claim 7, further comprising:
a signal processor configured to process the one or more images captured by the image sensor from light received from the first aperture or the second aperture.

9. The device of claim 8, further comprising:
an application processor configured to provide instructions to the signal processor; and
a memory configured to store the processed images.

10. The device of claim 1, further comprising a controller to control the optical element.

11. The device of claim 10, wherein the controller controls the optical element based on an orientation of the device.

12. A method for active depth sensing by a device including a first aperture, a second aperture, a first emitter, and an optical element, comprising:
identifying whether the optical element is to be in a first optical element (OE) mode or a second OE mode; and
controlling the optical element based on the identified OE mode, wherein:
the optical element directs light from the first emitter towards the first aperture in the first OE mode; and
light from the first emitter is directed towards the second aperture in the second OE mode.

13. The method of claim 12, wherein controlling the optical element includes adjusting the optical element.

14. The method of claim 13, wherein adjusting the optical element includes one or more of:
rotating the optical element; or
translationally moving the optical element.

15. The method of claim 12, wherein identifying whether the optical element is to be in the first OE mode or the second OE mode is based on a device mode of the device, wherein:
the device includes a second emitter or an image sensor;
a first device mode is associated with the first emitter; and
a second device mode is associated with the second emitter or the image sensor.

16. The method of claim 12, wherein identifying whether the optical element is to be in the first OE mode or the second OE mode is based on a user input.

17. The method of claim 12, further comprising:
emitting light by the first emitter;
directing, by the optical element, the light from the first emitter towards the first aperture in the first OE mode; and
directing the light from the first emitter towards the second aperture in the second OE mode.

18. The method of claim 17, further comprising:
emitting light by a second emitter when the device is in a second device mode, wherein the first emitter emits light when the device is in a first device mode;
directing, by the optical element, the light from the second emitter towards the second aperture in the first OE mode; and
directing the light from the second emitter towards the first aperture in the second OE mode.

19. The method of claim 17, further comprising:
capturing images by an image sensor when the device is in a second device mode, wherein the first emitter emits light when the device is in a first device mode;
directing, by the optical element, light from the second aperture towards the image sensor in the first OE mode; and
directing light from the first aperture towards the image sensor in the second OE mode.

20. The method of claim 12, wherein identifying whether the optical element is to be in the first OE mode or the second OE mode is based on an orientation of the device.

21. A non-transitory, computer-readable medium storing instructions that, when executed by one or more processors of a device for active depth sensing including a first aperture, a second aperture, a first emitter, and an optical element, cause the device to:
identify whether the optical element is to be in a first optical element (OE) mode or a second OE mode; and
control the optical element based on the identified OE mode, wherein:
the optical element directs light from the first emitter towards the first aperture in the first OE mode; and
light from the first emitter is directed towards the second aperture in the second OE mode.

22. The computer-readable medium of claim 21, wherein execution of the instructions to control the optical element causes the device to adjust the optical element.

23. The computer-readable medium of claim 22, wherein adjusting the optical element includes one or more of:
rotating the optical element; or
translationally moving the optical element.

24. The computer-readable medium of claim 21, wherein identifying whether the optical element is to be in the first OE mode or the second OE mode is based on a device mode of the device, wherein:
the device includes a second emitter or an image sensor;
a first device mode is associated with the first emitter; and
a second device mode is associated with the second emitter or the image sensor.

25. The computer-readable medium of claim 21, wherein identifying whether the optical element is to be in the first OE mode or the second OE mode is based on a user input.

26. The computer-readable medium of claim 21, wherein execution of the instructions further causes the device to:
emit light by the first emitter;
direct, by the optical element, the light from the first emitter towards the first aperture in the first OE mode; and
direct the light from the first emitter towards the second aperture in the second OE mode.

27. The computer-readable medium of claim 26, wherein execution of the instructions further causes the device to:
　　emit light by a second emitter when the device is in a second device mode, wherein the first emitter emits light when the device is in a first device mode;
　　direct, by the optical element, the light from the second emitter towards the second aperture in the first OE mode; and
　　direct the light from the second emitter towards the first aperture in the second OE mode.

28. The computer-readable medium of claim 26, wherein execution of the instructions further causes the device to:
　　capture images by an image sensor when the device is in a second device mode, wherein the first emitter emits light when the device is in a first device mode;
　　direct, by the optical element, light from the second aperture towards the image sensor in the first OE mode; and
　　direct light from the first aperture towards the image sensor in the second OE mode.

29. The computer-readable medium of claim 21, wherein identifying whether the optical element is to be in the first OE mode or the second OE mode is further based on an orientation of the device.

* * * * *